(12) United States Patent
Masuda

(10) Patent No.: US 8,150,952 B2
(45) Date of Patent: Apr. 3, 2012

(54) APPLICATION PROGRAM EXECUTION SYSTEM, SENSOR, FIRST SERVER, SECOND SERVER, AND OBJECT THEREOF AND APPLICATION PROGRAM EXECUTION METHOD

(75) Inventor: Yoshihiro Masuda, Kanagawa (JP)

(73) Assignee: Fuji Xerox Co., Ltd., Toyko (JP)

( * ) Notice: Subject to any disclaimer, the term of this patent is extended or adjusted under 35 U.S.C. 154(b) by 1566 days.

(21) Appl. No.: 10/937,709

(22) Filed: Sep. 10, 2004

(65) Prior Publication Data

US 2005/0086264 A1    Apr. 21, 2005

(30) Foreign Application Priority Data

Oct. 16, 2003   (JP) ................................. 2003-357081

(51) Int. Cl.
 *G06F 15/173* (2006.01)
(52) U.S. Cl. ........ 709/223; 709/203; 709/217; 709/219; 709/224; 340/540
(58) Field of Classification Search .................. 709/223, 709/203, 217, 219, 224; 340/540
See application file for complete search history.

(56) References Cited

U.S. PATENT DOCUMENTS

| | | | |
|---|---|---|---|
| 6,002,996 A | 12/1999 | Burks et al. | |
| 6,300,872 B1 * | 10/2001 | Mathias et al. | 340/540 |
| 6,327,535 B1 | 12/2001 | Evans et al. | |
| 6,400,272 B1 * | 6/2002 | Holtzman et al. | 340/572.1 |
| 6,571,279 B1 * | 5/2003 | Herz et al. | 709/217 |
| 6,614,351 B2 * | 9/2003 | Mann et al. | 340/572.1 |
| 6,704,776 B1 * | 3/2004 | Fortune | 709/219 |
| 6,708,208 B1 * | 3/2004 | Philyaw | 709/223 |
| 6,748,195 B1 * | 6/2004 | Phillips | 455/41.2 |
| 6,792,395 B2 * | 9/2004 | Roberts | 702/188 |
| 6,847,892 B2 * | 1/2005 | Zhou et al. | 701/213 |
| 6,917,288 B2 * | 7/2005 | Kimmel et al. | 340/511 |
| 6,947,571 B1 * | 9/2005 | Rhoads et al. | 382/100 |
| 7,013,149 B2 * | 3/2006 | Vetro et al. | 455/456.1 |

(Continued)

FOREIGN PATENT DOCUMENTS

JP    11-250393    9/1999

(Continued)

OTHER PUBLICATIONS

Salber, Daniel et al., "The Context Toolkit: Aiding the Development of Context-Enabled Applications," in the Proceedings of the 1999 Conference on Human Factors in Computing Systems (CHI'99), Pittsburgh, PA, May 15-20, 1999, pp. 434-441.

(Continued)

*Primary Examiner* — Emmanuel L Moise
*Assistant Examiner* — Waseem Ashraf
(74) *Attorney, Agent, or Firm* — Sughrue Mion, PLLC

(57) ABSTRACT

The present invention enables to establish sensing environment and application environment respectively by managing the corresponding relationship between the objects and the application programs in object management servers. The application program execution system includes movable objects, detection units that detect the objects, application programs, control units that control the execution of the context-aware application program, corresponding relationship between the objects and the application programs, and notification units that notify the control units of detection information that the detection units have detected, according to the corresponding relationship. Thus, the appropriate application programs are executed. The present invention enables to establish and change the application program execution system flexibly. Development of the application programs is also flexible.

9 Claims, 38 Drawing Sheets

U.S. PATENT DOCUMENTS

| | | | | |
|---|---|---|---|---|
| 7,072,672 | B1 * | 7/2006 | Vanska et al. | 455/456.3 |
| 7,076,536 | B2 * | 7/2006 | Chiloyan et al. | 709/220 |
| 7,099,921 | B1 * | 8/2006 | Engstrom et al. | 709/206 |
| 7,107,406 | B2 * | 9/2006 | Kurasugi | 711/137 |
| 7,177,869 | B2 * | 2/2007 | Yoshimura et al. | 1/1 |
| 7,206,820 | B1 * | 4/2007 | Rhoads et al. | 709/217 |
| 7,260,638 | B2 * | 8/2007 | Crosbie | 709/229 |
| 7,483,964 | B1 * | 1/2009 | Jackson et al. | 709/221 |
| 7,487,112 | B2 * | 2/2009 | Barnes, Jr. | 705/26.8 |
| 7,533,333 | B2 * | 5/2009 | Motoyama et al. | 715/230 |
| 7,539,747 | B2 * | 5/2009 | Lucovsky et al. | 709/224 |
| 7,681,203 | B2 * | 3/2010 | Mandato et al. | 719/316 |
| 2002/0035699 | A1 * | 3/2002 | Crosbie | 713/201 |
| 2002/0072989 | A1 * | 6/2002 | Van De Sluis | 705/26 |
| 2002/0133545 | A1 * | 9/2002 | Fano et al. | 709/203 |
| 2003/0065805 | A1 * | 4/2003 | Barnes, Jr. | 709/231 |
| 2003/0078980 | A1 * | 4/2003 | Carstens et al. | 709/206 |
| 2003/0149526 | A1 * | 8/2003 | Zhou et al. | 701/213 |
| 2003/0167299 | A1 * | 9/2003 | Heymann et al. | 709/203 |
| 2003/0182394 | A1 * | 9/2003 | Ryngler et al. | 709/217 |
| 2003/0225893 | A1 * | 12/2003 | Roese et al. | 709/227 |
| 2003/0236824 | A1 * | 12/2003 | Alsafadi et al. | 709/203 |
| 2004/0006593 | A1 * | 1/2004 | Vogler et al. | 709/203 |
| 2004/0153373 | A1 * | 8/2004 | Song et al. | 705/26 |
| 2004/0167881 | A1 * | 8/2004 | Masuda | 707/3 |
| 2004/0193449 | A1 * | 9/2004 | Wildman et al. | 705/2 |
| 2004/0193707 | A1 * | 9/2004 | Alam et al. | 709/223 |
| 2004/0225654 | A1 * | 11/2004 | Banavar et al. | 707/6 |
| 2005/0257197 | A1 * | 11/2005 | Herter et al. | 717/116 |

FOREIGN PATENT DOCUMENTS

| | | |
|---|---|---|
| JP | 2001084269 A | 3/2001 |
| JP | 2002-334030 A | 11/2002 |
| JP | 2003-143634 | 5/2003 |

OTHER PUBLICATIONS

Intanagonwiwat, Chalermek et al., "Directed Diffusion: a scalable and Robust Communication Paradigm for Sensor Networks," in the Proceedings of ACM MOBICOM 2000, 2000, pp. 56-67.

* cited by examiner

FIG. 13

```
<?xml version="1.0" encoding="Shift-JIS" ?>
<message>
<msgid>13C57A9B11D1E3</msgid>
<msgtype>requestAppList</msgtype>
<objectid>2A4A6D81CB012</objectid>
<datetime>10:23:15 July, 20, 2002</datetime>
<reply-to>http://www.epsilon.com</reply-to>
</message>
```

FIG. 14

```xml
<?xml version="1.0" encoding="Shift-JIS" ?>
<message>
  <msgid>1A35D791F1A13</msgid>
  <msgtype>responseAppList</msgtype>
  <response_for> 13C57A9B11D1E3 </response_for>
  <objectid> 2A4A6D81CB012 </objectid>
  <datetime>10:23:17 July, 20, 2002</datetime>
  <applist>
    <application>
      <address>http://www.alphabeta.com/app1</address>
      <interests>
        <interest><prop>numberOfParticipants</prop><threshold>LT 10</threshold></interest>
        <interest><prop>location</prop></interest>
      </interests>
      <cryptkey>A3451D6B392A4B<cryptkey>
    </application>
    <application>
      ...
    </application>
  </applist>
</message>
```

FIG. 15

```
<?xml version="1.0" encoding="Shift-JIS" ?>
<message>
  <msgid>2A1D3C4B6C5</msgid>
  <msgtype>sensedData</msgtype>
  <objectid> 2A4A6D81CB012 </objectid>
  <datetime>10:23:21 July, 20, 2002</datetime>
  <sensorid>357A3B45DC</sensorid>
  <senseddata>
    <data>
      <prop>numberOfParticipants</prop>
      <value>3</value>
      <sensed> 10:23:11 July, 20, 2002 </sensed>
      <expired> 10:25:11 July, 20, 2002 </expired>
    </data>
    <data>
      <prop>location</prop>
      <value>Meeting Room A</value>
      <sensed> 10:23:11 July, 20, 2002 </sensed>
      <expired> 10:25:11 July, 20, 2002 </expired>
    </data>
  </senseddata>
</message>
```

FIG. 16

```xml
<?xml version="1.0" encoding="Shift-JIS" ?>
<message>
<msgid>5B1D4EF8B6D7</msgid>
<msgtype>feedback</msgtype>
<objectid> 2A4A6D81CB012 </objectid>
<datetime>10:23:23 July, 20, 2002</datetime>
<sendedapps>
<sendeddatetime> 10:23:11 July, 20, 2002 </sendeddatetime>
<applications>
<application>http://www.aphabeta.com/app1</application>
<application>http://www.gammasigma.com/app2</application>
<applications>
</sendedapps>
</message>
```

FIG. 17

```
<?xml version="1.0" encoding="Shift-JIS" ?>
<message>
  <msgid>6ACT7A8F11HRE5</msgid>
  <msgtype>requestOwnerAddresst</msgtype>
  <objectid> 2A4A6D81CB012 </objectid>
  <datetime>10:23:35 July, 20, 2002</datetime>
  <reply-to>http://www.epsilon.com</reply-to>
</message>
```

FIG. 18

```
<?xml version="1.0" encoding="Shift-JIS" ?>
<message>
  <msgid>5235ATZ1Y1S42</msgid>
  <msgtype>responseOwneraddress</msgtype>
  <response_for> 6ACT7A8F11HRE5 </response_for>
  <objectid> 2A4A6D81CB012 </objectid>
  <datetime>10:23:37 July, 20, 2002</datetime>
  <address>owner@user.com</address></message>
```

FIG. 30

```
                                                    20-1
┌─────────────────────────────────────────────────┐
│  EDIT SCREEN OF CORRESPONDING RELATIONSHIP      │
│                                                 │
│  ○ OBJECT ID        ⊙ OBJECT GROUP NAME         │
│  OBJECT ID/OBJECT GROUP NAME                    │
│  ┌──────────────────────┐ ┌─────────────────┐   │
│  │                      │ │SELECT GROUP NAME│──── 20-11
│  └──────────────────────┘ └─────────────────┘   │
│  PASSWORD  ┌──────────────┐                     │
│            └──────────────┘                     │
│                                                 │
│  ○ REPORT DESTINATION ADDRESS ⊙APPLICATION GROUP NAME │
│  REPORT DESTINATION ADDRESS/APPLICATION GROUP NAME │
│  ┌──────────────────────┐ ┌─────────────────┐   │
│  │                      │ │SELECT GROUP NAME│──── 20-12
│  └──────────────────────┘ └─────────────────┘   │
│  ┌────┐ ┌──────┐ ┌──────┐ ┌──────┐              │
│  │ OK │ │CANCEL│ │DELETE│ │DETAIL│              │
│  └────┘ └──────┘ └──────┘ └──────┘              │
└─────────────────────────────────────────────────┘
                                         20-13
```

FIG. 32A

```
EDIT SCREEN OF OBJECT GROUP

LIST OF OBJECT GROUP NAMES
[                              ]          ~20-2

EDIT BOX OF OBJECT ID  [         ]
PASSWORD               [         ]
EDIT BOX OF
OWNER ADDRESS          [         ]

[ NEW REGISTRATION OF OBJECT GROUP ]      ~20-21

[ REGISTER ]  [ DELETE ]  [ CANCEL ]
```

FIG. 32B

```
NEW REGISTRATION SCREEN OF OBJECT GROUP

EDIT BOX OF OBJECT GROUP
[                              ]          ~22-1

[ OK ]              [ CANCEL ]
```

EXAMPLE OF OBJECT ID

XX XXXXXXXX
↑    ↑
|    └─ SERIAL NUMBER
└─ OBJECT TYPE
   (EXAMPLE)
      0000:ALL KINDS
      0001:HUMAN
      1000:DEVICE
      1001:NOTEBOOK PC
      1010:PDA

US 8,150,952 B2

APPLICATION PROGRAM EXECUTION SYSTEM, SENSOR, FIRST SERVER, SECOND SERVER, AND OBJECT THEREOF AND APPLICATION PROGRAM EXECUTION METHOD

BACKGROUND OF THE INVENTION

1. Field of the Invention

This invention relates to an application program execution system, a sensor, a first server, a second server, and an object thereof, and an application program execution method.

2. Description of the Related Art

In recent years, according to downsizing of computers and progress of wireless network technology, technologies that sensors detect what humans do in real workspaces have rapidly been developed. Under the circumstances, a new concept that computers provide users with required services in advance has been created. Thus, there exists a need for establishing an environment in which sensing technologies are shared and used among two or more context-aware applications.

However, a conventional application providing a service according to the situation that the sensor has detected (which is referred to as a context-aware application) needed to have a dedicated sensing mechanism independently. Therefore, conventionally, there has been the problem in that multiple sensing mechanisms existed redundantly in the real space as the number of the applications increased.

In addition, in the case where there is a sensing mechanism for each application, taking the implementation cost into account, there is the problem in that the sensing range is limited to a relatively small range.

A corresponding relationship between a number of sensors and multiple applications needs to be set so that the multiple application programs can receive the information from the multiple sensors located in the real world. However, this implementation is troublesome, and there is the problem in that the sensors to be used are limited to the predetermined sensors only, which have been set for use in advance.

SUMMARY OF THE INVENTION

The present invention has been made in view of the above circumstances and provides an application program execution system, a sensor, a first server, a second server, and an object thereof and an application program execution method. Sensing environment and application environment can be managed separately and respectively, therefore the application program execution system can be established and changed flexibly.

According to an aspect of the present invention, an application program execution system comprising: control units that control execution of application programs; detection units that detect information on an object; and a notification unit that notifies, based on relationship information showing a corresponding relationship between the object and the application program, a specific control unit among the control units of a detection result of the detection unit, the specific control unit executing an application program that is included in the application programs and is identified from the corresponding relationship.

According to another aspect of the present invention, a first server comprising: a retaining unit that retains a corresponding relationship between an identifier and an address, the identifier having been given to an object, and the address having been assigned to an application program whose detection target is the object, wherein the retaining unit, according to an inquiry via a network, notifies a source address of the inquiry, of the address having a corresponding relationship with the identifier.

According to another aspect of the present invention, a second server comprising: a control unit that executes an application program based on a situation of an object, the application program having a corresponding relationship with the object; and a judging unit that detects information on the situation of the object having been received via a network, wherein the control unit executes the application program, when the judging unit detects an identifier or the information on the situation of the object is received.

According to another aspect of the present invention, an object comprising a retaining unit that retains an identifier, wherein the identifier includes an address assigned to a first server that retains a corresponding relationship between the identifier and the address assigned to an application program.

According to another aspect of the present invention, an application program execution system comprising: an object that is capable of moving around; a detection unit that detects information on the object; an application program; a control unit that executes the application program; relationship information showing relationship between the object and the application program; and a notification unit that notifies, based on the relationship information, the control unit of a detection result of the detection unit.

BRIEF DESCRIPTION OF THE DRAWINGS

Embodiments of the present invention will be described in detail based on the following figures, wherein:

FIG. 13 shows an example of a report destination address request message according to the first embodiment;

FIG. 14 shows an example of a report destination address reply message according to the first embodiment;

FIG. 15 shows an example of an object detection message according to the first embodiment;

FIG. 16 shows an example of an object detection message according to the first embodiment;

FIG. 17 shows an example of an owner address request message according to the first embodiment;

FIG. 18 shows an example of an owner address reply message according to the first embodiment;

FIG. 30 illustrates an edit screen of a corresponding relationship 20-1 in order to edit the corresponding relationship 201-2 according to the first embodiment;

FIG. 32A illustrates an edit screen of object group 20-2 for editing an object group 201-5 according to the first embodiment. FIG. 32B illustrates a new registration screen of object group 22-1 according to the first embodiment;

DESCRIPTION OF THE EMBODIMENTS

Figure 1:
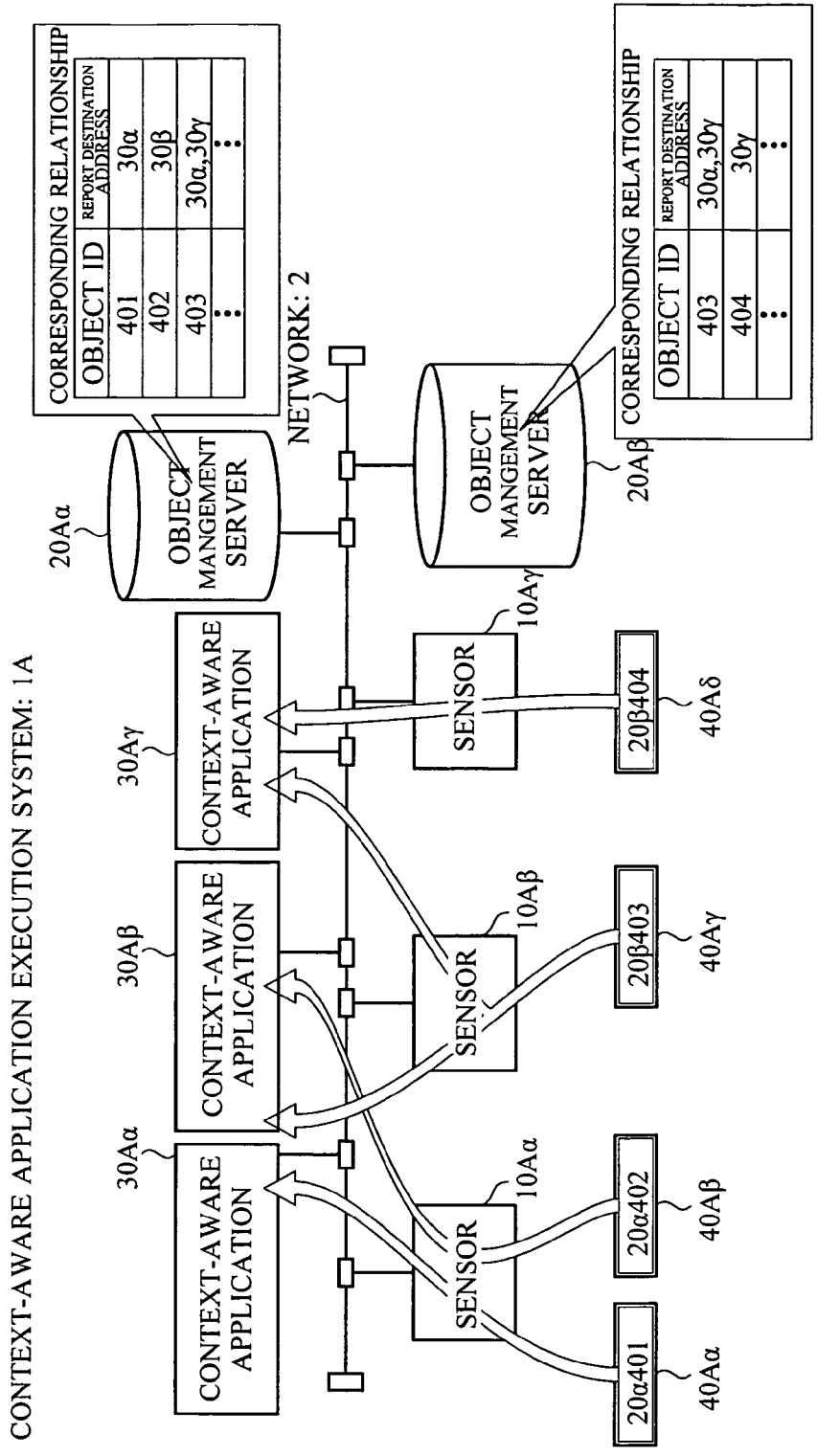
FIG. 1 is a block diagram of an execution system of context-aware application 1A according to a first embodiment of the present invention.

Referring to FIG. 1, a description will now be given of a first embodiment. This embodiment describes a system for providing a service with a context-aware application (application program). In particular, according to the situation (hereinafter referred to as context) of a user or an item that the user carries (hereinafter referred to as an object), this system sets an object for a detection target.

FIG. 1 is an example of a block diagram of a context-aware application execution system of 1A, according to the first embodiment of the present invention. As shown in FIG. 1, the context-aware application execution system 1A includes one ore more sensors (three sensors in FIG. 1: 10Aα, 10Aβ, and 10Aγ), one or more object management servers (two servers in FIG. 1: 20Aα and 20Aβ), one or more context-aware applications (three applications in FIG. 1: 30Aα, 30Aβ, and 30Aγ), and one or more objects (four objects in FIG. 1: 40Aα, 40Aβ, 40Aγ, and 40Aδ).

Hereinafter three sensors in FIG. 1, 10Aα, 10Aβ, and 10Aγ in the context-aware application execution system of 1A will be represented by 10A. Two servers, 20Aα and 20Aβ will be represented by 20A. Three applications, 30Aα, 30Aβ, and 30Aγ will be represented by 30A. Four objects, 40Aα, 40Aβ, 40Aγ, and 40Aδ will be represented by 40A.

Each of the object 40A is capable of moving around from place to place. A unique identifier (hereinafter simply referred to as ID) is given to the object 40A individually so as to be identified uniquely. Hereinafter this ID will be referred to as object ID.

The sensor 10A detects the object ID of the object within the area that the sensor 10A can detect. At the same time, the sensor 10A also detects information on the object, for example, information on the situation of the object. In other words, the sensor 10A has a detection unit that detects the information on the object. The information of the object will be described later.

Each of the objects 40A has a corresponding relationship with one or more pieces of information on one of the context-aware applications (which is application information described later). In this corresponding relationship, the sensor is designated as the detection target of the context-aware application, and this corresponding relationship is retained on the management servers 20Aα and/or 20Aβ. The application information includes an address of the context-aware application (this address is referred to as a report destination address). That is, the object management server has a retaining unit. The retaining unit retains the corresponding relationship between the object ID and the report destination address assigned to the context-aware application. The report destination address means an address to which the context-aware application 30A is assigned on a network 2.

The sensor 10A, based on the detected object ID, acquires the information of the context-aware application having a corresponding relationship with the object, from one of the object management servers 20A. That is, the sensor 10A has an acquiring unit. With the acquiring unit, the sensor, based on the detected object, acquires the report destination address corresponding to the object ID, from the above-mentioned retaining unit. Then, the sensor transmits a detection result regarding the object to the acquired report destination address. That is, the sensor 10A has a notification unit that notifies the acquired report destination address of the detection result. The report destination address has been acquired with the above-mentioned acquiring unit.

In this way, the context-aware application 30A that has received the information on the object, based on the detection result, executes the context-aware application program to provide a service according to the situation of the object. In other words, on the network 2, there is a control unit for each of the context-aware applications 30A. The control unit controls program execution, based on the detection result from the above-mentioned detection unit.

Figure 2:
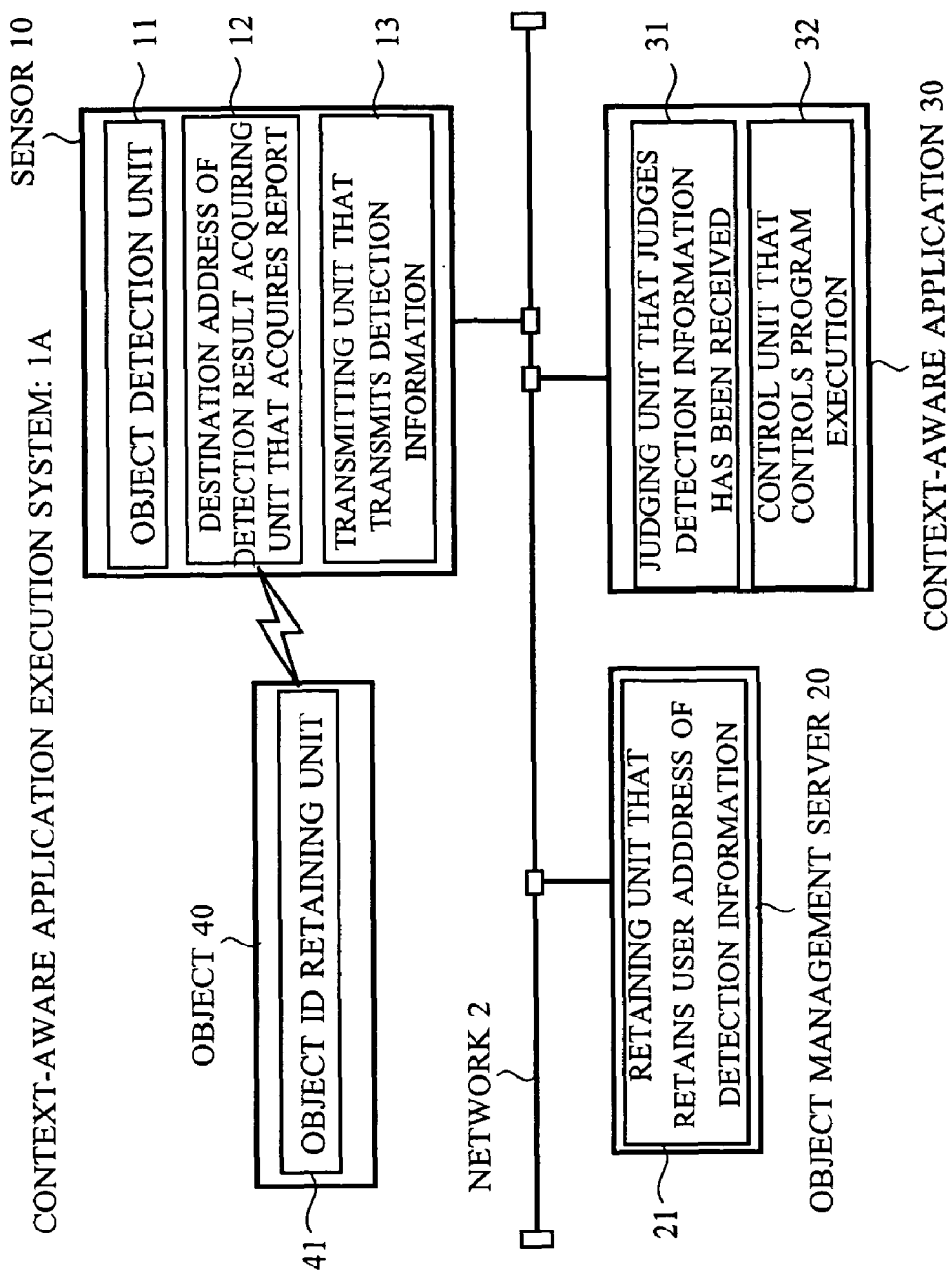
FIG. 2 is a block diagram of units in the execution system of context-aware application 1A.

Each unit, shown in FIG. 1, owned by the object, the sensor, the object management server, and the context-aware application will now be described, with reference to FIG. 2. In FIG. 2, the context-aware application execution system 1A includes the sensor 10, the object management server 20, the context-aware application 30, and the object 40. The sensor 10, the object management server 20, and the context-aware application 30 are connected via the network 2. Preferably, the network 2 is the Internet; however, without limiting to the Internet, WAN (Wide Area Network), LAN (Local Area Network), or the like may be employed. The sensor 10 and the object 40 send and receive data by wireless.

The object 40 has an object ID retaining unit 41. The object ID is assigned to an individual object. What can be assigned to the object ID are not only artificially given identification data but also uniquely identifiable identification data occurring in nature such as finger print, iris, voice pattern, face pattern, vein pattern of palm, shape of item, and the like. In the case where the identification data occurring in nature is assigned, the object ID retaining unit 41 is a natural object having this identification data. In the following description, the object ID is artificially given to the identification data.

The sensor 10 has an object detection unit 11, an acquiring unit that acquires the report destination address of the detection result 12 (hereinafter simply referred to as acquiring unit 12), and a detection information transmitting unit 13 (also referred to as notification unit). The object detection unit 11 detects the object ID assigned to the object 40 together with the information on the object 40. The information on the object here can include, for example, the object ID, an object type or a serial number of the object ID, information for identifying the sensor 10 that has detected the object 40 (which corresponds to the sensor ID, and will be described later), how many objects are existent within a give area, the place of area where the object 40 has been detected, how the object 40 is moving, the temperature of the object 40, the weight of the object 40, and the like. In other words, the information on the object 40 can include information specific to the object 40 or information regarding the situation of the object 40. However, the situation of the object 40 represents a condition of the object 40 or surroundings of the object 40. The information on the object will be referred to as attribute information. To the sensor 10, what kind of attribute information needs to be acquired has been set in advance. In addition, a sensing unit and processing capability have been installed for obtaining the attribute information. This sensing unit and processing capability are included in the object detection unit 11, and will be described with the object detection unit 11. The acquiring unit 12 inquires a retaining unit that retains the destination address using the detection information 21 (hereinafter simply referred to as retaining unit 21) about the context-aware application 30 (will be described later). The detection target of the context-aware application 30 is the object 40. The detection information transmitting unit 13 transmits the detected attribute information (hereinafter referred to as detection information) from the retaining unit 21 to the acquired report destination address. The report destination address represents for one or more context-aware applications 30. One example of the detection information will be shown as 30-2 (object detection information) in FIG. 11.

Figure 8:
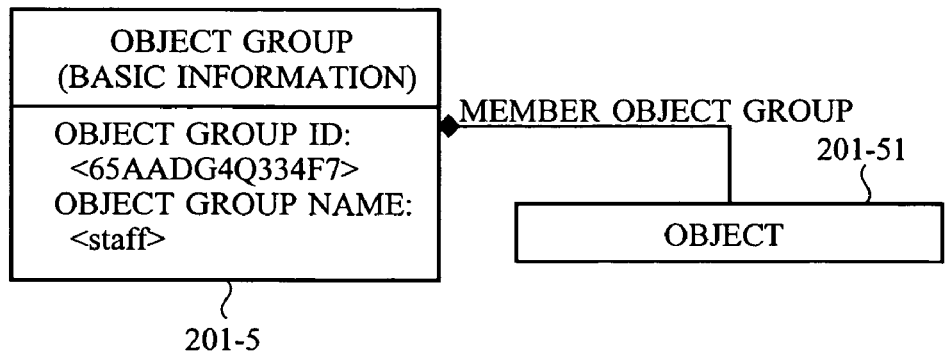
FIG. 8 schematically illustrates the data structure of an object group 201-5 shown in FIG. 6.
Figure 10:
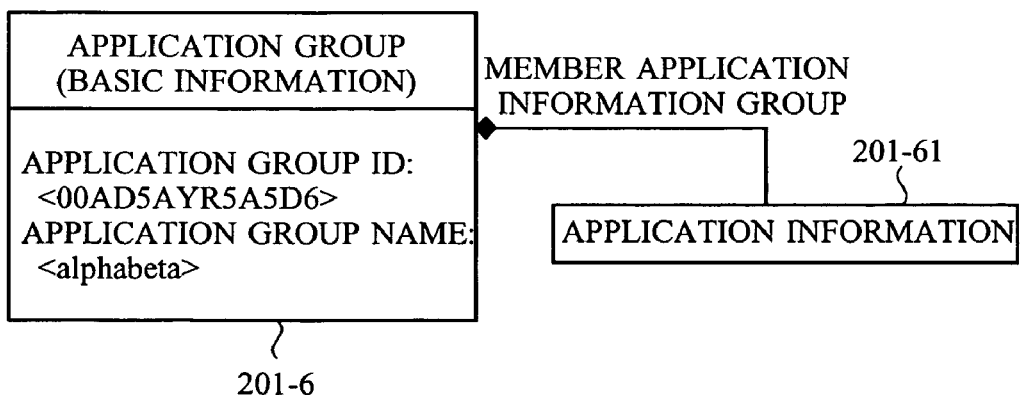
FIG. 10 schematically illustrates the data structure of an object 201-6 shown in FIG. 6.

The object management server 20 has the above-mentioned retaining unit 21. The retaining unit 21 retains the corresponding relationship between one or more object IDs and the report destination addresses. The object ID is the detection target of the context-aware application 30. The object ID having the corresponding relationship may be a group including multiple object IDs. This group is referred to as an object group, and one example is shown in FIG. 8. In the same way, the context-aware application 30 may also be a group including multiple context-aware applications 30. This group is referred to as an application group, and one example of the application group is shown in FIG. 10. One example of the corresponding relationship is shown as the corresponding relationship 201-2 in FIG. 6.

The context-aware application 30 has a judging unit that judges whether the detection information has been received 31 (hereinafter simply referred to as judging unit 31) and a program execution control unit 32 (hereinafter simply referred to as control unit 32). The judging unit 31 judges whether the above-mentioned detection information has been received from the sensor 10. When the judging unit 31 judges that the above-mentioned detection information has been received, the program execution control unit 32 executes the context-aware application program (hereinafter simply referred to as program) so as to provide the service according to the situation.

Figure 3:
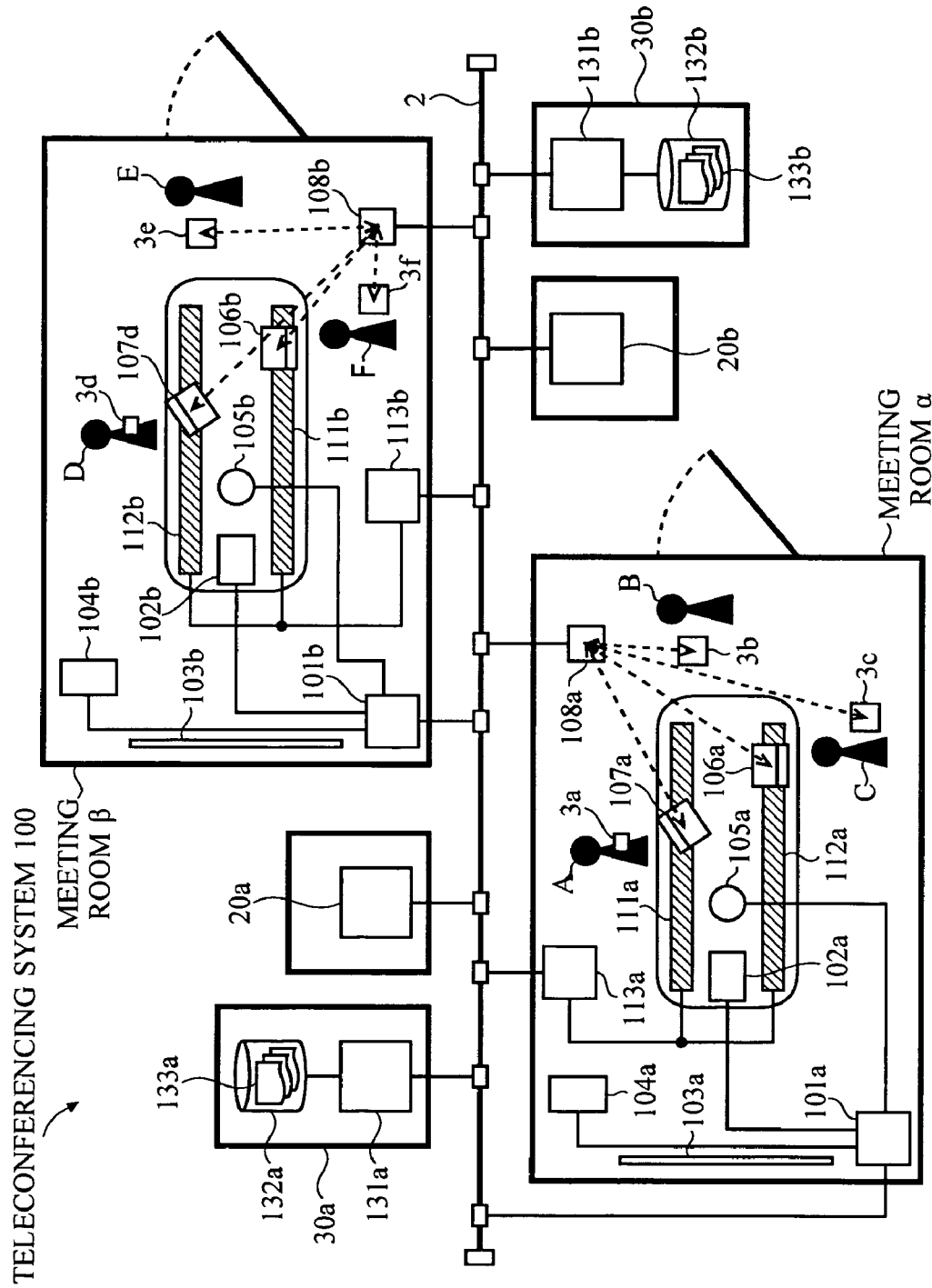
FIG. 3 is a system chart showing a teleconferencing system 100 according to the first embodiment.

Referring to FIG. 3, a description of teleconferencing system with the use of the first embodiment will now be given. In the teleconferencing system, multiple users are separately existent in multiple workspaces. FIG. 3 is a system chart showing a teleconferencing system 100 of the first embodiment.

As shown in FIG. 3, the teleconferencing system 100 has meeting rooms α and β, the object management servers 20a and 20b, and the context-aware applications 30a and 30b. Participants A through C are in the meeting room α. Participants D through F are in the meeting room β.

The participants A and D carry portable information devices such as an RF-ID tag or a non-contact smart card (hereinafter simply referred to as IC-card) with themselves. The participants A and D are the objects 40, the detection target. In this embodiment, portable information devices are the non-contact IC-cards 3a and 3d. The participants B and E have brought personal computers (hereinafter simply referred to as PC) 3b and 3e in the room. The PCs are notebook or laptop computers, which are the objects 40, the detection targets. The portable information device such as an RF-ID tag, IC-card, or the equivalent function is built in, externally attached to, or mounted on the PCs 3b and 3e. The participants C and F have brought personal information terminals such as a Personal Digital Assistant (hereinafter simply referred to as PDA) and a Personal Handy phone System (hereinafter simply referred to as PHS), which are also the objects 40, the detection targets. In this embodiment, these personal information terminals are PDAs 3c and 3f. The portable information device such as an RF-ID tag, IC-card or the equivalent function is built in, externally attached to, or mounted on the PDAs 3c and 3f.

Unique IDs (the object IDs) are assigned to IC-cards 3a and 3d, PCs 3b and 3e, and PDAs 3c and 3f respectively. The object IDs can be read out from the outside. Regarding PCs 3b and 3e and PDAs 3c and 3f, the object IDs may be assigned to the portable information devices that are included in PCs or PDAs. Things to which the object IDs have been attached (for example, the participants A and D putting on the IC-cards 3a and 3d, PCs 3b and 3e, and PDAs 3c and 3f) will simply be referred to as the objects.

Hereinafter devices having the same function in the teleconferencing system 100 will be enclosed within parenthesis.

In the meeting room α, antenna arrays 111a and 112a and a sensor server 113a functioning as the sensor 10, in order to detect the object 40 in the room. One or more RF-ID antennas are, for example, arranged in the antenna array 111a (112a). The sensor server 113a, for example, has an information-processing device such as a PC, a workstation, or the like. The antenna array 111a (112a), under the control of the sensor server 113a, emits electric waves regularly or accordingly, in order to acquire the object ID from the object 40 existent in the meeting room a. The acquired object ID is inputted into the sensor server 113a. That is, the sensor server 113a and the antenna array 111a (112a) realize the object detection unit 11 (shown in FIG. 2). The object detection unit 11 is capable of detecting the object ID that has been assigned to the object 40, which is able to move from place to place in the real world. In the same way, in the meeting room β, antenna arrays 111b and 112b and a sensor server 113b functioning as the sensor 10, in order to detect the object 40 in the room. One or more RF-ID antennas are, for example, arranged in the antenna array 111b (112b). The sensor server 113b, for example, has an information-processing device such as a PC, a workstation, or the like. The antenna array 111b (112b), under the control of the sensor server 113b, emits electric waves regularly or accordingly, in order to acquire the object ID from the object 40 existent in the meeting room β. The acquired object ID is inputted into the sensor server 113b. That is, the sensor server 113b and the antenna array 111b (112b) realize the object detection unit 11 (shown in FIG. 2). The object detection unit 11 is capable of detecting the object ID that has been assigned to the object 40, which is able to move around from place to place in the real world.

Figure 4:
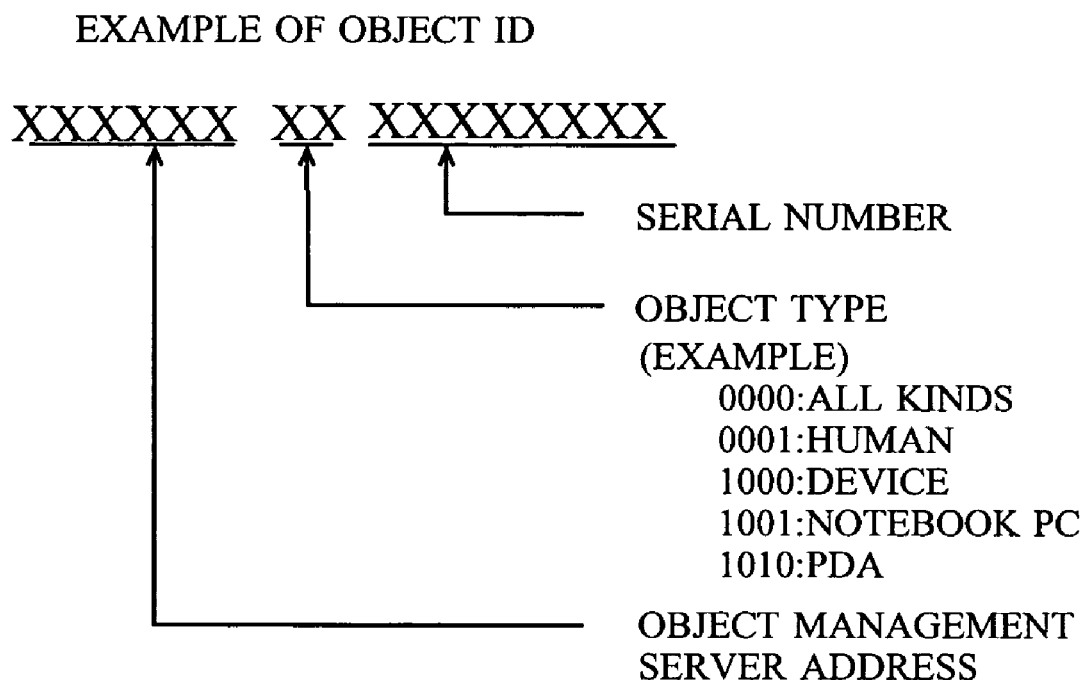
FIG. 4 is an example of an object ID to be used in the first embodiment.

FIG. 4 is an example of the object ID to be used in the first embodiment. As shown in FIG. 4, the object ID includes an address of the object management server 20 (referred to as object management server address), the type of object (referred to as object type), and the serial number of the object management server address and/or the serial number of the object type. The object management server 20 retains the corresponding relationship between the object ID and the context-aware application 30. The object management server address is, for example, represented as 24-bit data. The object type is, for example, represented as 8-bit data. The serial number is, for example, represented as 32-bit data. However, the object management server address may be represented as a URL or a TCP/IP address. In this case, the object management server address may be replaced with a uniquely corresponding number (which is referred to as address ID). Thus, the object IDs can be simplified. The corresponding relationship between the object management server address and the address ID is shared and managed among all the sensor servers including the sensor servers 113a and 113b.

The sensor server 113a (113b) inquires about an appropriate object management server 20, based on the object management server address. This inquiry is made with the use of a report destination address request message (shown in FIG. 13, and will be described later). Here, the inquiry is made to an object management server 20a. What is inquired is the information on the context-aware application 30. The detection target of the context-aware application 30 is the object 40 to which the object ID has been assigned. This information may be the address of the context-aware application 30 (which is referred to as the report destination address), the attribute information required by the context-aware application 30, or the like. In this way, the sensor server 113a (113b) realizes the acquiring unit that acquires the report destination address of the detection result so as to acquire the report destination address of the detection information. The acquired information will be referred to as application information, and will be described later with reference to FIG. 7.

The object management server 20a, as described above, retains the corresponding relationship between the object ID or the object group and the context-aware application 30 or the application group. The detection target of the context-aware application 30 or the application group is the object ID or the object group. In other words, the object management server 20a realizes the retaining unit 21 (as shown in FIG. 2), which retains the destination address (the report destination address) using the detection information, in addition to retaining the corresponding relationship between the object ID and the context-aware application 30 whose detection target is the object ID. The object management server 20a specifies the application information that corresponds to the object ID or the object group including the object ID, based on the object ID or the object group including the object ID, and then notifies the sensor servers 113a (113b) that has made an inquiry of the specified application information. This notification is performed by using a report destination address reply message, which will be described later (shown in FIG. 14).

In the case where the application group corresponds to the object ID, the object management server 20a specifies the application information of all the context-aware applications 30 included in this application group. In the case where the object management server 20a does not retain the above-mentioned corresponding relationship therein, the object management server 20a inquires about another object management server (in this case, the object management server 20b). All the object management servers including 20a and 20b are implemented on the network 2, as peers of peer-to-peer framework. That is, the object management servers are capable of forming a peer-to-peer network as represented by JXTA® or the like. Multiple object management servers are capable of forming a single and virtual object management server on the network 2. Thus, data managed in each object management server (which is the corresponding relationship, here) can be treated as the information managed in all the object management servers.

The sensor server 113a (113b) that has acquired the application information as described above selects the attribute information, and transmits the attribute information that the context-aware application 30 requires, to the report destination address. That is, the sensor server 113a (113b) realizes the transmitting unit 13 (shown in FIG. 12) that transmits to the report destination address that has been acquired from the retaining unit 21, with the use of an object detection message (shown in FIG. 15), which will be described later. The attribute information that the context-aware application 30 requires includes an attribute name, an attribute value thereof, and the like. Conditions responding to the attribute name and the attribute value are referred to as interest attribute 201-31, one example of which will be described later with reference to FIG. 7.

A detailed description will now be given of the detection information. As described above, the sensor server 113a (113b) acquires the attribute information, in addition to the object ID. The attribute information has been set in advance with the use of the sensing unit and the processing capability of the sensor server. The name of the attribute information is referred to as detection attribute name. The detection attribute name has been set in advance in the sensor server 113a (113b) as the attribute information that the sensor server needs to acquire. One example of the detection attribute name is shown in basic information 113-1 in FIG. 5. A detected value relevant to the detection attribute name is referred to as the attribute value. For example, in the sensor server 113a (113b) that is used in the teleconferencing system 100, the detection attribute name such as the number of participants, the place where the teleconferencing takes place (location), and the like can be set in advance. The sensor server 113a (113b) acquires the attribute value based on a given process that has been prepared for each detection attribute name. Fixed information such as location and the like can be registered in the sensor server 113a (113b) in advance. The detection information may include a date and time when the above-mentioned attribute value was detected and an expiration date of the detection information, as described later.

The context-aware application 30a has an application server 131a and a storage device 132a. In the same way, the context-aware application 30b has an application server 131b and a storage device 132b. The application server 131a (131b) includes an information-processing device such as a PC, a workstation, or the like. The storage device 132a (132b) has a built-in or external hard disk drive, a LAN file server, and various databases.

The detection information that has been transmitted from the sensor server 113a (113b) is received by the application server 131a (131b). That is, the application server 131a (131b) realizes the judging unit 31 that judges whether the above-mentioned information has been received from the sensor 10 (shown in FIG. 2). When the application server 131a receives the detection information, the application server 131a specifies an appropriate program 133b in the storage device 132b, and executes the program. That is, the application server 131a (131b) also realizes the program execution control unit 32 that executes a program for providing the service that is suitable for the situation (shown in FIG. 2).

According to the teleconferencing system 100 in this embodiment, in each meeting room α, a teleconferencing server 101a, a projector 102a, a screen 103a, a speaker 104a, and a camera or microphone 105a are installed. In the same way, in each meeting room β, a teleconferencing server 101b, a projector 102b, a screen 103b, a speaker 104b, and a camera or microphone 105b are installed. The teleconferencing server 101a (101b), for example, includes an information processing unit such as a PC, a workstation, or the like, and executes the program that has been downloaded from the context-aware application 30. When the application server 131a executes the downloaded program, the application server 131a downloads and pushes a program onto the teleconferencing server 101a (101b), and makes the teleconferencing server 101a (101b) execute the program. The program to be downloaded is a teleconferencing support program. The teleconferencing server 101a, in which the teleconferencing support program is being executed, realizes the environment for teleconferencing, by controlling the projector 102a, the speaker 104a, and the camera or microphone 105a. In the same way, the teleconferencing server 101b, in which the teleconferencing support program is being executed, realizes the environment for teleconferencing, by controlling the projector 102b, the speaker 104b, and the camera or microphone 105b.

A description will now be given of the teleconferencing concretely. The teleconferencing server 101a paketizes the image and sound that have been captured with the camera or microphone 105a, and transmits packets to the teleconferencing server 101b. In the same way, the teleconferencing server 101b paketizes the image and sound that have been captured with the camera or microphone 105b, and transmits packets to the teleconferencing server 101a. The teleconferencing server 101a (101b) receives and reassembles the packets, outputs the image on the projector 102a (102b), and outputs the sound to the speaker 104a (104b). The speaker 103a (104b) to which the sound has been inputted outputs the sound. Thus, the teleconferencing can be realized in the two meeting rooms α and β.

In the meeting rooms α, PCs 106a and 107a that the participants are able to use individually are installed. Each of 106a and 107a is capable of accessing a wireless base station 108a of a wireless LAN or the like. PC 3b that the participant B carries and PDA 3c that the participant C carries are also capable of accessing the wireless base station 108a. The wireless base station 108a is capable of functioning as a bridge on the network 2. Therefore, PCs 3b, 106a, and 107a and PDA 3c are capable of accessing the network 2. In the same way, in the meeting room β, PCs 106b and 107b that the participants are able to use individually are installed. Each of 106b and 107b is capable of accessing a wireless base station 108b of a wireless LAN or the like. PC 3e that the participant E carries and PDA 3f that the participant F carries are also capable of accessing the wireless base station 108b. The wireless base station 108b is capable of functioning as abridge on the network 2. Therefore, PCs 3e, 106b, and 107b and PDA 3f are capable of accessing the network 2. The application server 131b executes the program 133b to realize the context-aware application 30b. Then, the context-aware application 30b provides the function of supporting the teleconferencing with PCs 3b, 3e, 106a, 106b, 107a, 107b, and PDAs 3c and 3f. For example, what is provided is the function of projecting the image deployed on PC 106a onto the screens 103a and 103b from the projectors 102a and 102b. In addition, the context-aware application 30b is capable of downloading and pushing a given program onto the PCs 3b, 3e, 106a, 106b, 107a, 107b, and PDAs 3c and 3f and executing the program so as to realize another function.

The context-aware application 30a is capable of realizing the above-mentioned processes with the use of the function of RFC (Remote Procedure Call), for example. Here, the above-mentioned processes are the context-aware application 30a making the teleconferencing server 101a (101b) execute the teleconferencing program and the context-aware application 30a making PCs 3b, 3e, 106a, 106b, 107a, 107b, and PDAs 3c and 3f execute the given program.

The object management servers 20a and 20b manage history information that shows which the context-aware application 30 has utilized the detection information on which object 40. One example of this history information is shown in 201-4 in FIG. 6. The sensor server 113a (113b) notifies the object management server 20a (20b) of the object ID of the target object 40 and the report destination address of the context-aware application 30 having utilized the detection information. That is, the sensor server 113 has a reporting unit that reports the destination address (hereinafter simply referred to as reporting unit), which reports the context-aware application 30 that has transmitted the detection information, to the object management server 20. On the other hand, the object management server 20a (20b) has a receiving unit that receives the report of the destination address (hereinafter simply referred to as receiving unit), which receives the report from the context-aware application 30 that has transmitted the detection information from the sensor server 113. This is realized with the use of a destination address report message (hereinafter simply referred to as report message, shown in FIG. 16, and will be described later). When the object management server 20a (20b) receives the report message, the object management server 20a (20b) registers the report destination address corresponding to the object ID. At the same time, the date and time when the sensor server 113a (113b) transmits the detection information (a transmission date and time) may also be registered after corresponding to the object ID.

The sensor server 113 has a function of transmitting e-mail (electronic mail client function) to an owner of the target object 40. This function is used for notifying the owner of the object 40 of the information on the context-aware application 30 that has utilized the detection information of the object 40. The object management server 20a (20b) retains the corresponding relationship between the owner of the object ID and the e-mail address. This corresponding relationship has a data structure as shown in the object 201-51 in FIG. 9. The sensor server 113a (113b), on a parallel with the transmission of the report message, inquires the management server 20a (20b) about the owner address corresponding to the target object ID. This inquiry is made with the use of an owner address request message (shown in FIG. 17). Then, the information on the context-aware application 30 is transmitted to the replied e-mail address from the object management server 20a (20b). The object management server 20a (20b), regarding the above-mentioned inquiry, replies the owner address with the use of an owner address reply message (shown in FIG. 18). When multiple context-aware applications 30 utilize the function, the sensor server 113a (113b) sends an e-mail including a list of the information on the context-aware application 30. For example, the sensor server 113a (113b) sends a list of the report destination addresses via e-mail. This e-mail is referred to as e-mail for report. In this way, the sensor server 113a (113b) realizes an owner address acquiring unit and a user address reporting unit. The owner address acquiring unit acquires the owner address corresponding to the target object ID, and the user address reporting unit reports information on the context-aware application 30 that has utilized the detection information, to the acquired owner address. On the other hand, the object management server 20 realizes an owner address notification unit that notifies of the owner address corresponding to the object ID, in response to the inquiry from the sensor server 113a (113b).

The functions of the sensor servers 113a and 113b, the object management servers 20a and 20b, and the application servers 131a and 131b can be realized with the use of, Java Servlet®, for example. The communication between the servers can be realized by exchanging XML-type (eXtensible Markup Language) messages, for example. The sensor servers 113a and 113b, the object management servers 20a and 20b, and the application servers 131a and 131b are respectively independent; therefore, messages can be exchanged between the servers.

Next, a description of the data structure processed by the above-mentioned servers will now be given, with reference to the drawings. The sensor servers 113a and 113b will hereinafter simply be referred to as the sensor server 113. The object management servers 20a and 20b will hereinafter simply be referred to as the object management server 20.

Figure 5:
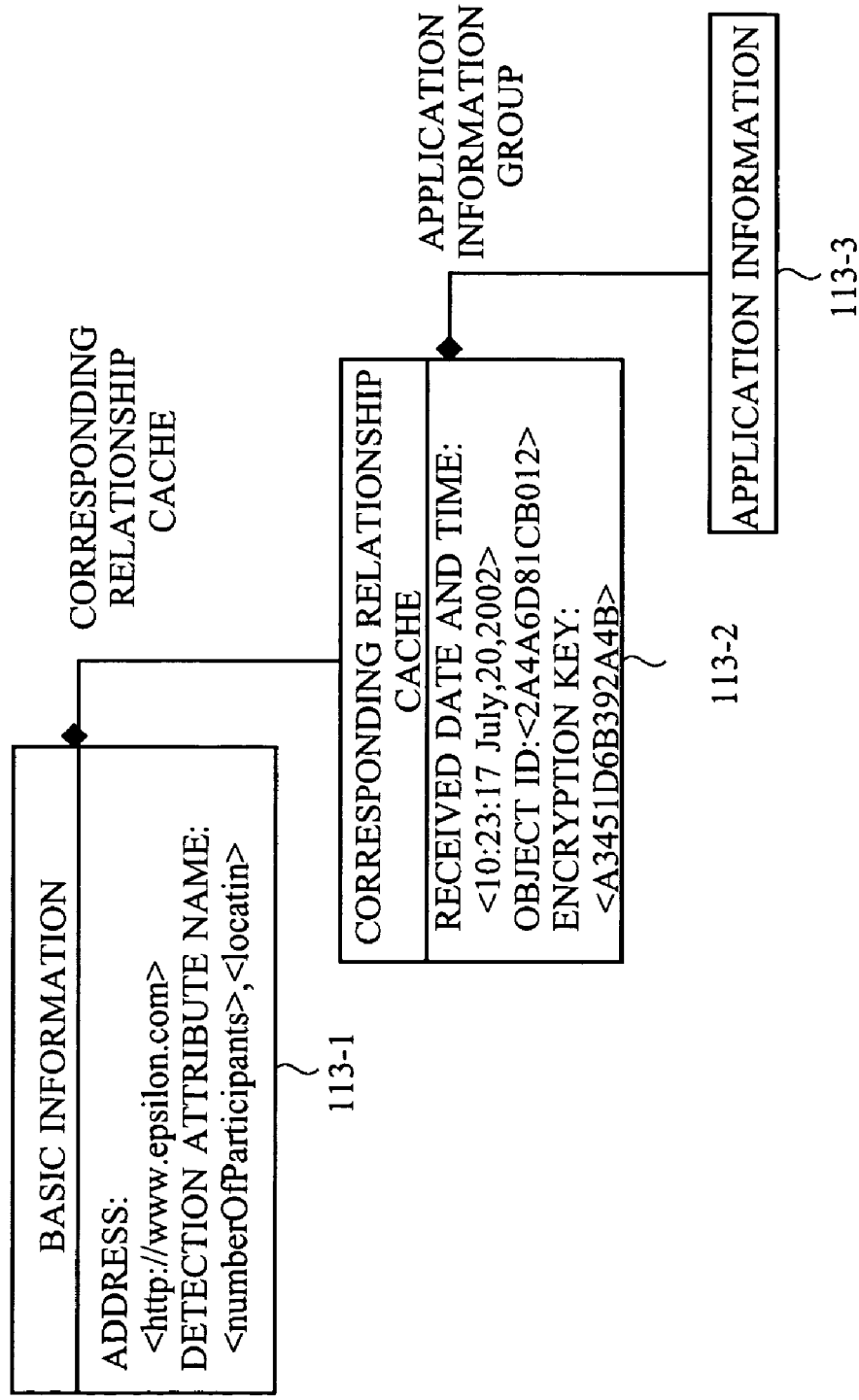
FIG. 5 schematically illustrates a data structure that is processed in a sensor server 113.

First, a description will now be given of the data structure that the sensor server 113 processes. FIG. 5 schematically illustrates the data structure that is processed in the sensor server 113. In the sensor server 113, the address on the network 2 and the detection attribute name have been set as the basic information 113-1 in advance. The sensor server 113 detects the attribute value of the attribute name that has been set in the detection attribute name. Various messages, which will be described later, are transmitted and received with the use of the address.

In the sensor server 113, retained is the information that has been acquired by receiving the report destination address reply message, from the object management server 20. More particularly, this information is retained as a corresponding relationship cache 113-2 in a cache memory. The application information 113-3 is dependent on each of the corresponding relationship cache 113-2. The application information 113-3 corresponds to each object ID. The corresponding relationship cache 113-2 includes a received date and time, the target object ID, and an encryption key included in the report destination address reply message. The application information 113-3 is the same as the application information 201-3 that will be described later; the detailed description is omitted here. The sensor server 113 abandons the corresponding relationship cache 113-2, when a given amount of time passes. Thus, the information can be kept fresh.

Next, a description will now be given of the data structure that the object management server 20 processes. FIG. 6 through FIG. 10 schematically illustrate the data structures that are processed in the object management server 20.

Figure 6:
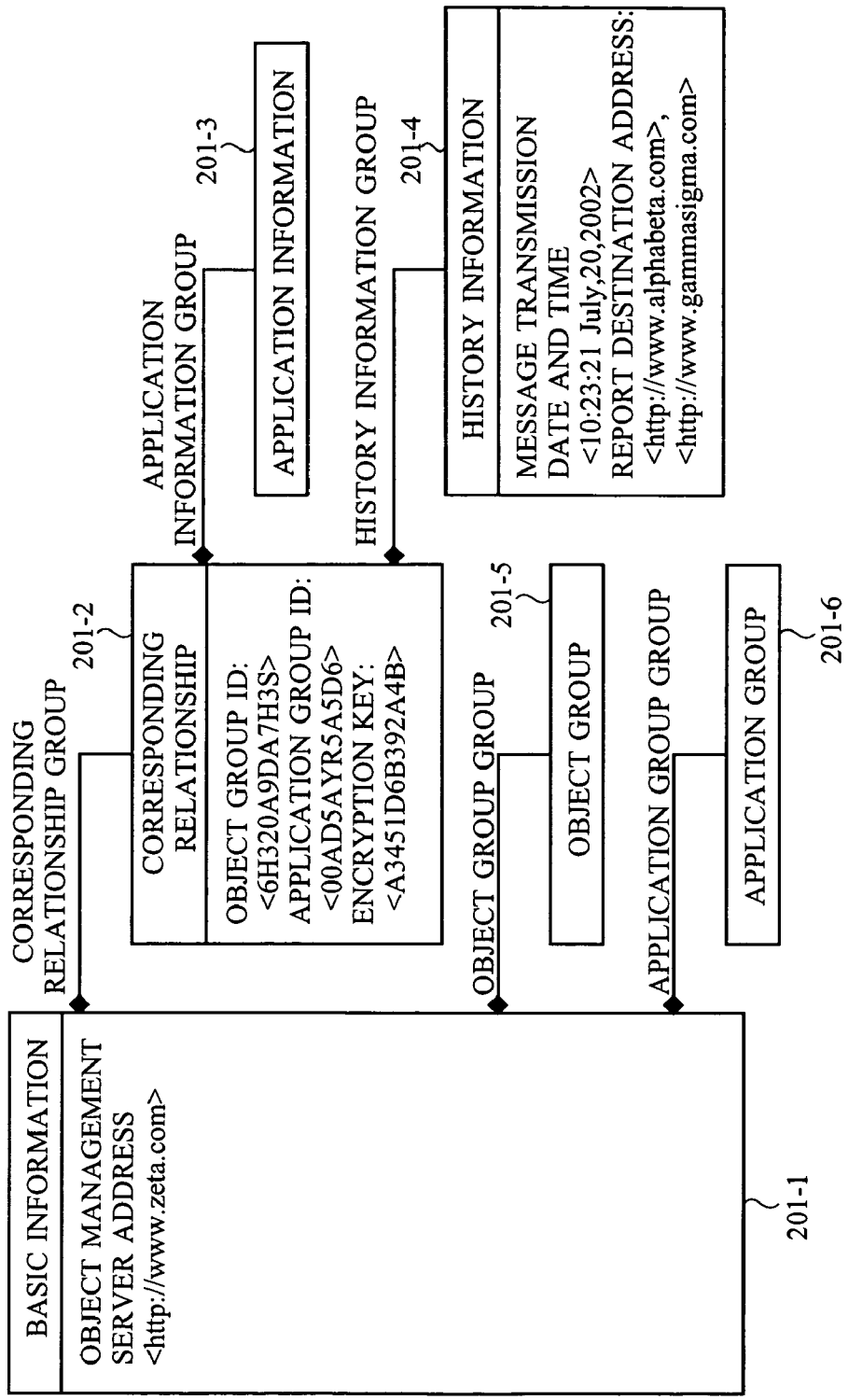
FIG. 6 schematically illustrates a data structure that is processed in an object management server 20.

First, as shown in FIG. 6, in the object management server 20, an object management server address has been set as the basic information 201-1 in advance. The object management server 20 transmits and receives the various messages, which will be described later, with the use of the object management server address.

Figure 7:
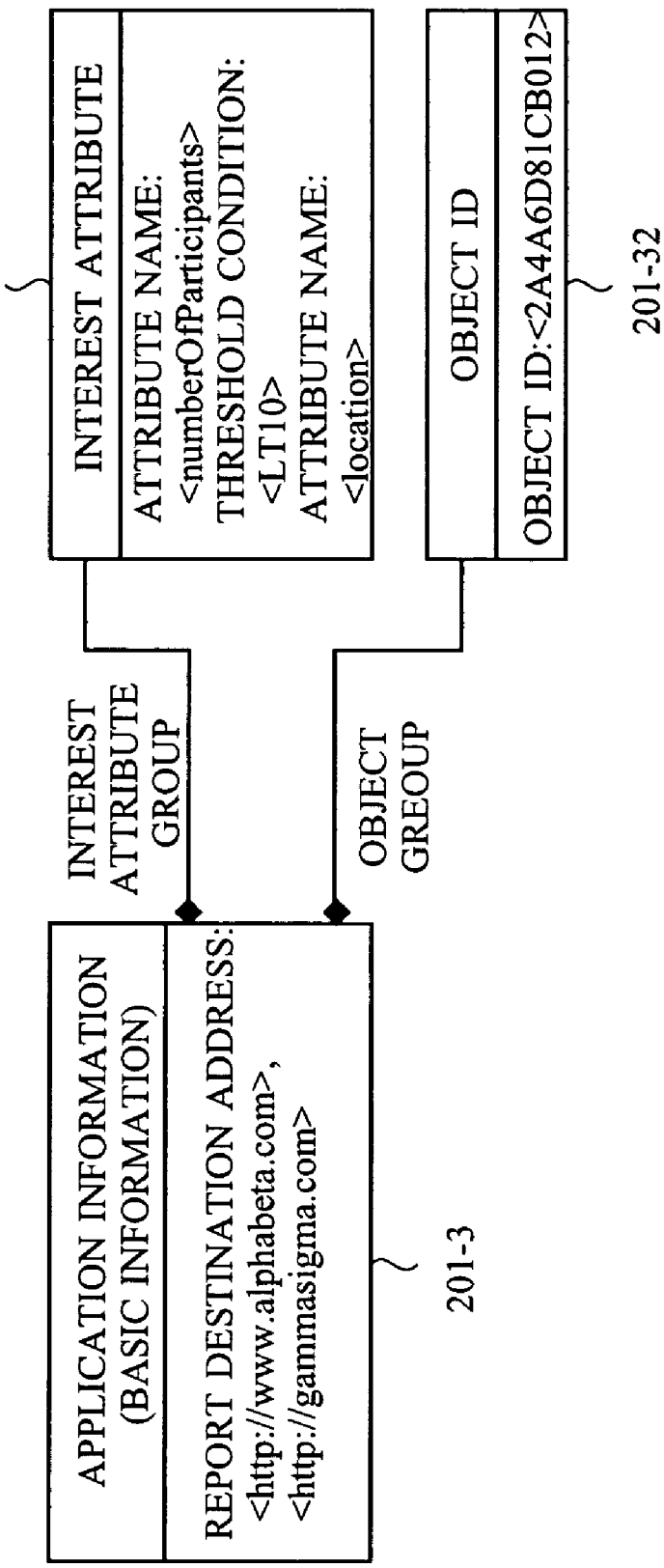
FIG. 7 schematically illustrates the data structure of application information 201-3 shown in FIG. 6.

In the object management server 20, retained is the corresponding relationship 201-2 between the object ID and the context-aware application 30. One or more pieces of application information 201-3 corresponding to each object ID and the history information 201-4 of each object ID are dependent on each corresponding relationship 201-2. The corresponding relationship 201-2 includes an object group ID including the target object ID, an application group ID corresponding to the object group ID, and the decryption key for decrypting the detection information. In the case of a single object ID, the object ID is employed instead of the object group ID. In the case where a single context-aware application 30 corresponds to the object ID, the information on the application group ID is omitted. The application information 201-3 is shown in FIG. 7. The history information 201-4 includes a message transmission date and time and the report destination address. The message transmission data and time shows the date and time when the sensor server 113 reported the detection information to the context-aware application 30. The report destination address is the address for reporting to the context-aware application 30. That is, the object management server 20 has a history information accumulating unit. This history information accumulating unit 30 accumulates the information of the context-aware application that has transmitted the detection information.

Figure 9:
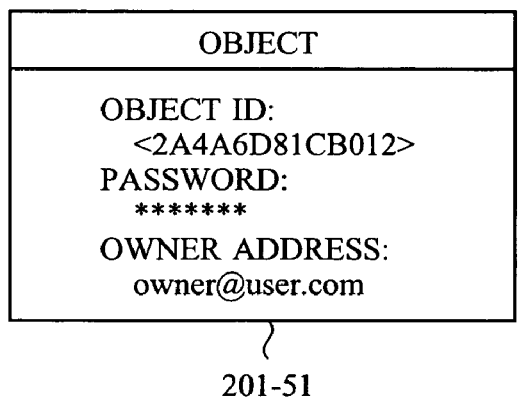
FIG. 9 schematically illustrates the data structure of an object 201-51 shown in FIG. 8.

In addition, the object management server 20 retains the object group 201-5 and the application group 201-6. The object group 201-5 is shown in FIGS. 8 and 9, and the application group 201-6 is shown in FIG. 10.

A description will now be given of the application information 201-3, with reference to FIG. 7. The application information 201-3 includes a report destination address of the context-aware application 30 in the basic information. In this basic information, an interest attribute 201-31 and an object ID 201-32 are dependent. The interest attribute 201-31 includes an attribute name and a threshold condition of the attribute value. The attribute name is a name of the attribute information that each of the context-aware application 30 requires. The object ID 201-32 includes the object ID of the detection target of the context-aware application 30.

Further, a description will now be given of the object group 201-5, with reference to FIG. 8. The object group 201-5 includes an object group ID and an object group name. The object group ID is uniquely identifies the object group, and the object group name is given to the object group. In this basic information, dependent is the information on the object 40 (the object 201-51) that are registered as a member of the object group. A description will now be given of the object 201-51, with reference to FIG. 9. The object 201-51 includes the target object ID, a password, and an owner address. The password has been set in advance by the owner or the like of the object 40, and the owner address is an e-mail address of the owner.

A description will now be given of an application group 201-6, with reference to FIG. 10. The application group 201-6 includes an application group ID and an application group name in the basic information. The application group ID uniquely identifies the application group, and the application group name is given to the application group ID. In this basic information, the application information 201-61 is dependent. The data structure of the application information 201-61 is same as the above-described application information 201-3.

Figure 11:
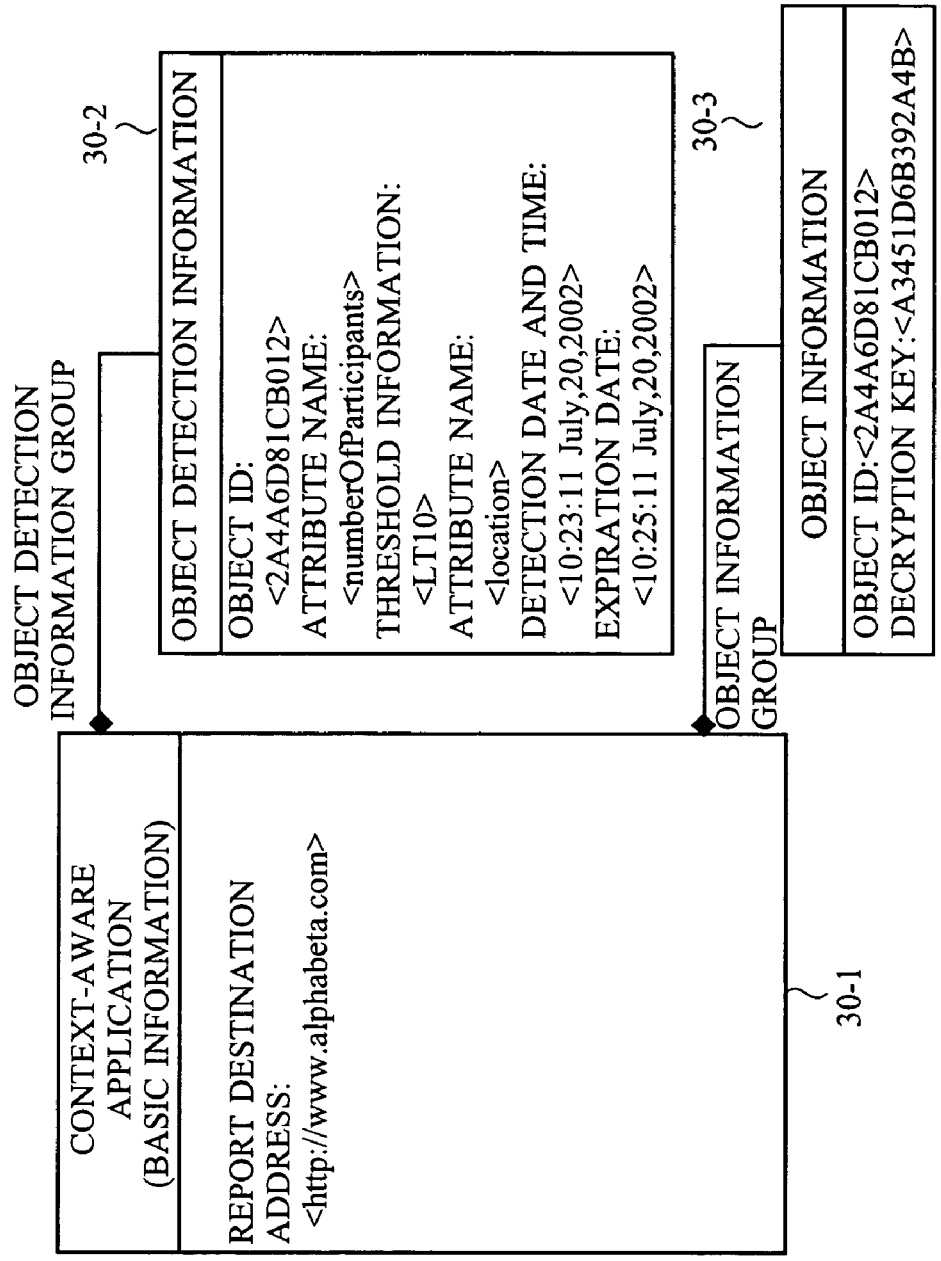
FIG. 11 schematically illustrates a data structure that is processed by the context-aware application 30 according to the first embodiment.

Next, a description will now be given of the data structure that the application servers 131a and 131b process. In the description below, the process made by every context-aware application 30 will be focused on. FIG. 11 schematically illustrates the data structure that is processed by the context-aware application 30. In the context-aware application 30, the report destination address has been set as basic information 30-1. The context-aware application 30 transmits and receives various messages that will be described later, with the report destination address.

In the context-aware application 30, retained are object detection information 30-2 and object information 30-3. The object detection information 30-2 is acquired by receiving the object detection message from the sensor server 113. That is, the context-aware application 30 has an object information accumulating unit. This object information accumulating unit accumulates the detection information. Object information 30-3 includes information on the object 40, which is a detection target of the object information 30-3. The object detection information 30-2 includes the object ID of the target object, the attribute name, the threshold condition of the attribute name to the attribute value, detection date and time, and the expiration date of the object detection information. The attribute name is the name of attribute information that the object detection information 30-3 requires. The detection date and time define the date and time when the sensor server 113 detected the object 40. The object information 30-3 includes the object ID of the object 40 and a decryption key. The object 40 is the detection target of the context-aware application 30. The decryption key is used for decrypting the detection information on the object 40. That is, the context-aware application 30 has a decryption key retaining unit that retains the decryption key for decrypting the detection information that has been received from the sensor server 113.

A description will now be given on the message transmitted and received between servers, with reference to drawings.

Figure 12:
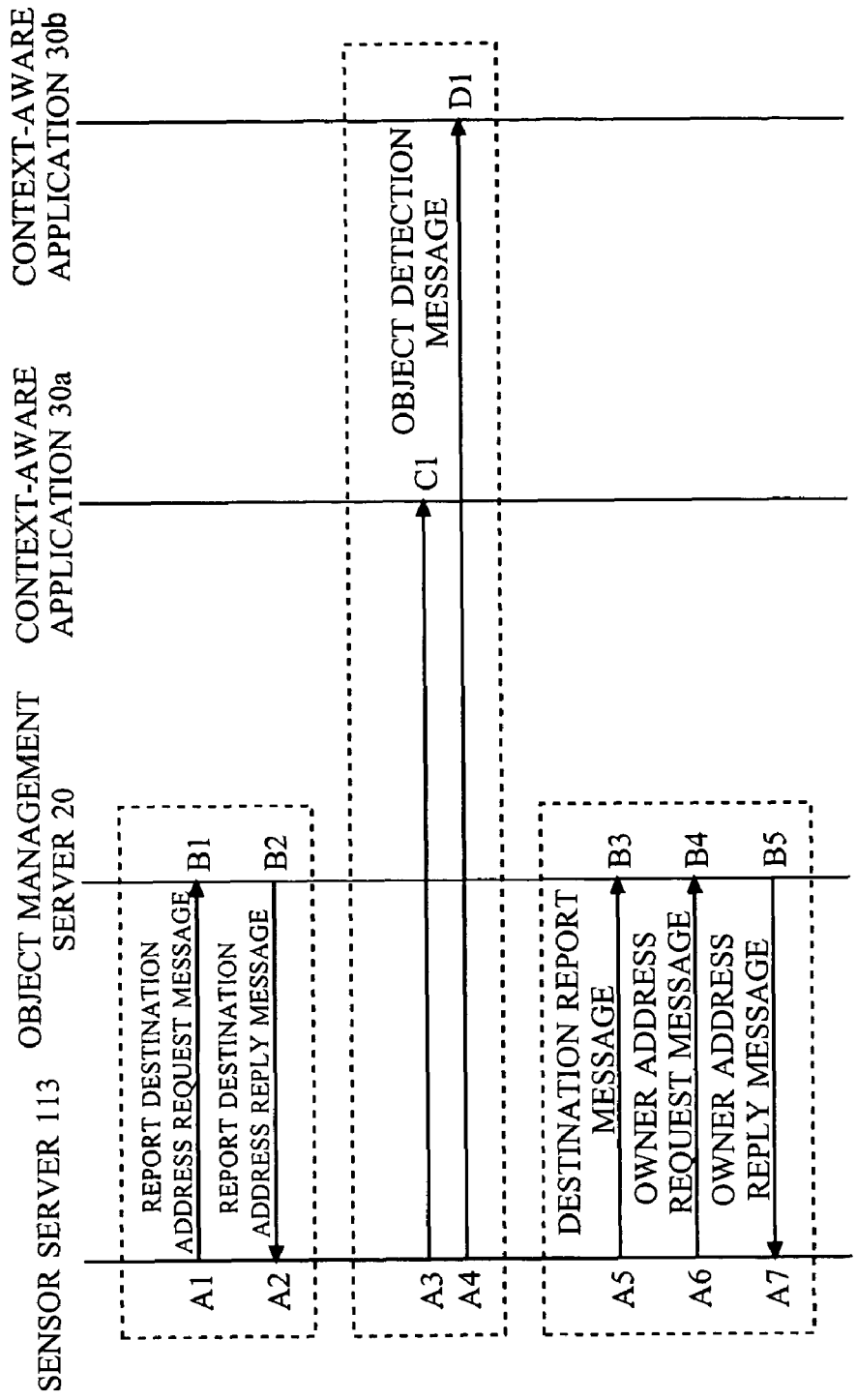
FIG. 12 illustrates a communication sequence of a sensor server 113, an object management server 20, the context-aware applications 30a and 30b according to the first embodiment.

Referring to FIG. 12, a communication sequence of a sensor server 113, an object management server 20, the context-aware applications 30a and 30b. When the object ID is detected, the sensor server 113 creates a report destination address request message in order to inquire about the context-aware application 30 corresponding to the detected object ID, and then transmits the message to the object management server 20 (A1→B1), as shown in FIG. 5. An example of the report destination address request message is shown in FIG. 13.

As shown in FIG. 13, the report destination address request message is described in XML format, for example. In this format, included are a message ID (<msgid> tag), a message type (<msgtype> tag), an object ID (<objectid> tag), a message transmission date and time (<datetime> tag), and a reply address (<reply-to> tag). The message ID (<msgid> tag) is used for uniquely identifying the message. The message type (<msgtype> tag) defines that this is a report destination address request message. The object ID (<objectid> tag) defines the detected object ID. The message transmission date and time (<datetime> tag) defines the date and time when the message was transmitted. The reply address (<reply-to> tag) defines the address of the sensor server 113, which is the replay address.

When the object management server 20 receives the above-mentioned report destination address request message, the object management server 20 decides a process to be executed thereon, based on the message type, and identifies the requested information (application information) according to the object ID. Then, the object management server 20 creates a report destination address reply message in order to provide the application information corresponding to the target object ID, and transmits to the sensor server 113 (B2→A2). An example of the report destination address reply message is shown in FIG. 14.

As shown in FIG. 14, the report destination address reply message is described in XML format, for example. In this format, included are a message ID (<msgid> tag), a message type (<msgtype> tag), a message ID to be responded (<response_for> tag), an object ID (<objectid> tag), a message transmission date and time (<datetime> tag), and an application list (<applist> tag). The message ID (<msgid> tag) is used for uniquely identifying the message. The message type (<msgtype> tag) defines that this is a report destination address request message. The message ID to be responded (<response_for> tag) defines that this is a report destination address reply message. The object ID (<objectid> tag) defines the target object ID. The message transmission date and time (<datetime> tag) defines the date and time when the message was transmitted. The application list (<applist> tag) defines a list of application information 201-3 (shown in FIG. 6), which corresponds to the object IDs. This application list is composed of a group of the report destination address (<address> tag), an encryption (<cryptkey> tag), and a transmission condition (<interests> tag). Those tags are included in each piece of the application information 201-3. In other words, the application list is composed of a group of the application information 201-3. The report destination address is the report destination address of the context-aware applications 30*a* and 30*b*. The encryption key is used for encrypting the detection information. The transmission condition is composed of an attribute name (<prop> tag) and a threshold condition (<threshold> tag). The attribute name (<prop> tag) is included in the interest attribute 201-31 (shown in FIG. 7) of the context-aware applications 30*a* and 30*b*. The threshold condition (<threshold> tag) defines the condition that the context-aware application 30*a* and 30*b* request for the attribute value acquired for every attribute name. For example, in the case where the attribute name is the number of participants (<numberOfParticipants>), the threshold condition may be set to the upper limit of the number of participants (LT10 equals to up to 10 participants); however, the threshold condition needs not always be set.

When the sensor server 113 receives the report destination address reply message, the sensor server 113 checks the transmission condition, first of all. Then, the sensor server 113 creates an object detection message in order to report the detection information to the context-aware application 30, and transmits the message to the appropriate context-aware applications 30*a* and 30*b* (A3→C1, A4→D1). An example of the object detection message is shown in FIG. 15.

As shown in FIG. 15, the object detection message is described in XML format, for example. In this format, included are a message ID (<msgid> tag), a message type (<msgtype> tag), an object ID (<objectid> tag), a message transmission date and time (<datetime> tag), a sensor ID (<sensorid> tag), and a detection information (<senseddata> tag). The message ID (<msgid> tag) is used for uniquely identifying the message. The message type (<msgtype> tag) defines that the message is an object detection message. The object ID (<objectid> tag) defines the object ID of the target object 40. The message transmission date and time (<datetime> tag) defines the date and time when the message was transmitted. The sensor ID (<sensorid> tag) uniquely identifies the sensor 10 that has detected the object ID. The detection information (<senseddata> tag) is the detection information on the object 40 and the attribute information that the context-aware applications 30*a* and 30*b* require. The sensor server 113 encrypts data indicating the detection information (<senseddata> tag) and the content enclosed within the <senseddata> tags) in advance in order to create the object detection message.

In addition, the sensor server 113 transmits the object detection message, then creates a report message that reports the destination address in order to report the context-aware applications 30*a* or 30*b* that has reported the detection information, and transmits the report message to the object management server 20 (A5→B3). An example of the report message that reports the destination address is shown in FIG. 16.

As shown in FIG. 16, the report message that reports the destination address is described in XML format, for example. In this format, included are a message ID (<msgid> tag), a message type (<msgtype> tag), an object ID (<objectid> tag), a message transmission date and time (<datetime> tag), a sensor ID (<sensorid> tag), and an application list of destination address (<sendedappa> tag). The message ID (<msgid> tag) is used for uniquely identifying the message. The message type (<msgtype> tag) defines that the message is a report message that reports the destination address. The object ID (<objectid> tag) defines the target object ID. The message transmission date and time (<datetime> tag) defines the date and time when the message was transmitted. The application list of destination address (<sendedappa> tag) is composed of a (<sendeddatetime> tag) and a report destination address (<applications> tag). The (<sendeddatetime> tag) defines the date and time when the object detection message was transmitted. The report destination address (<applications> tag) defines the report destination address that the context-aware applications 30*a* or 30*b* has reported.

The sensor server 113, as shown in FIG. 12, creates and transmits the destination address report message that reports the destination address, and at the same time, also creates an owner address request message in order to inquire about e-mail address of the owner of the target object 40, and transmits the message to the object management server 20 (A6→B4). An example of the owner address request message is shown in FIG. 17.

As shown in FIG. 17, the owner address request message is described in XML format, for example. In this format, included are a message ID (<msgid> tag), a message type (<msgtype> tag), an object ID (<objectid> tag), a message transmission date and time (<datetime> tag), and a reply address (<reply-to> tag). The message ID (<msgid> tag) is used for uniquely identifying the message. The message type (<msgtype> tag) defines that the message is an owner address request message. The object ID (<objectid> tag) defines the target object ID. The message transmission date and time (<datetime> tag) defines the date and time when the message was transmitted. The reply address (<reply-to> tag) defines the address of the sensor server 113 that is the reply address.

The object management server 20, after receiving the above-mentioned owner address request message, as shown in FIG. 12, creates an owner address reply message in order to reply the owner address corresponding to the target object ID, and transmits the message to the sensor server 113 (A7→B5). An example of the owner address reply message is shown in FIG. 18.

As shown in FIG. 18, the owner address reply message is described in XML format, for example. In this format, included are a message ID (<msgid> tag), a message ID to be responded (<response_for> tag), an object ID (<objectid> tag), a message transmission date and time (<datetime> tag), and an owner address (<address> tag). The message ID (<msgid> tag) is used for uniquely identifying the message. The message type (<msgtype> tag) defines that the message is an owner address request message. The message ID to be responded (<response_for> tag) defines a message ID of the owner address request message to be responded to. The object ID (<objectid> tag) defines the target object ID. The message transmission date and time (<datetime> tag) defines the date and time when the message was transmitted. The owner address (<address> tag) defines the e-mail address that is associated with the object ID.

Then, the sensor server 113 creates e-mail for report a list of the context-aware applications 30*a* and 30*b* that have utilized the detection information, and transmits the e-mail to the owner address included in the above-mentioned owner address reply message. Specifically, the sensor server 113 creates e-mail including a list of report destination address and the reported date and time, and transmits the e-mail to the owner address.

Next, a description will now be given of the operation of each server, with reference to the drawings. First, the operation of the sensor server will be described. The sensor server 113 resides on the network 2.

Figure 19:
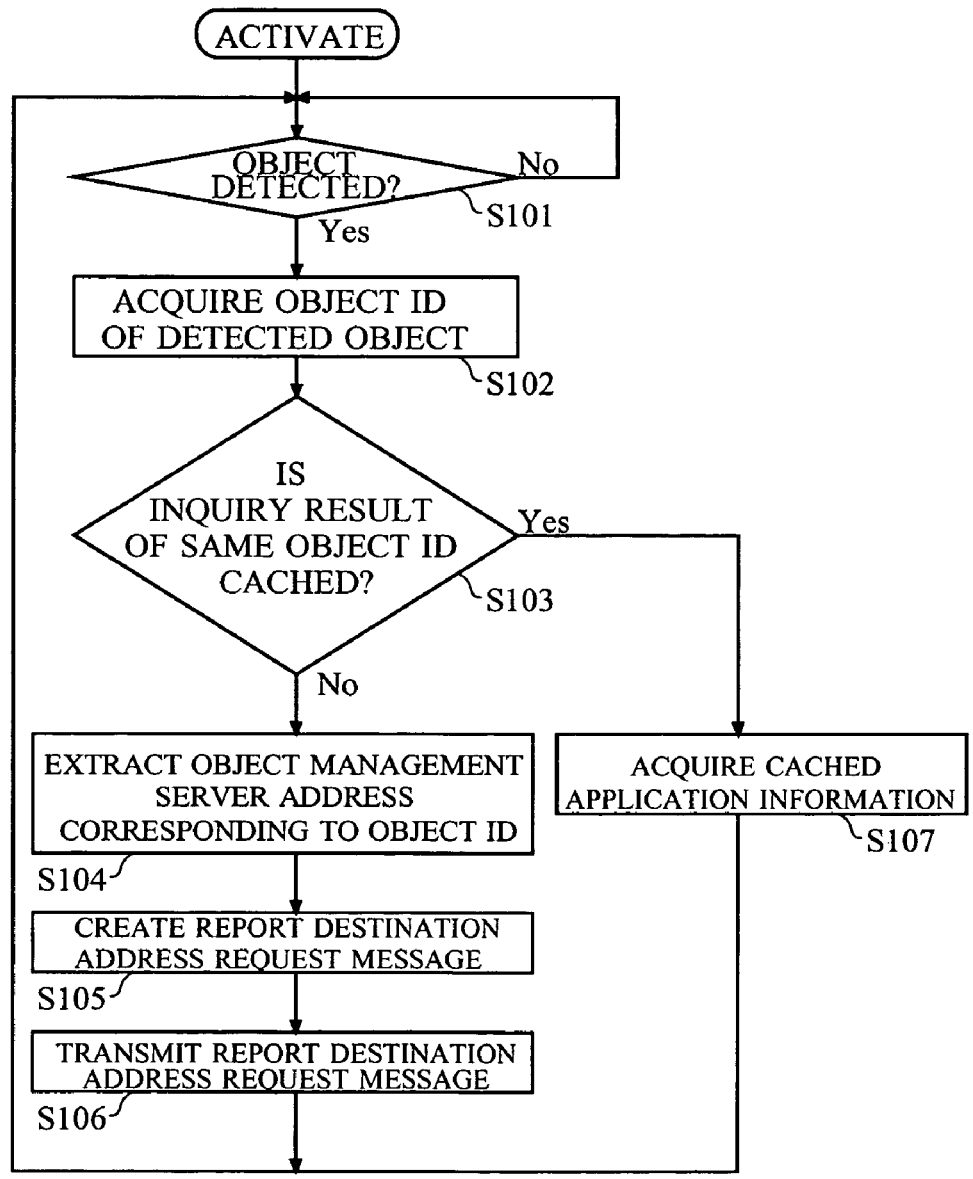
FIG. 19 is a flowchart showing the operation of a sensor server 113, when the sensor server 113 detected that the object 40 was existent within a given area, according to the first embodiment.

FIG. 19 is a flowchart showing the operation of the sensor server 113, when the sensor server 113 detected that the object 40 was existent within a given area. This operation is carried out with a process or the like that reside on the sensor server 113.

As shown in FIG. 19, the sensor server 113 emits electric waves regularly or as necessary to monitor the existence of the object 40 (step S101). If the object 40 is detected (Yes in step S101), the sensor server 113 obtains the object ID from the target object 40 (step S102). Then, the sensor server 113 refers to the cache memory thereof to learn whether the inquiry about the same object has been made within a certain period of time (step S103). In other words, the sensor server 113 learns whether the corresponding relationship cache 113-2 (shown in FIG. 5) regarding the same object ID has been cached, in order to make a decision.

As one decision result of step S103, if an inquiry has been made (Yes in step S113), the sensor server 113 obtains the application information 113-3 from the corresponding relationship cache 113-2 that has been cached (step S107), and returns to the step S101. As the other decision result of step S103, if an inquiry has not been made (No in step S113), the sensor server 113 extracts the address of the object management server from the obtained object ID (step S104). The sensor server 113 creates a report destination address request message (shown in FIG. 13) using the target object ID (step S105), and transmits the message to the address of the object management server from which the address has been extracted (step S106). Then the sensor server returns to the step S101.

Figure 20:
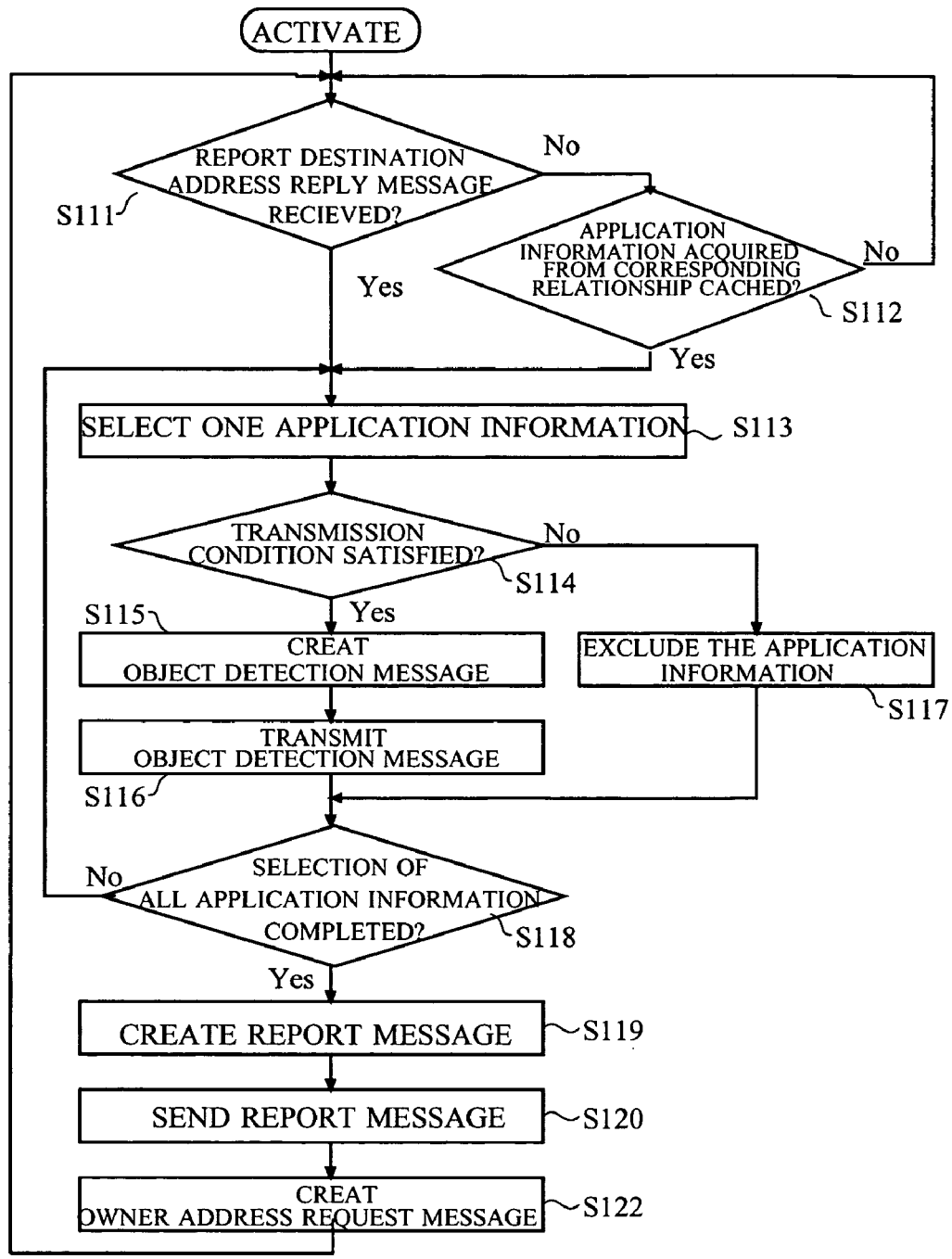
FIG. 20 is a flowchart showing the operation of the sensor server 113, when a report destination address reply message was received, as a reply to a report destination address request message, according to the first embodiment.
Figure 21:
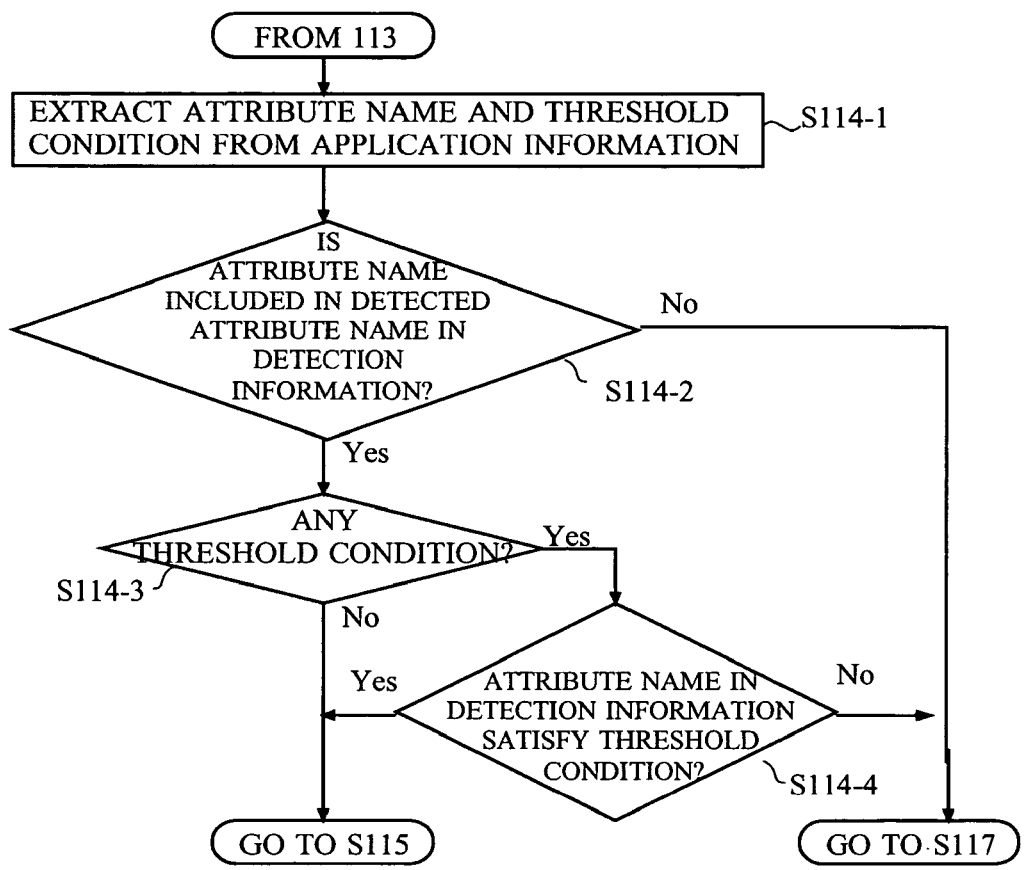
FIG. 21 is a flowchart showing step S114 in FIG. 20 in detail.
Figure 22:
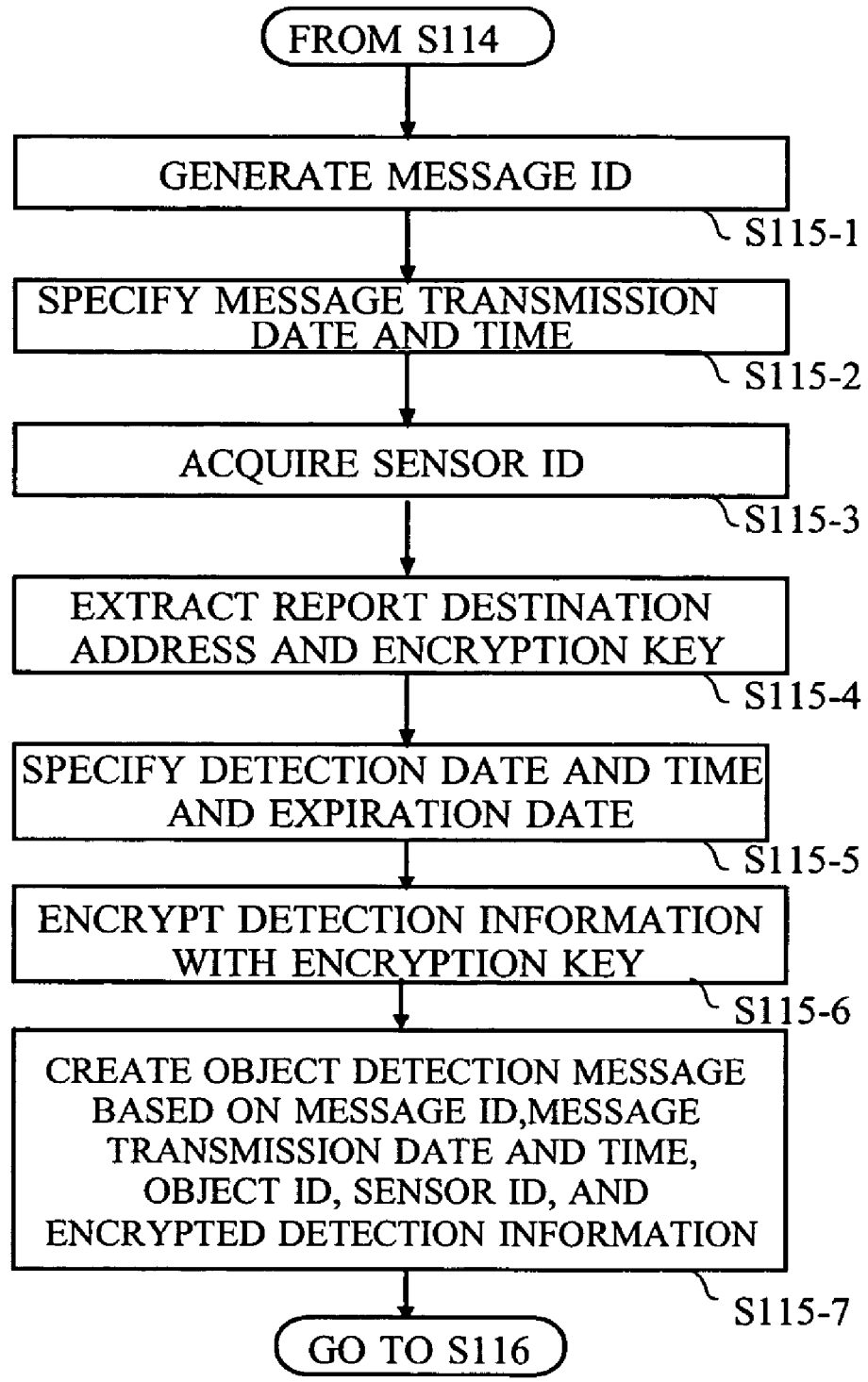
FIG. 22 is a flowchart showing step S115 in FIG. 20 in detail.

When the sensor server 113 receives the report destination address reply message (Shown in FIG. 14) to respond to the report destination address request message (shown in FIG. 13), the sensor server 113 performs the operation shown in FIGS. 20 through 22. This operation is performed by a process or the like that resides on the sensor server 113.

As shown in FIG. 20, the sensor server 113 monitors whether or not the report destination address reply message has been received (step S111) and whether or not the application information 113-3 has been obtained from the corresponding relationship cache 113-2 (step S112). If the report destination address reply message has been received (Yes in step S112), or if the application information 113-3 has been obtained from the corresponding relationship cache 113-2 (Yes in step S112), the sensor server 113 chooses one of the obtained pieces of application information (step S113).

The sensor server 113 extracts a transmission condition (the attribute name, the threshold condition, and the like) of the selected application information, compares the transmission condition with the detection information, and makes a decision on whether the transmission condition is satisfied (step S114). Step S114 is shown in FIG. 21.

As shown in FIG. 21, in step S114, the sensor server 113 extracts the attribute name and the threshold condition from the application information (step S114-1). Then, the sensor server 113 makes a decision whether the detected attribute name in the detection information includes the attribute name extracted in step S114-1 (step S114-2). The above-mentioned detection information has been detected by the sensor server 113. As one result of this decision, if the attribute name is included (Yes in step S114-2), the sensor server 113 makes a decision on whether there is a threshold condition on this attribute name (step S114-3). If there is no threshold condition (No in step S114-3), go to step S115 in FIG. 20. If there is a threshold condition (Yes in step S114-3), the sensor server 113 makes a decision on whether the attribute value included in the above-mentioned detection information satisfies the threshold condition (step S114-4). If the threshold condition is satisfied (Yes in step S114-4), go to step S115 in FIG. 20. If not (No in step S114-4), go to step S117 in FIG. 20. If the attribute name is not included (No in step S114-2), go to step S117 in FIG. 20.

Referring to FIG. 20 again, as a result of step S114, if the transmission condition is satisfied (Yes in step S114), the sensor server 113 creates an object detection message (shown in FIG. 15), based on the application information and the detection information (step S115), and transmits the message to the report destination address (step S116). Step S115 is shown in detail in FIG. 22. If not (No in step S114), the sensor server 113 excludes the application information (step S117) and goes to step S118.

As shown in FIG. 22, in step S115, first of all, the sensor server 113 generates a message ID to add to the object ID detection message (shown in FIG. 15). Then, the sensor server 113 acquires the current date and time from a clock thereof (step S115-3) and also acquires a sensor ID that has been assigned thereto in advance (step S115-3). Next, the sensor server 113 extracts the report destination address and the encryption key from the application information (step S115-4). The sensor server 113 specifies the detection date and time of the object 40 from the detection information, and also specifies an expiration date after a certain period of time since the detection (step S115-6). The sensor server 113 includes the detection date and time and the expiration date in the detection information, and encrypts the detection information with the use of an encryption key (step S115-6). In this case, the detection information to be utilized includes required minimum information of the above-mentioned extracted attribute name and the attribute value thereof. The sensor server 113 creates the object detection message, based on the message ID, the message transmission date and time, the object ID, the sensor ID, and the encrypted detection information (step S115-7).

Referring to FIG. 20 again, in step S115, the sensor server 113 creates the object detection message, and transmits the message to the report destination address (step S116). Then, the sensor server makes a decision on whether or not all the application information has been selected (step S118). If all the application information has been selected (Yes in step S118), the sensor server 113 creates a report message that reports the destination address (shown in FIG. 16) (step S119), and transmits the message to the object management server 20 (step S120). The sensor server 113 also creates an owner address request message (shown in FIG. 17) (step S121), and transmits the message to the object management server 20 (step S122). Then the sensor server 113 goes back to step S111. If not (No in step S118), go to step S113 to select unselected application information.

Figure 23:
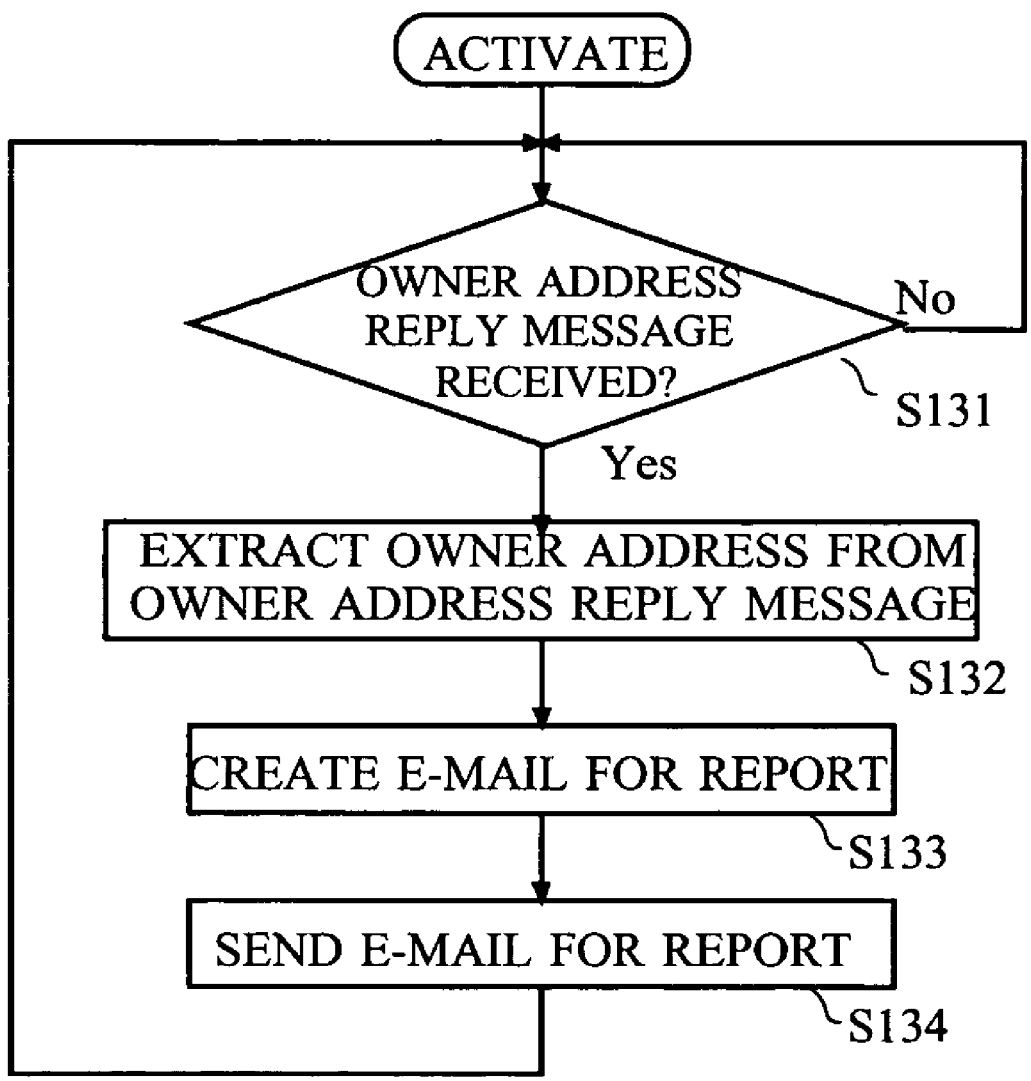
FIG. 23 is a flowchart showing the operation of the sensor server 113, when an owner address reply message was received, as a reply to an owner address request message, according to the first embodiment.

When the owner address reply message (shown in FIG. 18), which responds to the owner address request message (shown in FIG. 17), is received, the sensor server 113 executes the operation shown in FIG. 23. This operation is realized with a process or the like that resides on the sensor server 113.

Referring to FIG. 23, the sensor server 113 monitors whether or not the owner address reply message has been received (step S131). If the owner address reply message has been received (Yes in step S131), the sensor server 113 extracts the owner address from the received owner address reply message (step S132). Then, the sensor server 113 creates e-mail for report, based on the object ID and the report destination address (step S113), and transmits the message to the extracted owner address (step S134). The sensor server 113 goes back to step S131.

Next, a description will now be given of the operation of the object management server 20. The object management server 20 resides on the network.

Figure 24:
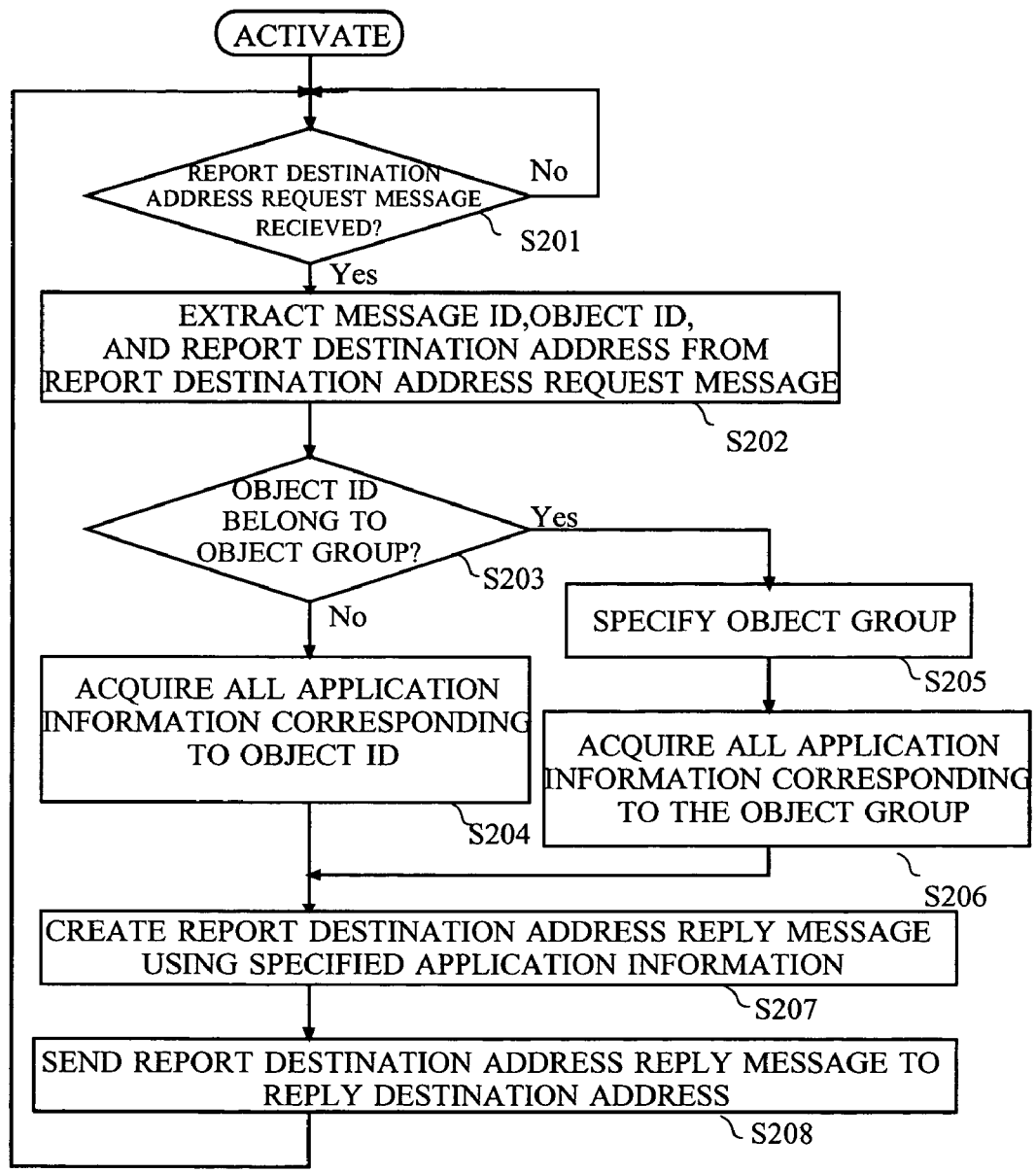
FIG. 24 is a flowchart showing the operation of the object management server 20, when a report destination address request message was received from the sensor server 113, according to the first embodiment.

FIG. 24 is a flowchart showing the operation of the object management server 20 according to the first embodiment, when a report destination address request message (shown in FIG. 13) is received from the sensor server 113. This operation is realized with a process or the like that resides on the object management server 20.

As shown in FIG. 24, the object management server 20 monitors whether or not the report destination address request message has been received (step S201). If the report destination address request message has been received (Yes in step S201), the object management server extracts the message ID, the object ID, and the reply address from the report destination address request message (step S202).

Then, the object management server 20 makes a decision on whether or not the extracted ID belongs to one of the object groups 201-5 (shown in FIG. 8) (in step S203). If the object ID belongs to one of the object groups 201-5 (Yes in step S203), the object management server 20 specifies the appropriate object group 201-5 (step S205), acquires all the application information 201-3 corresponding to the object groups 201-5 (step S206), and goes to step S207. If this object ID does not belong to any one of the object groups 201-5 (No in step S203), the object management server 20 acquires all the information that corresponds to the object ID (shown in FIG. 7) (in step S204), and goes to step S207.

In step S207, the object management server 20 creates the report destination address reply message (shown in FIG. 14) with the use of all the specified information (in step S207), and transmits to the extracted reply address (in step S208). The object management server 20, then, goes back to the step S201.

Figure 25:
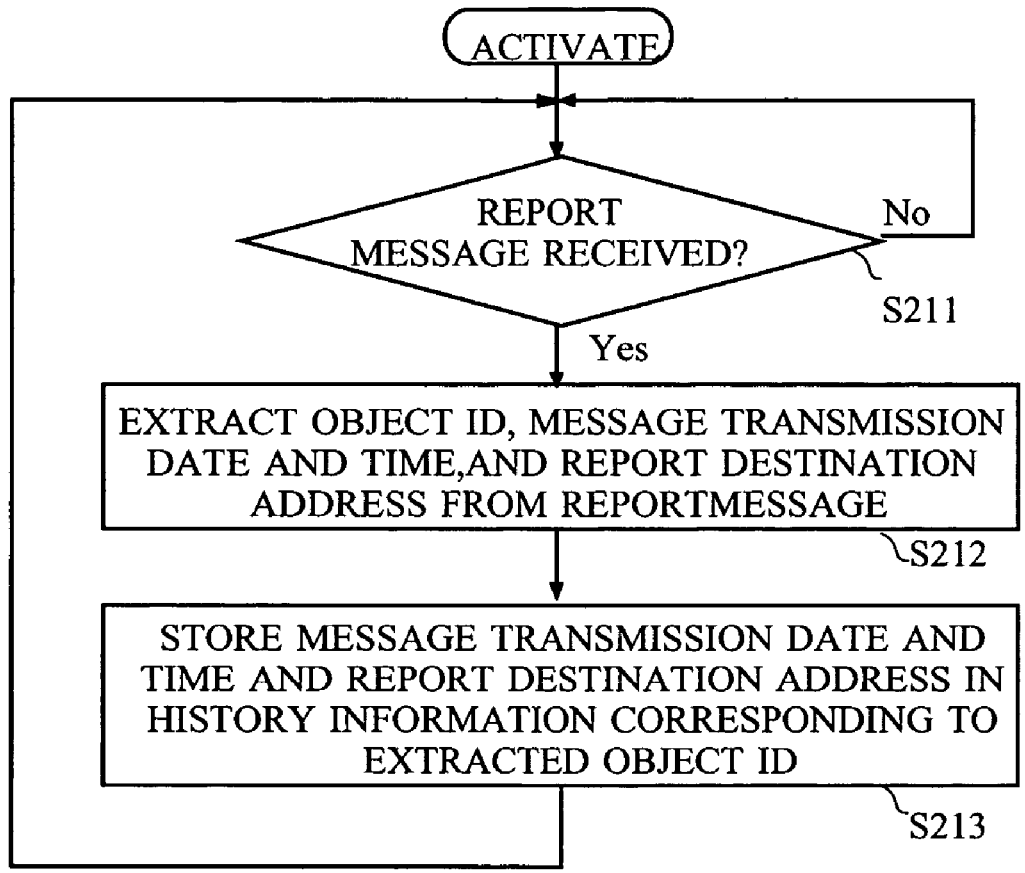
FIG. 25 is a flowchart showing the operation of the object management server 20, when a report destination address report message was received from the sensor server 113, according to the first embodiment.

When the report destination address report message that reports the destination address is received from the sensor server 113 (shown in FIG. 16), the object management server 20 executes the operation shown in FIG. 25. This operation is realized with the use of a process or the like that reside on the object management server 20.

As shown in FIG. 25, the object management server 20 monitors whether or not the report destination address report message has been received (step S211). If the report destination address report message has been received (Yes in step S211), the object management server 20 extracts the object ID, the message transmission date and time, and the report destination address from the report destination address report message (step S212). Then, the object management server 20 stores the message transmission date and time and the report destination address in history information (shown in FIG. 6) corresponding to the extracted object ID (step S213). The object management server 20 goes back to step S211.

Figure 26:
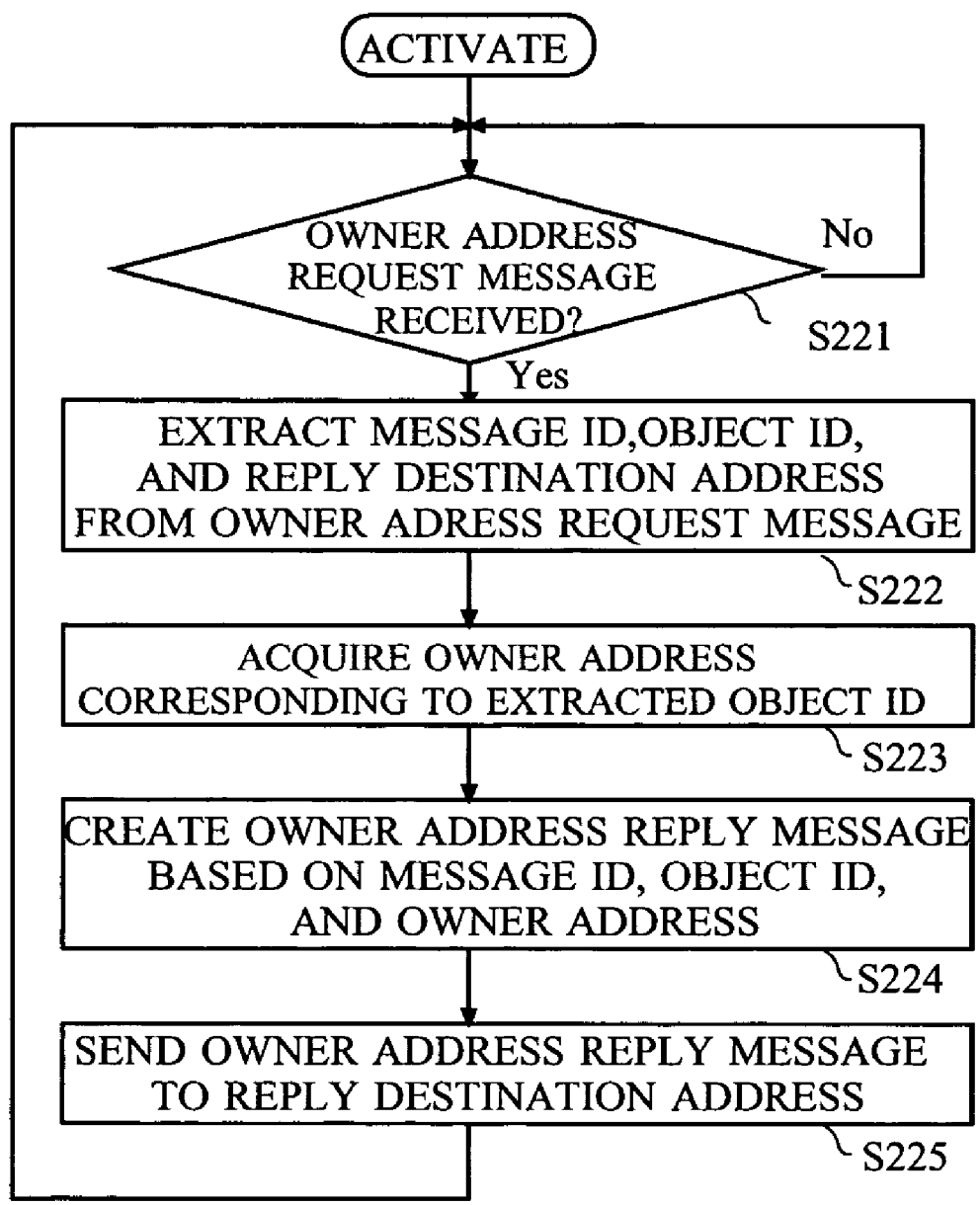
FIG. 26 is a flowchart showing the operation of the object management server 20, when an owner address request message was received from the sensor server 113, according to the first embodiment.

In addition, when the report destination address report message is received, the object management server 20 executes the operation shown in FIG. 26. This operation is realized with the use of a process or the like that resides on the object management server 20.

As shown in FIG. 26, the object management server 20 monitors whether or not the owner address request message has been received (step S221). If the owner address request message has been received (Yes in step S221), the object management server 20 extracts the message ID, the object ID, and the reply address from the owner address request message (step S222). Then, the object management server 20 refers to the object 201-5 (shown in FIG. 9), and obtains the owner address corresponding to the extracted object ID (step S223). The object management server 20 creates the owner address reply message (shown in FIG. 18), based on the message ID, the object ID, and the owner address (in step S224), and transmits the message to the extracted replay address (in step S225). The object management server 20 goes back to step S221.

Next, a description will now be given of the context-aware application 30. The context-aware application 30 includes application servers 131a and 131b that resides on the network.

Figure 27:
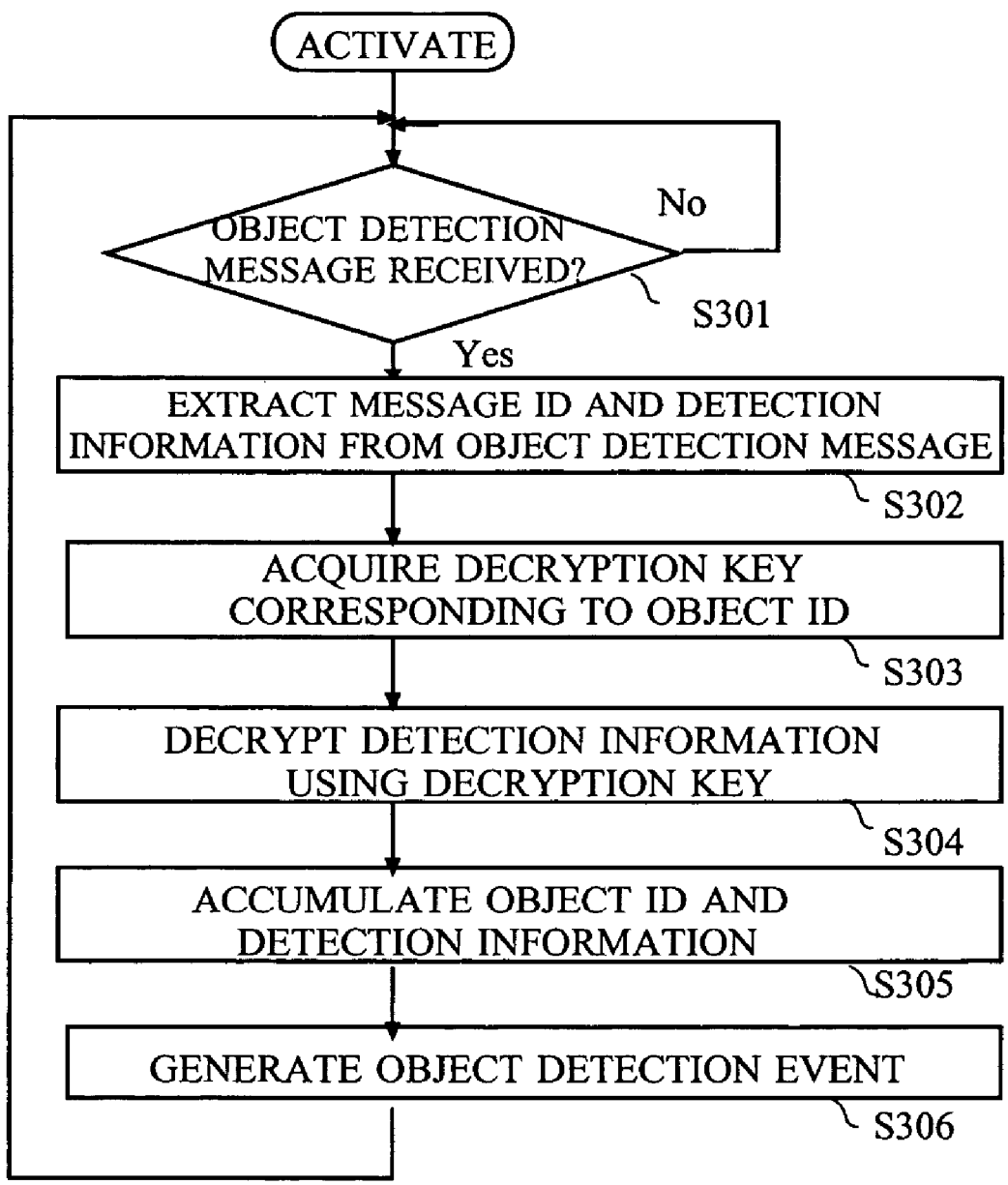
FIG. 27 is a flowchart showing the operation of the context-aware application 30, when an object detection message was received from the sensor server 113, according to the first embodiment.

FIG. 27 is a flowchart showing the operation of the context-aware application 30 according to the first embodiment, when the object detection message (shown in FIG. 15) is received from the sensor server 113. This operation is realized with the use of a process or the like that resides on the application servers 131a or 131b.

As shown in FIG. 27, the context-aware application 30 monitors whether or not the object detection message has been received (step S301). If the object detection message has been received (Yes in step S301), the context-aware application 30 extracts the object ID and the detection information from the object detection message (step S302).

Then, the context-aware application 30 refers to the object information 30-3 (shown in FIG. 11), based on the extracted object ID, and obtains a corresponding decryption key (in step S303). The context-aware application 30 decrypts the detection information with the use of the obtained decryption key (step S304).

The context-aware application 30 accumulates the object ID and the detection information as a new entry in the object detection information 30-2 (shown in FIG. 11), and generates an object detection event on a Java® platform (step S306). The context-aware application 30 goes back to step S301.

As described above, the generated object detection event is detected by event listeners that reside on application servers 131a and 131b. When the event listener detects the object detection event, the event listener inputs the newly entered detection information and information on the generated event into programs 133a and 133b. The above-mentioned operation will be described with reference to FIG. 28.

Figure 28:
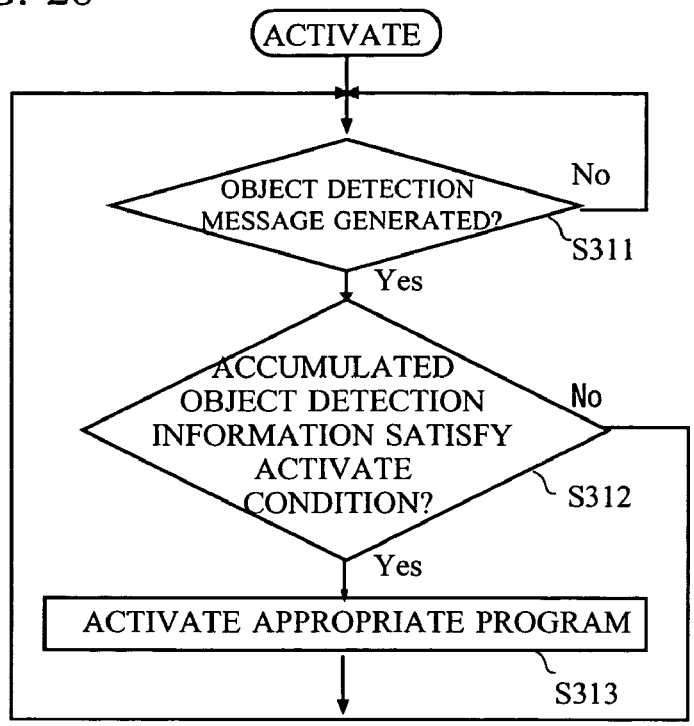
FIG. 28 is a flowchart showing the operation of application servers 131a and 131b, when an object detection event occurs, according to the first embodiment.

As shown in FIG. 28, the context-aware application 30 monitors the generation of the object detection event (step S311). This step is performed by the event listener. If the object detection event is generated (Yes in step S311), the context-aware application 30 refers to the object detection information 30-2 (shown in FIG. 11) regarding the object detection event, and makes a decision on whether the object detection information 30-2 satisfies an activation condition that has been set in advance (step S312). The activation condition may be the same as the above-mentioned transmission condition.

As a result of the decision of step S312, if the activation condition is satisfied (Yes in step S312), the context-aware application 30 activates an appropriate program (in step S313). Then, a function suitable for the situation of the object 40 is activated, and appropriate service is provided for the object 40. After step 313 is completed, the context-aware application 30 goes back to step S311.

The operation in FIG. 28 will be described with the operation of the teleconferencing system 100 in FIG. 3. In the case where participants A through F start a meeting separately in the meeting rooms α and β, a participant who is in the meeting room α (this participant is called participant A) designates other participants B through F who are going to attend the meeting, and then activates the teleconferencing system 100. The context-aware applications 30a and 30b activate the programs 133a and 133b according to the detection information sent from the sensor servers 113a and 113b. Then, the context-aware applications 30a and 30b download the teleconferencing support program and push the program onto the teleconferencing servers 101a and 101b. With the use of a function of RPC or the like, the program is activated and executed. Thus, the environment for teleconferencing in the meeting rooms α and β is realized. The example of this environment has been described above; therefore, the description is omitted here.

Figure 29:
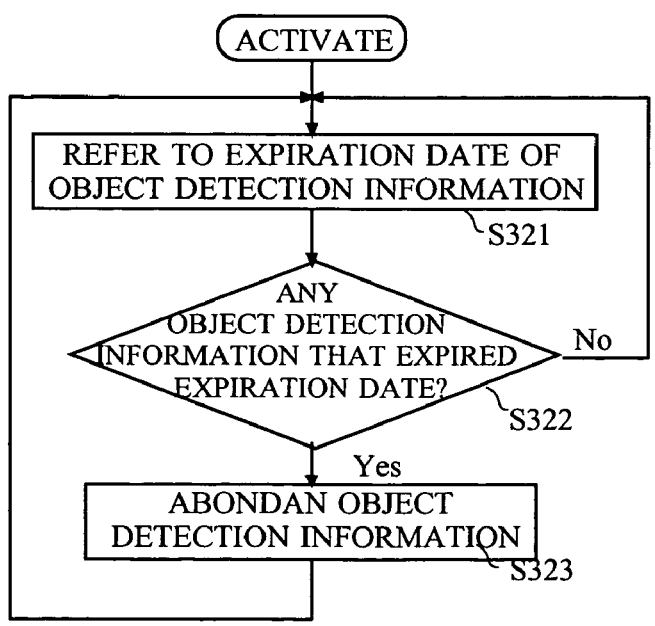
FIG. 29 is a flowchart showing the operation of the context-aware application 30, when the object detection information 30-2 whose expired expiration date is detected, according to the first embodiment.

FIG. 29 is a flowchart showing the operation of the context-aware application 30 (shown in FIG. 11), when the object detection information 30-2 whose expiration date has passed is detected. This operation is realized with the use of a process or the like that resides on the application servers 131a and 131b.

As shown in FIG. 29, the context-aware application 30 refers to the expiration date of the object detection information 30-2 regularly or as necessary (step S321), and makes a decision on whether or not the expired object detection information is existent (step S322). As a result of this decision, if there is an expired object detection information 30-2 (Yes in step S322), the context-aware application 30 abandons the relevant object detection information 30-2 (step S323). Then, the context-aware application 30 goes back to step S321.

The above-mentioned corresponding relationship 201-2 (shown in FIGS. 6 and 7), the object group 201-5 (shown in FIGS. 8 and 9), and the application group 201-6 (shown in FIG. 10) are registered in the object management server 20 with the use of each display screen as described below. Each display screen described below is displayed on the monitor of the object management server 20 or a PC monitor or the like that has remotely logged into the object management server 20. An operator resisters, edits, and deletes the corresponding relationship 201-2, the object group 201-5, and the application group 201-6. The operator, who is also called a registrant inputs required items on each display screen, with the use of an inputting unit installed on the object management server 20 or an inputting unit installed on the PC or the like that has remotely logged into.

FIG. 30 illustrates an edit screen of the corresponding relationship 20-1 in order to edit the corresponding relationship 201-2. As shown in FIG. 30, the edit screen of the corresponding relationship 20-1 has two edit boxes. One is for inputting the object ID/object group name and the other is for inputting the report destination address/application group name. The registrant fills in those edit boxes, the object ID (ID number) or the object group name and the report destination address or application group name. When a password for the object ID or the object group is already set, the registrant inputs the password in a password text box, and click OK. Thus, a new corresponding relationship has been registered in the object management server 20. In this embodiment, each object ID is assigned to one object group. For example, set an asterisk "*" for a wild card. If * is inputted in the object ID edit box, the object management server automatically assigns all object IDs to the object group.

In the case where a report destination address or an application group 201-6 newly corresponds to the registered object group 201-5, the registrant is able to click "SELECT GROUP NAME" button 20-11. When the "SELECT GROUP NAME" button 20-11 is clicked, an object group name select screen 21-1 appears on the monitor, as a pop-up menu, as shown in FIG. 31A.

Figure 31A:
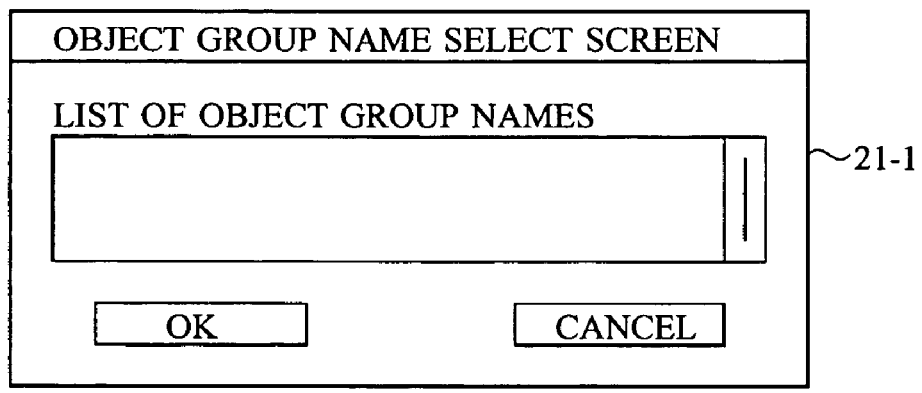
FIG. 31A illustrates an object group name select screen 21-1 according to the first embodiment.

As shown in FIG. 31A, the object group name select screen 21-1 displays a list box showing a list of the object group names. The registrant selects one from the list, and clicks OK. Thus, the desired object group name is displayed in the appropriate edit box on the edit screen of the corresponding relationship 20-1.

In the case where the registered application group 201-6 corresponds to the object ID or the object group 201-5, the registrant is able to click a "SELECT GROUP NAME" button 20-12. When the "SELECT GROUP NAME" button 20-12 is clicked, an application group name select screen 21-2 appears on the monitor, as a pop-up menu, as shown in FIG. 31A.

Figure 31B:
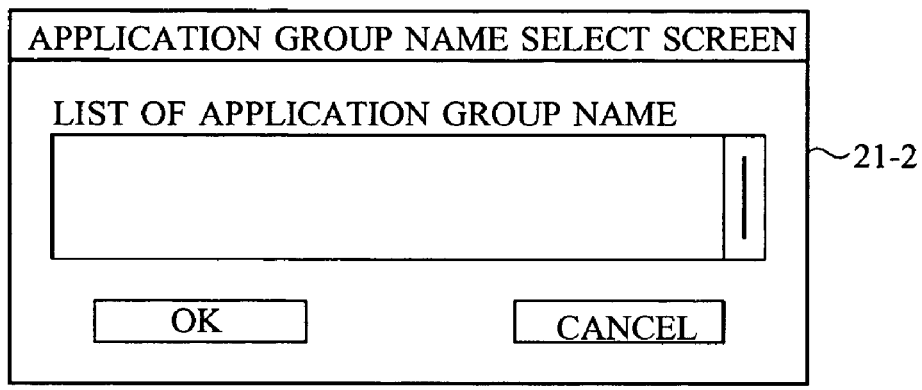
FIG. 31B illustrates an application group select screen 21-2 according to the first embodiment.

As shown in FIG. 31B, the application group name select screen 21-2 displays a list box showing a list of the application group names. The registrant selects one from the list, and clicks OK. Thus, the desired application group name is displayed in the appropriate edit box on the edit screen of the corresponding relationship 20-1.

In the case where the interest attribute 201-31 (shown in FIG. 7) regarding the above-selected report destination address or the application group 201-6 is set, the registrant clicks "DETAIL" button 20-13 in FIG. 30. Thus, an interest attribute set-up screen 21-3 appears on the monitor, as a pop-up menu, as shown in FIG. 31C.

Figure 31C:
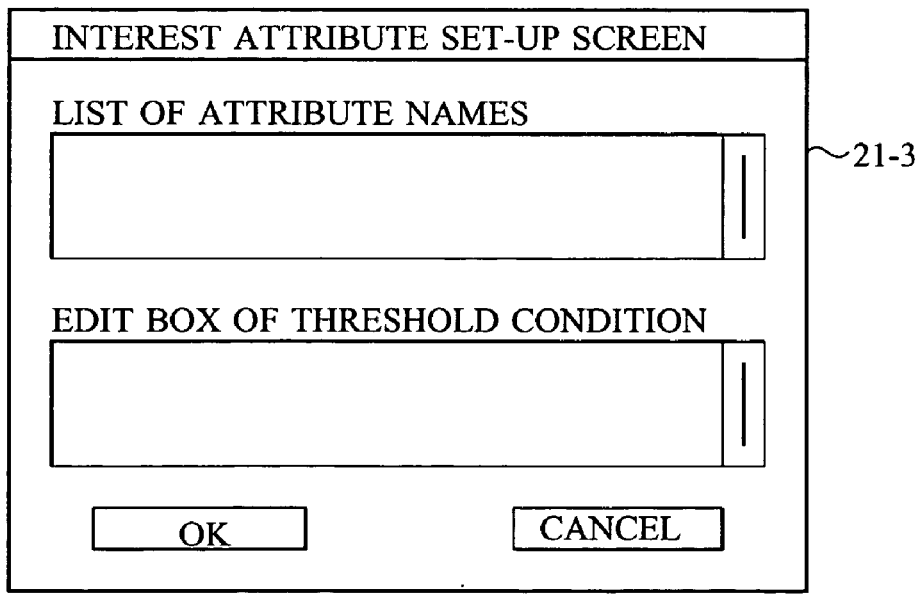
FIG. 31C illustrates an interest attribute set-up screen 21-3 according to the first embodiment.

As shown in FIG. 31C, the interest attribute set-up screen 21-3 displays a list of the attribute names and a threshold condition edit box. The list of the attribute names is displayed on a list box. The registrant selects one from the list, inputs the threshold condition as necessary, and clicks OK. Thus, the interest attribute 201-31 of the context-aware application 30 corresponding to the selected report destination address or the application group 201-6 has been set. What has been set to the object ID 201-32 shown in FIG. 7 is the object ID inputted on the edit screen of the corresponding relationship 20-1 shown in FIG. 30 or the object ID corresponding to the object group name. What has been set to the application information (basic information) 201-3 in FIG. 7 is the report destination address inputted on the edit screen of the corresponding relationship 20-1 or the report destination address corresponding to the application group name. Thus, the application information 201-3, the interest attribute 201-31, and the object ID 201-32 have been set (shown in FIG. 7).

In the case where the registered corresponding relationship needs to be deleted, the registrant inputs the object ID/object group name in the object ID/the object group name edit box, also inputs the report destination address/application group name in the report destination address/application group name edit box, and clicks "DELETE" button. Thus, the object management server 20 deletes the inputted corresponding relationship from the corresponding relationship 201-2.

Furthermore, FIG. 32A illustrates an edit screen of object group 20-2 for editing the object group 201-5 (shown in FIG. 8). As shown in FIG. 32A, the object group edit screen 20-2 has a list of the object group names for selecting the object group name, an object ID edit box for inputting the object ID, a password text box for setting a password for the object ID or the object group name, and an owner address edit box. The list of the object group names is displayed on a list box. In the case where the registered object ID is included in the registered object group 201-5, the registrant needs to select one from the list of the object group names. However, in the case where an object group 201-5 is newly registered, the registrant clicks "NEW REGISTRATION OF OBJECT GROUP" button 20-21. Thus, the new registration screen of object group 22-1 appears on the monitor, as a pop-up menu, as shown in FIG. 32B.

As shown in FIG. 32B, the new registration screen of object group 22-1 has an object group name edit box for inputting the object group name to be newly registered. The registrant inputs the object group name to be newly registered in this edit box, and clicks OK. Thus, the new object group 201-5 has been registered. At the same time, the object management server 20 generates an object group ID to uniquely identify the newly registered object group 201-5, and registers the object group ID corresponding to the object group name.

As described above, the newly registered object group name is added to the list of object group names in FIG. 32A.

The registrant selects one from the list of the object group names; inputs the object ID in the appropriate edit box, the password, and the owner address, and clicks OK. Thus, the object group 201-5 and the object 201-51 have been set (shown in FIGS. 8 and 9).

Figure 33A:
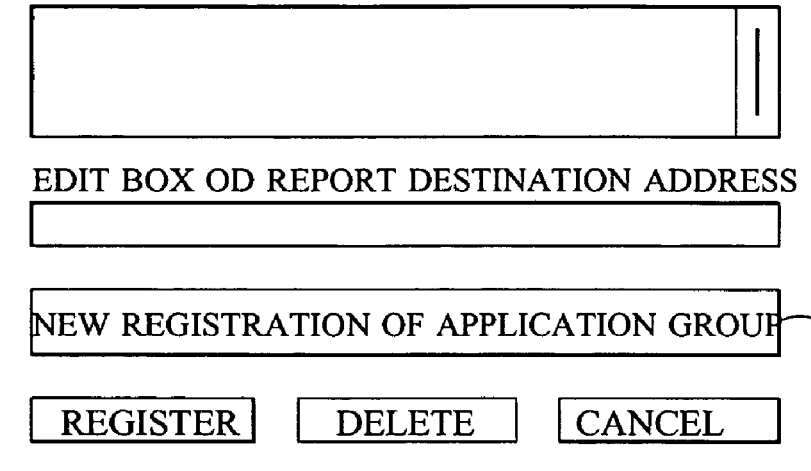
FIG. 33A illustrates an application group edit screen 20-3 for editing the application group 201-6 according to the first embodiment.

FIG. 33A illustrates an application group edit screen 20-3 for editing the application group 201-6 (shown in FIG. 10). As shown in FIG. 33A, the application group edit screen 20-3 has a list of application group names for selecting an application group name and a report destination address edit box for inputting the report destination address. The list of the application group names is displayed on a list box. In the case where the report destination address is included in the registered application group 201-6, the registrant selects one from the list of the application group names. In the case where the application group 201-6 is newly registered, the registrant clicks "NEW REGISTRATION OF APPLICATION GROUP" button 20-31. Thus, the new registration of application group edit screen 23-1 appears on the monitor, as a pop-up menu, as shown in FIG. 33B.

Figure 33B:
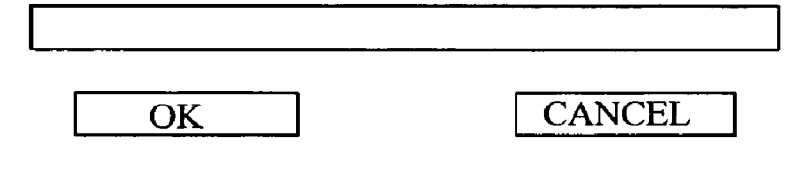
FIG. 33B illustrates a new registration of application group edit screen 23-1 according to the first embodiment.

As shown in FIG. 33B, the new registration of application group edit screen 23-1 has an application group name edit box for inputting the application group name to be newly registered. The registrant inputs the application group name to be newly registered in this edit box, and clicks OK. Thus, the new application group 201-6 has been registered. At the same time, the object management server 20 generates an application group ID to uniquely identify the newly registered application group 201-6, and registers the application group ID corresponding to the application group name.

As described above, the newly registered application group name is added to the list of the application group names in FIG. 33A. The registrant selects one appropriate application name from the list, and clicks OK. Thus, the application group 201-6 has been set (shown in FIG. 10). The object management server 20, based on the report destination address of the newly registered application group 201-6, makes the application information 201-61 dependent on the application name.

As described above, the edit screen of the corresponding relationship 20-1, the object group edit screen 20-2, and the application group edit screen 20-3 provide a registrant with an editing mechanism such as adding, editing, and deleting the corresponding relationship, the object group 201-5, and the application group 201-6.

Next, with the use of the above-mentioned displays, a description will now be given of the operation of the object management server 20, in the case where the corresponding relationship 201-2 (shown FIGS. 6 and 7), the object group 201-5 (shown in FIGS. 8 and 9), or the application group 201-6 (FIG. 10) is registered, edited, or deleted, with reference to FIG. 34. This operation is realized with a process or the like that resides on the object management server 20.

Figure 34:
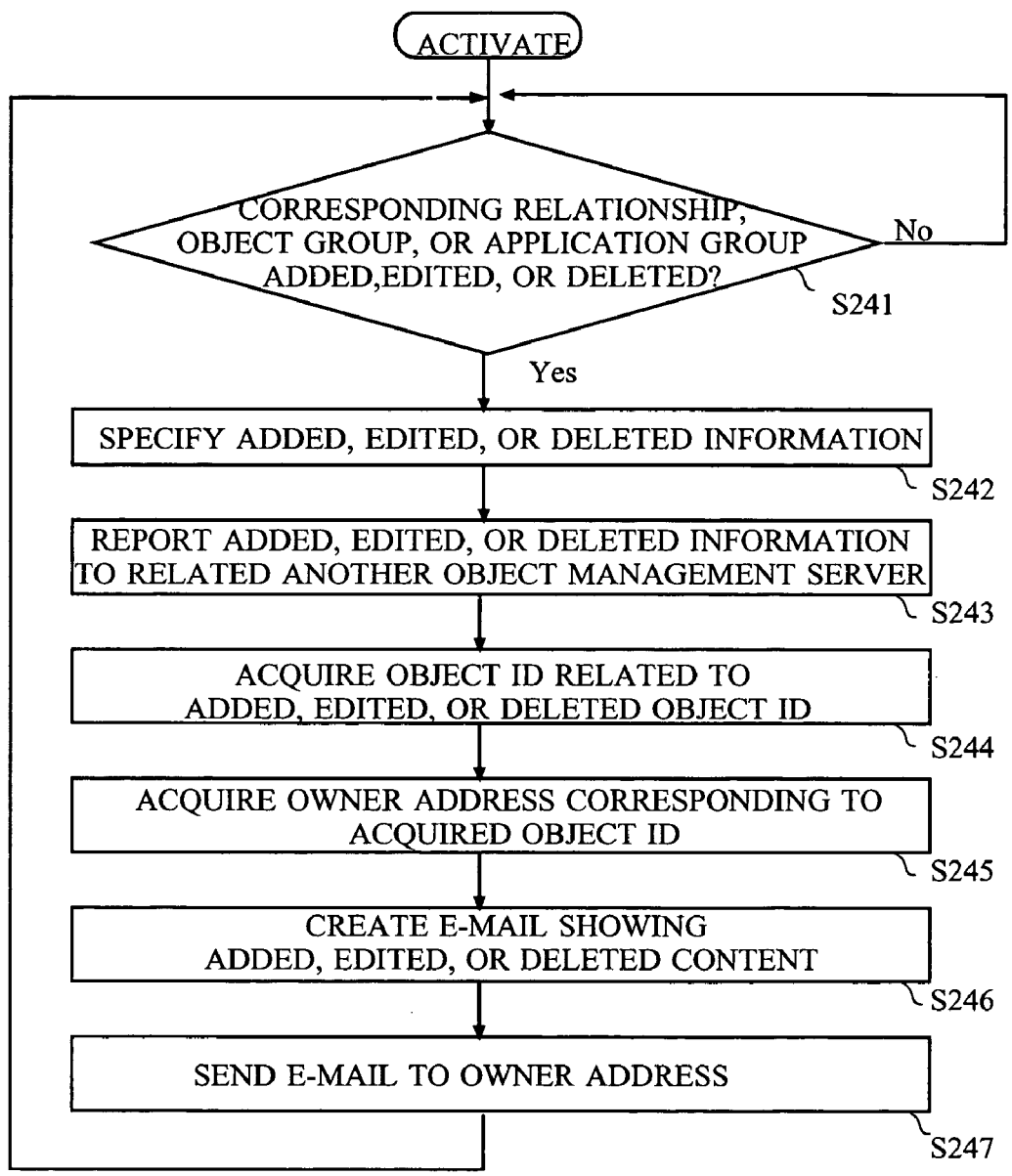
FIG. 34 is a flowchart showing the operation of an object management server 201-5, when an object group 201-5 or an application group 201-6 is registered, edited, or deleted, according to the first embodiment.

As shown in FIG. 34, the object management server 20 monitors whether any one of the corresponding relationship 201-2, the object group 201-5, and the application group 201-6 is added, edited, or deleted (in step S241). If one of the corresponding relationship 201-2, the object group 201-5, and the application group 201-6 is added, edited, or deleted (in step S241) (Yes in step S241), the object management server 20 identifies the added, edited, or deleted information (step S242), and reports this information to another object management server (step S243).

In addition, the object management server 20 acquires the object ID regarding the added, edited, or deleted information (step S244), also acquires the owner address of the acquired object ID from the object 201-51 in FIG. 9 (step S245). Then, the object management server 20 creates e-mail telling the added, edited, or deleted content (step S246), and transmits the e-mail to the acquired owner address (step S247). In this way, the object management server 20 realizes a notification unit that notifies the owner of the object of the change of corresponding relationship in order to notify the owner of the object that any one of the corresponding relationship 201-2 (shown in FIGS. 6 and 7), the object group 201-5 (shown in FIGS. 8 and 9), and the application group 201-6 (shown in FIG. 10) has been added, edited, or deleted. Then, the object management server 20 goes back to step S241.

Figure 35:
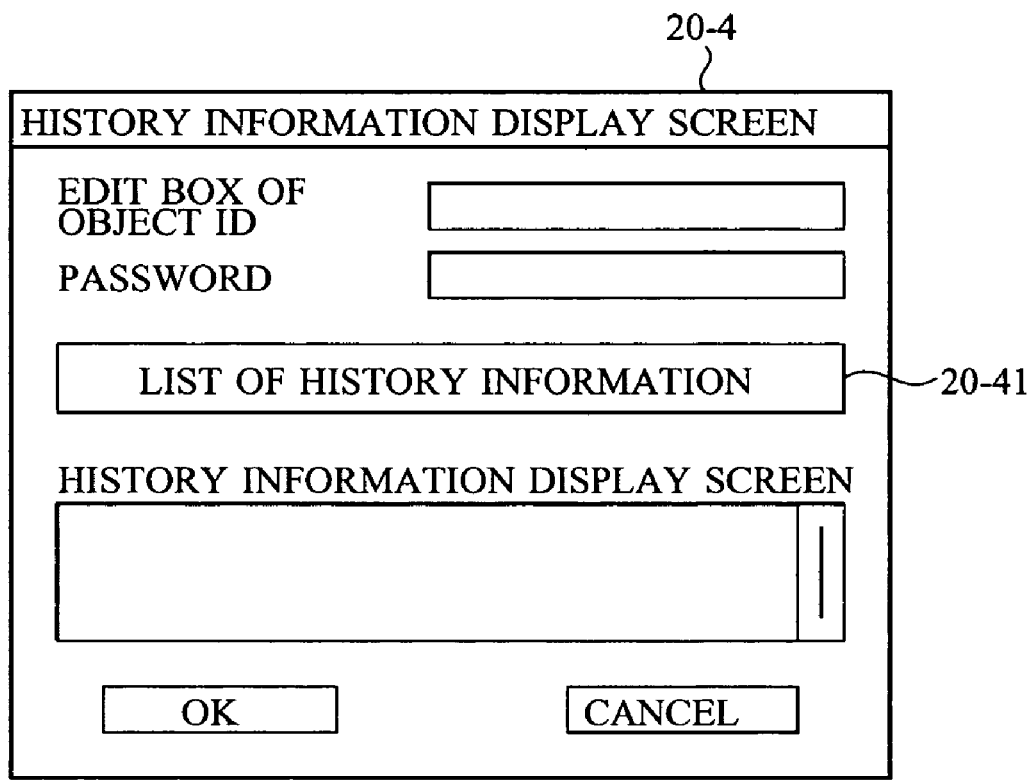
FIG. 35 illustrates a history information display screen 20-4, which is used for displaying the history information 201-4 according to the first embodiment.

History information 201-4 (shown in FIG. 6) retained in the object management server 20 can be viewed from the object management server 20 directly or from a PC or the like that is connected via the network 2. That is, the object management server 20 has a history information displaying unit for displaying the history information 201-4 with the use of a terminal via the network 2. FIG. 35 illustrates a history information display screen 20-4. A person who views the history information will be called viewer.

As shown in FIG. 35, the history information display screen 20-4 has an object ID edit box, a password text box for inputting a password, a history information display box for displaying the history information 201-4 corresponding to the inputted object ID. A registrant inputs an object ID and a password in those boxes, and clicks "LIST OF HISTORY INFORMATION" button 20-41. Thus, appropriate history information 201-4 is identified, and the list appears in the history information display box on a list box. The viewer selects a desired history information 201-4 from the list, and clicks OK. The selected history information 201-4 is displayed on the monitor.

With the use of each screen described above, not only the corresponding relationship 201-2 (shown in FIGS. 6 and 7), but also the object group 201-5 (FIGS. 8 and 9) and the application group 201-6 (shown in FIG. 10) can be deleted. This procedure will easily be figured out according to above description; therefore, a description of the procedure is omitted.

A description will now be given of a second embodiment with reference to drawings. The second embodiment is another example of the context-aware application execution system 1A. According to the second embodiment, the same codes are given to the same elements as the first embodiment; therefore a detailed description will be omitted. The architecture of the second embodiment is the same as that of the first embodiment, if not otherwise specified.

Figure 36:
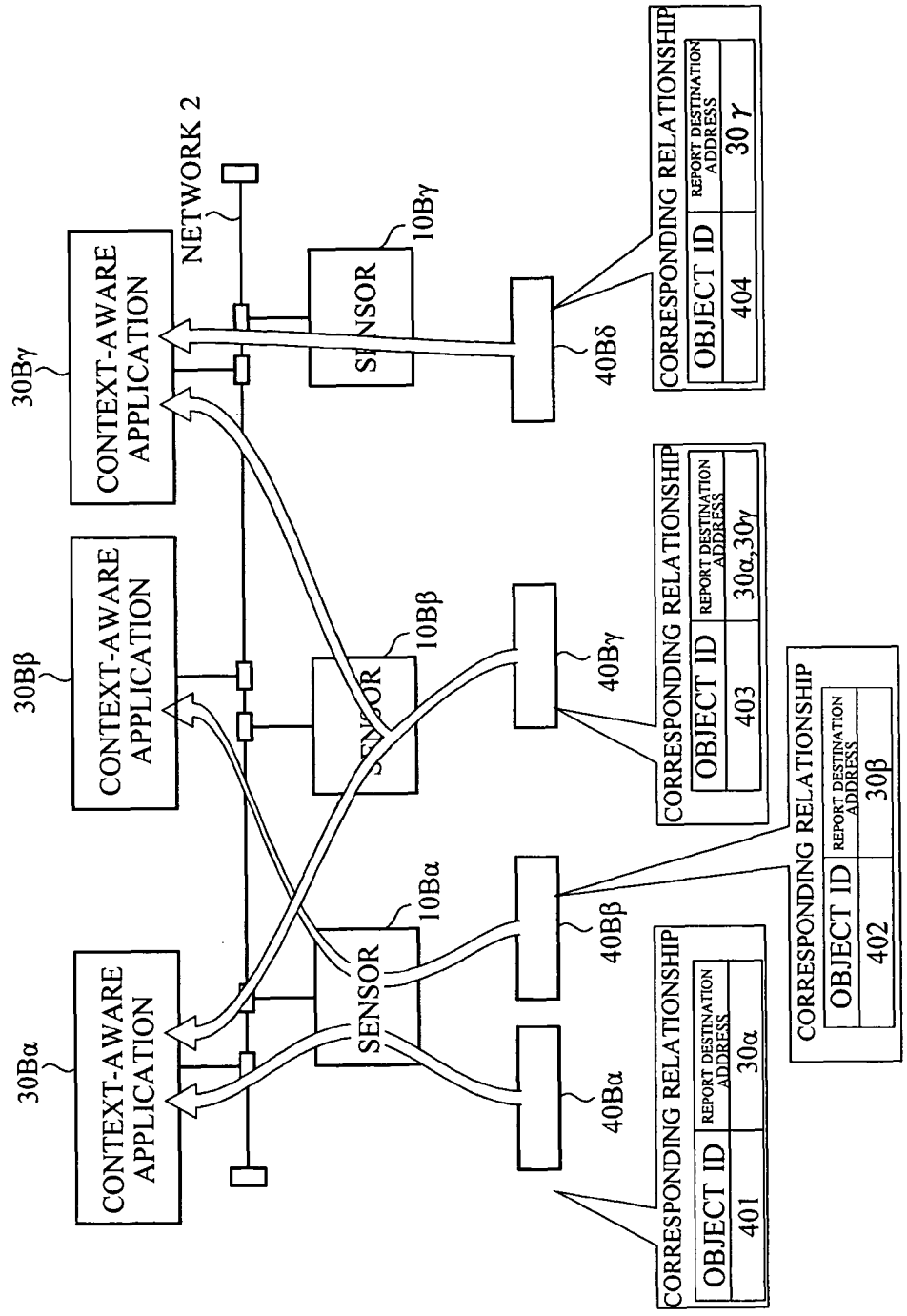
FIG. 36 is a block diagram of a context-aware application execution system 1B according to a second embodiment.

FIG. 36 is an example of a block diagram of a context-aware application execution system 1B according to the second embodiment of the present invention. As shown in FIG. 36, the context-aware application execution system 1B has one or more sensors (three sensors of 10Bα through 10Bγ in FIG. 36), one or more context-aware application execution systems (three applications of 30Bα through 30Bγ in FIG. 36), and one or more objects (four objects 40Bα through 40Bδ in FIG. 36).

Each of the objects 40Bα through 40Bδ is capable of moving around from place to place in the real world. Unique IDs are given to the objects 40Bα through 40Bδ individually so as to be identified uniquely.

The sensors of 10Bα through 10Bγ detect an object ID from the object that is existent within the area that the sensor can detect, and also detects information on the object. That is, each of the sensors of 10Bα through 10Bγ has a detection unit that detects the information on the object. The information on the object is same as that of the first embodiment; therefore, a description is omitted here.

Each of the objects 40Bα through 40Bδ corresponds to one or more pieces of application information of the context-aware application (one of 30Bα through 30Bγ). The context-aware application has one or more targets of detection, and corresponds the application information to the target objects. This corresponding relationship is retained in each of the objects 40Bα through 40Bδ. That is, each of the objects 40Bα through 40Bδ has a retaining unit that retains the object ID and the corresponding relationship of a given object ID.

When the sensor 10B (10Bα through 10Bγ) detects the object ID, the sensor acquires this corresponding relationship from the object at the same time. That is, the sensor 10B (10Bα through 10Bγ) has a detection unit that detects the object ID, and also has an acquiring unit that acquires a report destination address that corresponds to the object ID. Then the sensor 10B (10Bα through 10Bγ) transmits a detection result to the acquired report destination address. That is, the sensor 10B (10Bα through 10Bγ) has a notification unit that notifies the report destination address of the detection result. The report destination address has been acquired by the above-mentioned acquiring unit.

In this way, the context-aware application 30B (30Bα through 30Bγ) that has received the information on the object, based on the detection result, executes the context-aware application program to provide a service according to the situation of the object. In other words, on the network 2, there is a control unit for each of the context-aware application 30B (30Bα through 30Bγ). The control unit controls the program execution, based on the detection result from the above-mentioned detection unit.

Figure 37:
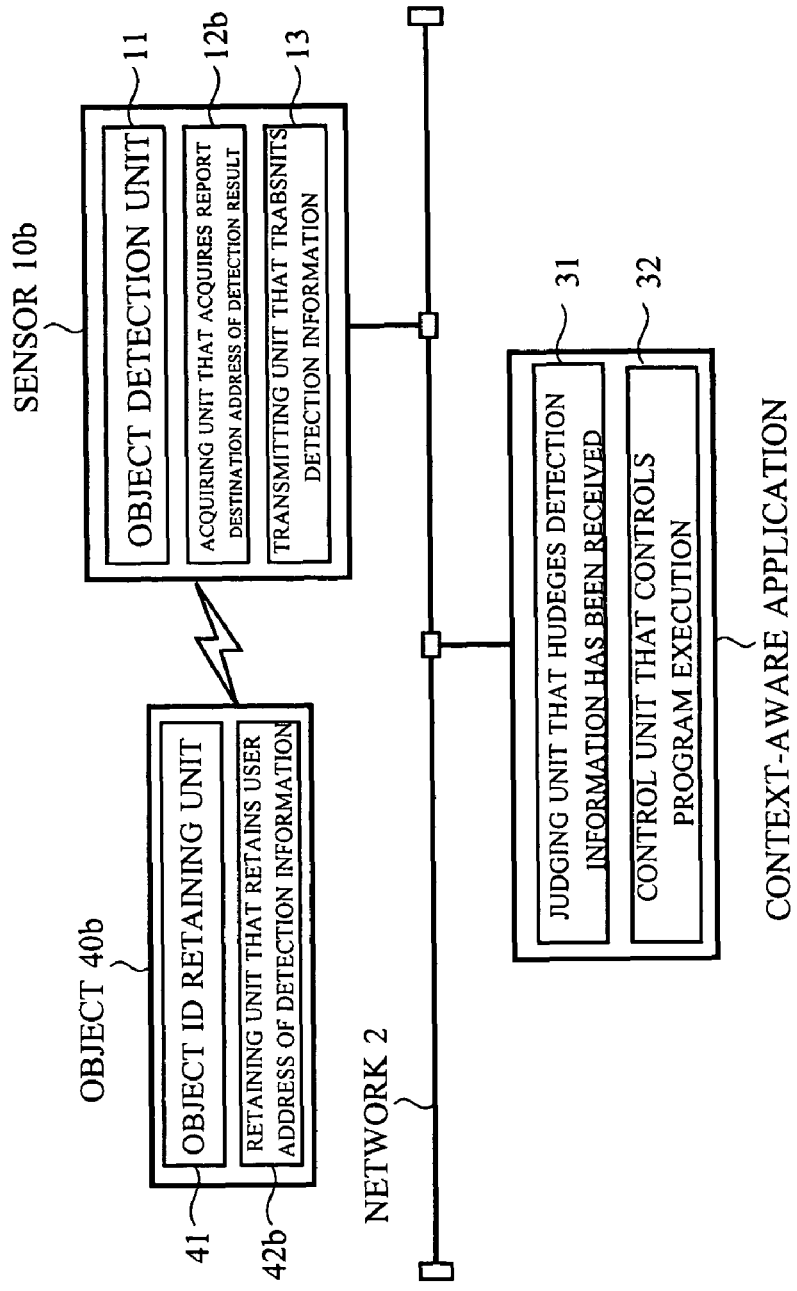
FIG. 37 is a block diagram of unit architecture in the context-aware application execution system of 1B according to the second embodiment.

Each unit, shown in FIG. 36, that the object, the sensor, and the context-aware application will now be described, with reference to FIG. 37. In FIG. 37, the context-aware application execution system 1B includes the sensor 10b, the context-aware application 30, and the object 40b. The sensor 10b and the context-aware application 30 are connected via the network 2. The sensor 10b and the object 40b send and receive data by wireless. Compared with the context-aware application execution system 1A according to the first embodiment, context-aware application execution system 1B is different in that a retaining unit that retains the destination address using the detection information is included in the object 40b, although this retaining unit is included in the object management server 20, according to the first embodiment.

The object 40b has an object ID retaining unit 41 (an identifier retaining unit) and the retaining unit 42b that retains the destination address using the detection information (hereinafter simply referred to as retaining unit 42b). The object ID retaining unit 41, same as the first embodiment, retains the object ID that uniquely identifies the object. The retaining unit 42b corresponds to the retaining unit 21 that retains the destination address using the detection information, according to the first embodiment (shown in FIG. 2). The retaining unit 42b retains the corresponding relationship between the object ID and the context-aware application 30. The detection target of the context-aware application 30 is the corresponding object ID. The retaining unit 42b also retains the report destination address of the context-aware application 30. That is, according to the second embodiment, each object 40b retains the application information on the context-aware application 30. The object 40b is the detection target of the context-aware application 30. Thus, the object management server 20 in the first embodiment can be omitted in the second embodiment.

Figure 38:
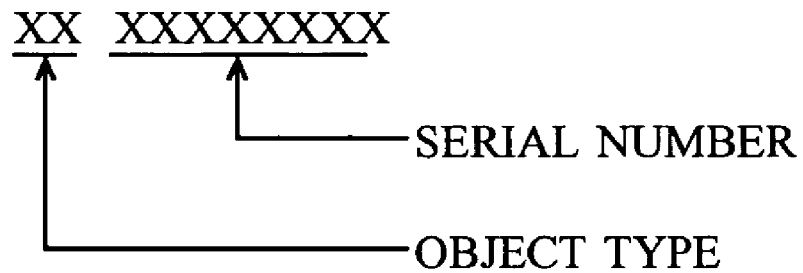
FIG. 38 shows an example of an object ID according to the second embodiment.

The sensor 10b has an object detection unit 11 (hereinafter simply referred to as detection unit 11), an acquiring unit that acquires the report destination address of the detection result 12b (hereinafter simply referred to as acquiring unit 12b), and a detection information transmitting unit 13. The detection unit 11, same as the first embodiment (shown in FIG. 2), detects the object ID assigned to the object 40b. FIG. 38 shows an example of the object ID according to the second embodiment. As shown in FIG. 38, compared with the first embodiment (shown in FIG. 4), an object management server address is deleted in the object ID in the second embodiment. The acquiring unit 12b inquires the context-aware application 30 about a retaining unit that retains the destination address using the detection information 42b provided in the object 40. The detection target of the context-aware application 30 is the object 40b. The detection information transmitting unit 13, same as the first embodiment (shown in FIG. 2), transmits attribute information (detection information) to the report destination address included in the application information. The attribute information has been detected by the object detection unit 11. The application information has been obtained from the retaining unit 42b.

The context-aware application 30, same as the first embodiment (shown in FIG. 2), has a judging unit 31 that judges whether the detection information has been received (hereinafter simply referred to as judging unit 31) and a program execution control unit 32 (hereinafter simply referred to as control unit 32). The judging unit 31 judges whether or not the above-mentioned detection information has been received from the sensor 10b. The control unit 32 executes a program when the judging unit 31 judges that the above-mentioned detection information has been received.

As described above, the same effect as the first embodiment can be obtained by having an architecture that each of the objects 40b retains the application information on the context-aware application 30 whose detection target is the object 40. Other components and capabilities thereof can be understood readily from the first embodiment; therefore, a detailed description is omitted here.

In the above-mentioned architecture, the system may be configured so that the retaining unit 42b can retain only the object ID corresponding to report destination address, instead of the whole application information. In this case, the sensor 10b detects the object ID, the report destination address, and the attribute information, and transmits the object ID and the attribute information to the context-aware application 30. In other words, the judgment of the transmission condition (step S114 in FIG. 20, for example) made on the sensor 10b may be omitted. On the other hand, the context-aware application 30 judges whether or not the received attribute information satisfies an activation condition, and executes an appropriate program according to the judgment result. This capability is same as the capability according to the first embodiment; therefore, a detailed description is omitted here.

In another architecture, the object ID may include the report destination address. That is, the architecture is the same, even if the object management server address is replaced with the report destination address.

Next, a description will now be given of a third embodiment with the use of drawings. The third embodiment is another example of the context-aware application execution system 1A. According to the third embodiment, the same codes are given to the same elements as shown in one of the first and second embodiments; therefore a detailed description will be omitted. The architecture of the third embodiment is the same as that of the first embodiment, if not otherwise specified.

Figure 39:
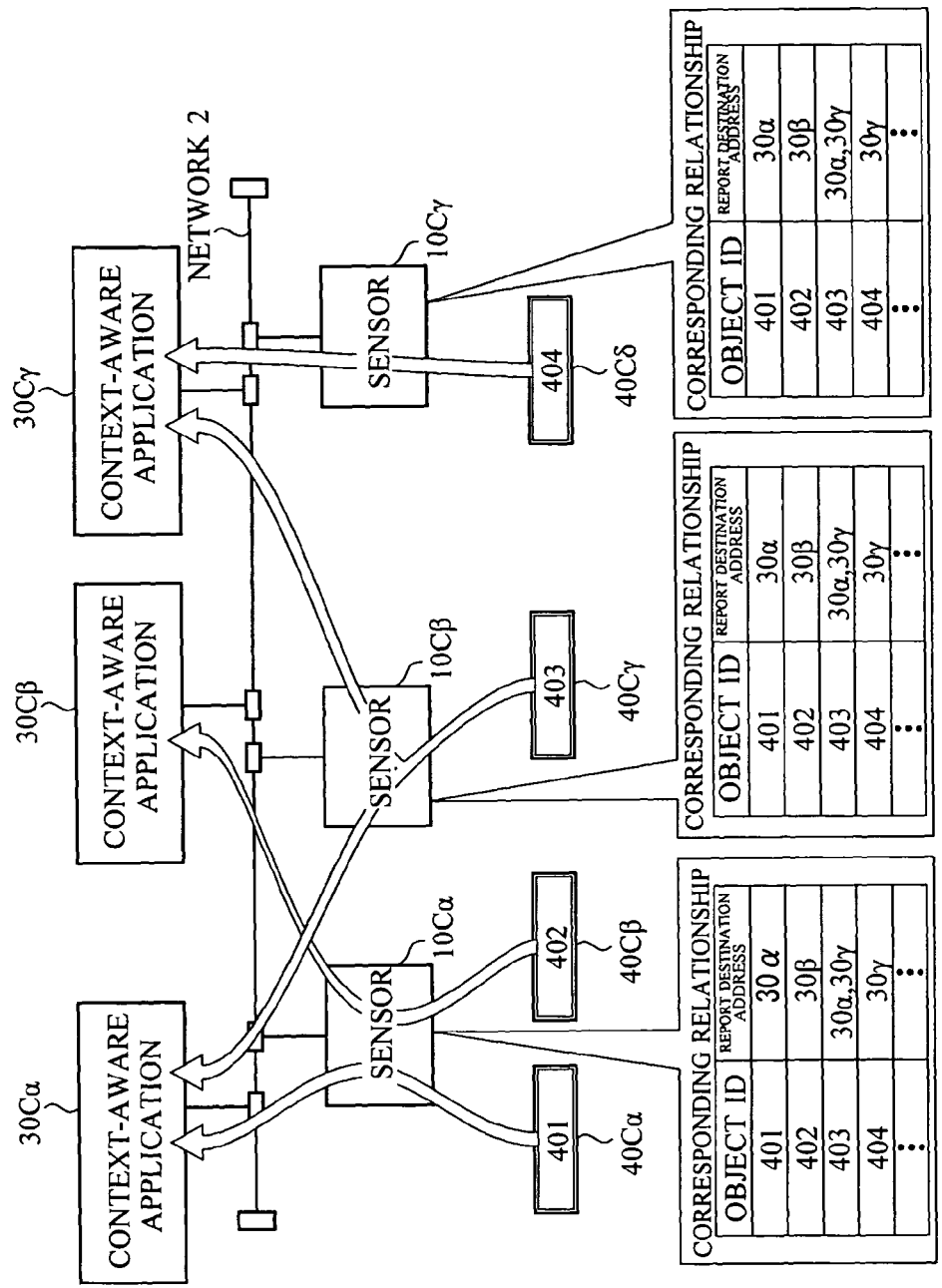
FIG. 39 is a block diagram of a context-aware application execution system 1C according to a third embodiment.

FIG. 39 is an example of a block diagram of an context-aware application execution system 1C according to the third embodiment of the present invention. As shown in FIG. 39, context-aware application execution system 1C has one or more sensors (three sensors of 10Cα through 10Cγ in FIG. 39), one or more context-aware application execution systems (three applications of 30Cα through 30Cγ in FIG. 39), and one or more objects (four objects 40Cα through 40Cδ in FIG. 36).

Each of the objects 40Cα through 40Cδ is capable of moving around from place to place in the real world. Unique IDs are given to the objects 40Cα through 40Cδ individually so as to be identified uniquely.

The sensor 10C (10Cα through 10Cγ) detects an object ID from the object that is existent within an area that the sensor can detect, and also detects information on the object. That is, the sensor 10C (10Cα through 10Cγ) has a detection unit that detects the information on the object. The information on the object is same as that of the first embodiment; therefore, a description is omitted here.

The object 40C (40Cα through 40Cδ) corresponds to one or more pieces of application information of the context-aware application (one of 30Cα through 30Cγ). The context-aware application has one or more detection targets, and corresponds the application information to the target objects. This corresponding relationship is retained in the sensor 10C (10Cα through 10Cδ). That is, the sensor 10C (10Cα through 10Cδ) has a retaining unit that retains the corresponding relationship between the object and the report destination address assigned to the context-aware application. The sensor 10C (10Cα through 10Cδ) manages all the corresponding relationship by sharing the corresponding relationship that one sensor retains with the other sensors.

When the sensor 10C (10Cα through 10Cδ) detects the object ID, the sensor acquires this corresponding relationship from the object at the same time. That is, the sensor 10C (10Cα through 10Cδ) has an acquiring unit that acquires a report destination address corresponding to the object ID. Then the sensor 10C (10Cα through 10Cδ) transmits detection results to the acquired report destination address. That is, the sensor 10C (10Cα through 10Cδ) has a notification unit that notifies the report destination address of the detection result. The report destination address has been acquired by the above-mentioned acquiring unit.

In this way, the context-aware application 30C (30Cα through 30Cγ) that has received the information on the object, based on the detection result, executes the context-aware application program to provide a service according to the situation of the object. In other words, on the network 2, there is a control unit for each of the context-aware application 30C (30Cα through 30Cγ). The control unit controls the program execution, based on the detection result from the above-mentioned detection unit.

Figure 40:
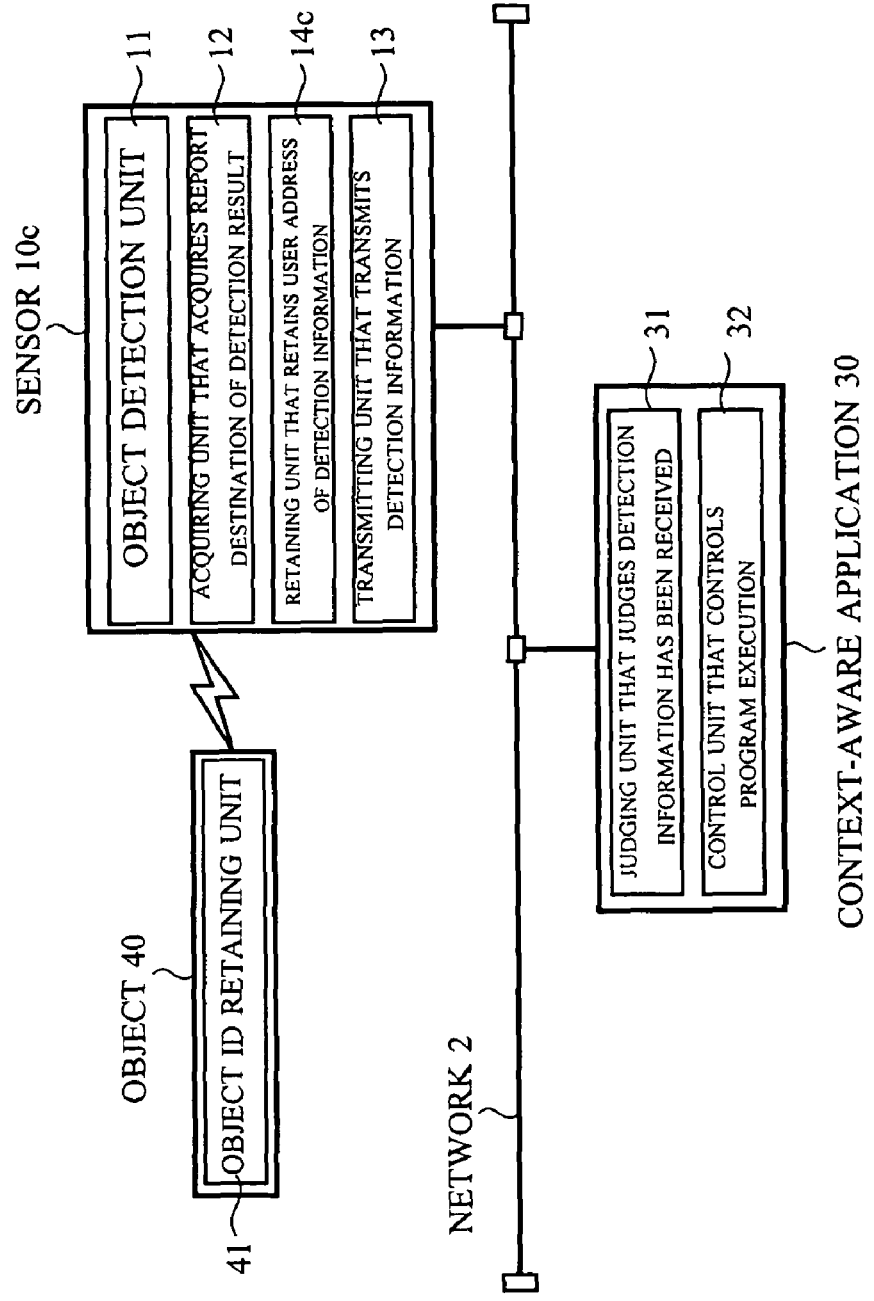
FIG. 40 is a block diagram of unit architecture in the context-aware application execution system 1C according to the third embodiment.

Each unit, shown in FIG. 39, that the object, the sensor, and the context-aware application will now be described, with reference to FIG. 40. In FIG. 40, a context-aware application execution system 1C includes the sensor 10C, the context-aware application 30C, and the object 40C. The sensor 10C and the context-aware application 30 are connected via the network 2. The sensor 10c and the object 40c send and receive data by wireless. Compared with the context-aware application execution system 1A according to the first embodiment, context-aware application execution system 1C is different in that a retaining unit that retains the destination address using the detection information is included in the sensor 10C, although this retaining unit 21 that retains the destination address using the detection information is included in the object management server 20A, according to the first embodiment.

The object 40C has an object ID retaining unit 41. The object ID retaining unit 41, same as the first embodiment, retains the object ID that uniquely identifies the object.

The sensor 10c has an object detection unit 11 (hereinafter simply referred to as detection unit 11), an acquiring unit 12 that acquires the report destination address of the detection result (hereinafter simply referred to as acquiring unit 12), a retaining unit that retains the destination address using the detection information unit 14c (hereinafter simply referred to as retaining unit 14c), and a detection information transmitting unit 13 (hereinafter simply referred to as transmitting unit 13). The object detection unit 11, same as the first embodiment (shown in FIG. 2), detects the object ID assigned to the object 40c. Here, the object ID according to the third embodiment is the same as the object ID in FIG. 38. The retaining unit 14c corresponds to the retaining unit that retains the destination address using the detection information 21 according to the first embodiment (shown in FIG. 2). The retaining unit 14C retains the corresponding relationship between the object ID and the context-aware application 30. Each object is the detection target of the context-aware application 30. The retaining unit 14c also retains the report destination address of each context-aware application 30. That is, according to the third embodiment, the sensor 10 has the same capability as the object management server 20 in the first embodiment. The acquiring unit 12C inquires the retaining unit 14c about the context-aware application 30 whose detection target is the object 40. The transmitting unit 13, same as the first embodiment (shown in FIG. 2), transmits the attribute information (detection information) to the report destination address. The attribute information (detection information) was detected by the object detection unit 11. The report destination address is included in the application information that has been obtained from a retaining unit 42 that retains the destination address using the detection information.

All the sensors including sensor 10 are implemented on the network 2, as peers of peer-to-peer framework as represented by JXTA® or the like. That is, the sensors are capable of forming a peer-to-peer network. Multiple sensors are capable of forming a single and virtual sensor on the network 2. Thus, data managed in each sensor (which is the corresponding relationship, here) can be treated as the information managed in all the object management servers.

The context-aware application 30, same as the first embodiment (shown in FIG. 2), has a judging unit 31 that judges whether the detection information has been received (hereinafter simply referred to as judging unit 31) and a program execution control unit 32 (hereinafter simply referred to as control unit 32). The judging unit 31 judges whether or not the detection information has been received from the sensor 10b. When the judging unit 31 judges that the detection information has been received, the control unit 32 executes a program to provide a service according to the situation.

As described above, the sensor 10c has the retaining unit 14c so as to retain the application information on the context-aware application 30 whose detection target is each object ID; therefore, the same effect as the first embodiment can be achieved. Other components or capabilities can be understood readily from the first embodiment; therefore, a detailed description is omitted here.

A description will now be given of a fourth embodiment, utilizing the present invention intelligently. In the fourth embodiment, the same codes are given to the same elements as the first embodiment; therefore a detailed description will be omitted. Elements of the fourth embodiment are the same as the first embodiment, if not otherwise specified.

In the fourth embodiment, with the context-aware application execution system 1A in the first embodiment, another example of the execution system will be described in detail. This system has been established practically. The same system can be established utilizing the context-aware application 1B according to the second embodiment or the context-aware application execution system 1C according to the third embodiment.

First of all, a first example is an interactive poster system. This system includes an object 40 and a sensor 10. A poster of a movie, a magazine, or the like functions as the object 40, and a cellular phone, a mobile computer, or the like functions as the sensor 10. By assigning an object ID to a poster, a website including the detailed information can be browsed with a cellular phone, an item on the poster can be purchased or reserved, which is shown in FIG. 41.

Figure 41:
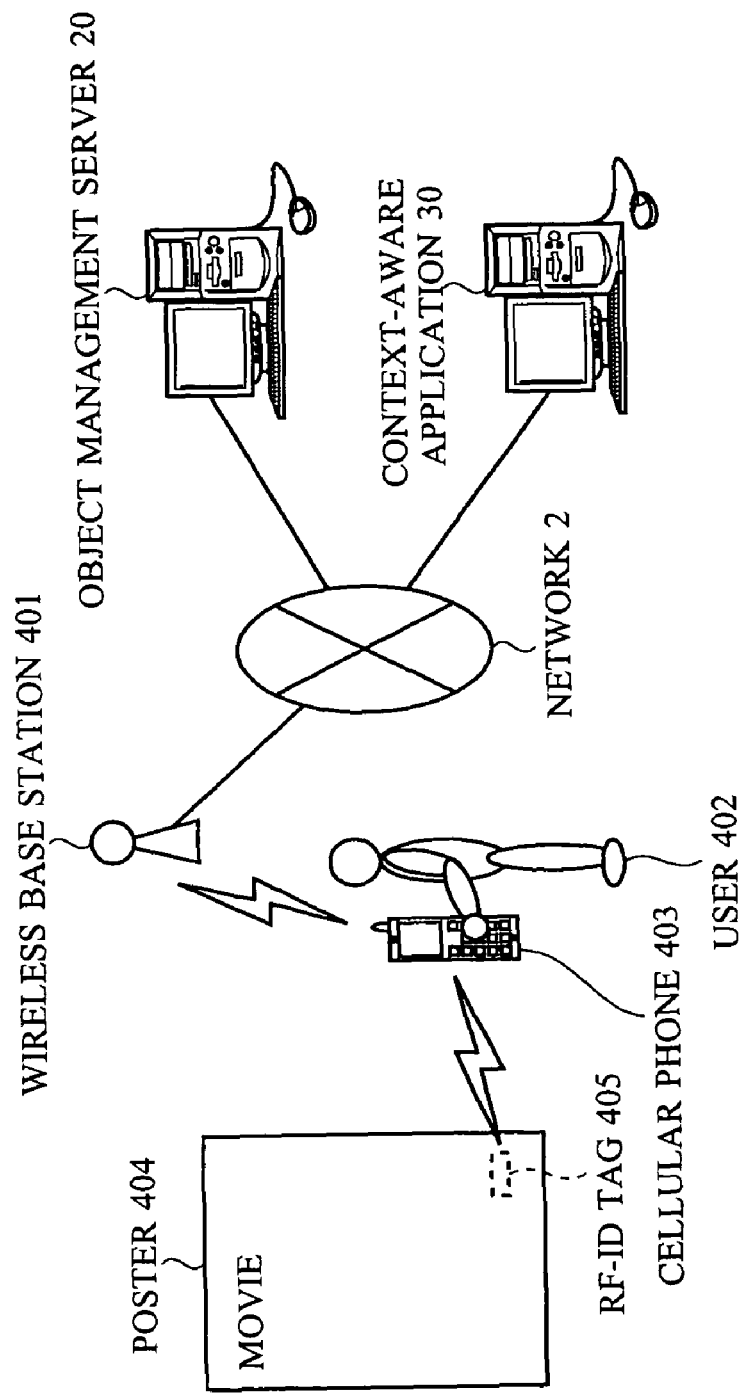
FIG. 41 is a block diagram of an interactive poster system 400 according to a fourth embodiment.

Referring to FIG. 41, an interactive poster system 400 has a poster 404, an RF-ID tag 405, a cellular phone 403, an object management server 20, and a context-aware application 30. The RF-ID tag 405 is attached to the poster 404. The RF-ID tag 405 has an object ID that can be read by wireless. The cellular phone 403 that is carried by a user 402 corresponds to the sensor 10, and connects to the network 2 via a wireless base station 401. The cellular phone 403 reads out the object ID from the RF-ID tag 405. The cellular phone 403 acquires the application information 201-3 (shown in FIG. 7) from the object management server 20, based on the processing made by the sensor 10, and transmits detection information to a report destination address included in the application information 201-3. Here, the detection information may include the object ID, cellular phone information, user information, or the like. The context-aware application 30 activates a program so as to provide various services with the user 402 through the cellular phone 403. The services include sales or reservation of electric ticket or book, downloading of detailed advertisement (including motion picture), theater information (such as schedule), business store information (such as place and price) and the like.

A second example is a waste separation system. Object IDs are given to component elements in products in the production stage in factories so as enable proper disposal, according to raw materials and ingredients. The component elements in products include products of home appliances, bottles, books, and the like and elements thereof. Thus, this system enables recycling of resources without disassembling products or materials, and prevents the deterioration of environment.

Figure 42:
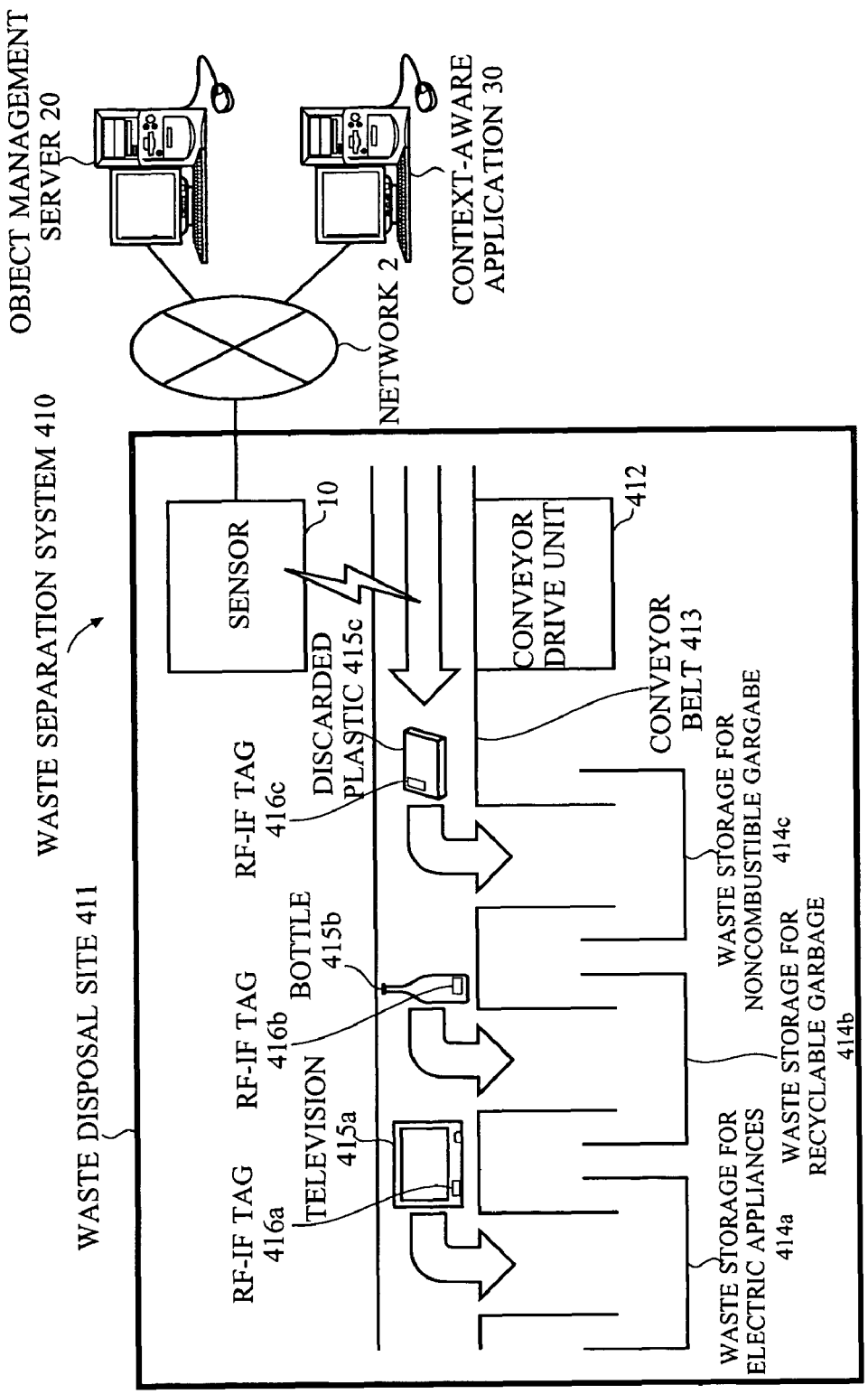
FIG. 42 is a block diagram of system architecture of a waste separation system in the fourth embodiment.

Referring to FIG. 42, a waste separation system 410 has a sensor 10, a conveyor 413, a conveyor drive unit 412, an object management server 20, and a context-aware application 30. The sensor 10, the conveyor 413, and the conveyor drive unit 412 are installed in a waste disposal site 411. A television set 410a, a bottle 415b, and a discarded plastic 415c are carried on the conveyor 413. A television set 410a, a bottle 415b, and a discarded plastic 415c correspond to the object 40. An RF-ID tag 416a is attached to the television set 410a, an RF-ID tag 416b is attached to the bottle 415b, and an RF-ID tag 416c is attached to the discarded plastic 415c. The conveyor 413 is driven by the conveyor drive unit 412, and the wastes are separated individually into a waste storage for electric appliances 414a, a waste storage for recyclable garbage 414b, a waste storage for noncombustible garbage 414c, and the like. The sensor 10 reads out the object ID of each waste on the conveyor 413, and based on the object ID, acquires application information 201-3 (shown in FIG. 7) from the management server 20. Then the sensor 10 transmits the detection information to a report destination address that is included in the application information 201-3. Here, the detection information may be the object ID. The context-aware application 30 that has received the detection information activates a program so as to remotely control the conveyor drive unit 412. Thus, the wastes on the conveyor 413 can be piled up in respective waste storages depending on the waste type.

In addition to the examples, intelligent utilization of the present invention enables to realize barrier-free system, deposit library system, unified financial and payment system, community IC-card system, food-tracking system, unmanned and full automatic storage system, integrated travel support system, supply chain integration system, life-long learning support system, clothes washing machine with sensor, shopping cart system, intelligent transport system, remote medication system, ubiquitous office system, and the like.

Barrier-free system is a guidance system for guiding people with visual impairment to their destinations while walking, for example. This system can be realized by reading out the object IDs installed on routes with walking aids or the like. In combination with PDAs or mobile computers, this system enables more intelligent navigation.

Deposit library system is a management system of books and the like. This system can be realized by giving object IDs to books and the like. Those books and the like are shared and managed by multiple libraries; therefore, users are able to identify desired books readily on a website such as a library portal site.

Unified financial and payment system is used for financial settlement, by giving object IDs to all securities including paper money and bills. Giving object IDs to securities enables virtual settlement on the network, and helps eliminate time lag in the financial settlement and prevent forgery or the like of securities.

Community IC-card system aims at one common card with the use of an IC-card that a community or a nation issues to every citizen. Membership cards of libraries and gyms and reward cards of shopping malls and the like are incorporated into the common card. Thus, only one card enables to be utilized in various places in a community.

Food-tracking system is a history management system. Object IDs are given to foods. Foods are traced with multiple sensors 10 installed in distribution centers. This system manages the history of distribution process from farm to store and manufacturing process, enables to identify a cause, time, and the like easily if any problems arise, and assures safety of foods.

Integrated travel support system is an integrated management system. Object IDs are given to all necessities in traveling such as air ticket, baggage, passport, and the like. For example, giving object IDs to passports can prevent illegal entry and departure due to passport forgery and speed up entry and departure formalities. Baggage in air travel can be sent from a neighborhood convenience store or the like and received at a place of arrival, even if the travel includes a connecting flight; therefore, travel without bringing baggage comes true. Integrated management of ticket, baggage, passport, and the like can improve security and services in travel.

Supply chain integration system is also an integrated management system. Object IDs are given to commercial items for managing the items from procurement to production, logistics, and sales, based on the information from the object ID. Thus, this system enables to manage sales, transit inventory, production status, supply situation of raw materials and parts beyond the scope of actual producer or store in an integrated way, and also enables to share the situation. In addition to holding inventories to a minimum, loss in sales opportunities due to shortage can be minimized.

Lifelong learning support system is a continuous management system for continuously managing history and level in learning from distance learning such as e-learning and the like to overseas education, enrichment lesson, and school. This system enables to support learners appropriately, even if the learners happen to experience transfer of schools, or an interval or restart in mid-course.

Clothes washing machine with sensor automatically sets up washing conditions. The object IDs are given to clothes and the like. The sensor 10 is installed inside the machine to read out the object ID. Another sensor is also installed to sense a dirt level of wash water. Judging from the information of the object ID and the dirt level of wash water, the washing machine automatically sets up washing conditions.

Shopping cart system is an automatic calculation system. The sensor 10 is installed on a shopping cart. When an item with an object ID is put into the cart, this system automatically calculates total amount. A display device is also installed on the shopping cart so that purchase record or personal preferences of each shopper can be displayed or suitable items can be recommended according to the weather of the day or the like. In the case where contents of a refrigerator at home are added to sensing, shoppers are able to know necessary items easily.

Intelligent transport system (ITS) provides traffic guidance suitable for vehicle and other various pieces of information, by giving the object IDs to vehicles and roads. Automatic driving is enabled in combination with the object IDs given to roads, distance between vehicles, and other information. Vehicles receiving road information such as icy road information and the like can prevent road accident.

Remote medication system utilizes real-time information from a biomedical sensor and clinical or medication history in electronic medical chart. The object IDs are given to patients, and the biomedical sensors are attached to patients so as to detect health condition. Thus, patients can be diagnosed remotely and can receive medication instructions. In addition, giving the object IDs to drugs and medicines can manage information of taking a drug with another drug, validity date, and the like.

Ubiquitous office system links the real world and the virtual world by giving the object IDs to all humans, vehicles, buildings, and the like. Thus, a more pleasant ubiquitous society can be realized.

In carrying out the present invention, in an aspect of the present invention, the application program execution system has control units that control execution of application programs, detection units that detect information on an object, and a notification unit that notifies, based on relationship information showing a corresponding relationship between the object and the application program, a specific control unit among the control units of a detection result of the detection unit, the specific control unit executing an application program that is included in the application programs and is identified from the corresponding relationship. By managing the relationship between the objects and the application programs, the objects and the application programs can be managed independently. Thus, the present invention enables to establish and change the application program execution system flexibly. Development of the application programs is also flexible. According to the present invention, the detection units are commonly used so as to reduce redundancy, simplify the system structure, and reduce the costs. The detection result, of which is notified the control units, may be part of the information detected by the detection units.

On the application program execution system in the above-mentioned aspect, information on the object may include situation information showing an identifier of the object and a situation of the object. Various kinds of information can be applied to the information on the objects. For example, information may artificially be given to the identifier. In the case where the objects are living creatures such as humans or the like, any kind of information that can identify the object can be applied, including finger print, iris, voice pattern, face pattern, vein pattern of palm, shape of item, or whatever. Regarding the situation information, the situation on the detection units, that is, positional information, environmental information, or the like of the detection units can be applied to the situation information. Information that has been detected from the object directly can be applied to the situation information.

On the application program execution system in the above-mentioned aspect, the relationship information may include the application programs or address information on the control units to which the detection result is sent. By including the above-mentioned address information in the situation information, the above-mentioned address can be obtained easily, based on identification data.

On the application program execution system in the above-mentioned aspect, the detection units may be located respectively in different places. In the present invention, the application programs and the detection units can be managed independently. Thus, the detection units can be placed in various places in the real world.

On the application program execution system in the above-mentioned aspect, the control units may be located respectively in different places. In the present invention, the application programs and the control units can be managed independently. Thus, the control units can be placed in various places in the real world.

In another aspect of the present invention, the application program execution system has a detection unit that detects an identifier given to an object together with information on a situation of the object, a control unit that controls execution of an application program, based on a detection result of the detection unit, a retaining unit that retains a corresponding relationship between the identifier and an address assigned to the application program, an acquiring unit that acquires the address from the retaining unit, based on the identifier that has been detected by the detection unit, the address corresponding to the identifier, and a notification unit that notifies the address acquired by the retaining unit of the detection result. The corresponding relationship between the object ID and the application program is retained in the retaining unit, which is an independent unit. The object ID is used for uniquely identifying the object. The object is the detection target of the application program. Thus, in the case where sensing environment and application environment are respectively established, those environments can be related to each other flexibly according to the purpose. In the case where the sensing environment and the application environment are added or changed, the corresponding relationship retained on the retaining unit is to be changed so as to establish and change the system readily and flexibly. The detection result reported to the control unit may be part of the information that has been detected by the detection unit. For example, only the object identification data or only the identification data given to the detection unit may be included. For example, information may artificially be given to the identifier. In the case where the objects are living creatures such as humans or the like, any kind of information that can identify the object can be applied, including finger print, iris, voice pattern, face pattern, vein pattern of palm, shape of item, or whatever. Regarding the situation information, the situation on the detection units, that is, positional information, environmental information, or the like of the detection units can be applied to the situation information. Information that has been detected from the object directly can be applied to the situation information.

The application program execution system in the above-mentioned aspect may further have a sensor, a first server, and a second server that are connected to a network. The sensor includes the detection unit, the acquiring unit, and the notification unit. The first server may include the retaining unit and the second server retains the application program and includes the control unit. Including the retaining unit in the first server further improves the flexibility of the system.

The application program execution system in the above-mentioned aspect may further have a sensor and a server that are connected to a network. The sensor includes the detection unit, the acquiring unit, and the notification unit. The object may include the retaining unit, and the server may include the control unit that controls execution of the application program. Including the retaining unit in the object can reduce the number of required servers.

The application program execution system in the above-mentioned aspect may further have a sensor and a server that are connected to a network. The sensor may include the detection unit, the retaining unit, the acquiring unit, and the notification unit. The server retains the application program and includes the control unit. Including the retaining unit in the sensor can reduce the number of required servers.

In another aspect of the present invention, a sensor has a detection unit that detects an identifier given to an object together with information on a situation of the object, a notification unit that notifies an application program of a detection result of the detection unit, a detection target of the application program being the object, and an acquiring unit that acquires an address assigned to the application program that has a corresponding relationship with the identifier, based on the identifier that has been detected by the detection unit. The notification unit notifies the address assigned to the application program of the detection result. The sensor obtains the address assigned to the program having the detection target, which is the object, and sends the detection information on the object to the address. Thus, the sensing environment and application environment can be established separately. In the case where an independent sensing environment or an independent application environment is added or changed, the sensing environment needs not be changed; therefore, the system can be established or changed readily and flexibly.

On the sensor in the above-mentioned aspect, the acquiring unit acquires information required by the application program based on the identifier, the application program having the corresponding relationship with the identifier, and the notification unit notifies the address assigned to the application program of the detection result, in the case where the detection results include information required by the application program.

On the sensor in the above-mentioned aspect, the acquiring unit may acquire a threshold condition corresponding to the address together with the address assigned to the application program, and the notification unit notifies the address assigned to the application program of the detection result, in the case where the detection result satisfies the threshold condition. Only if the information that the program requires is detected, the information on the object is sent to the appropriate program. Thus, unnecessary information can be avoided being sent so as to reduce the traffic on the network.

On the sensor in the above-mentioned aspect, the acquiring unit may acquire an encryption key to encrypt the detection result based on the identifier and the notification unit notifies the address of information on the object, after the information has been encrypted with the encryption key. Only if the threshold condition required by the program is satisfied, the information on this object is sent to the program. Thus, unnecessary information can be avoided being sent so as to reduce the traffic on the network.

On the sensor in the above-mentioned aspect, the identifier may include another address assigned to a first server that retains a corresponding relationship between the identifier and the address assigned to the application program, and the acquiring unit acquires from the first server, the address assigned to the application program, based on said another address assigned to the first server. The information on the object can be sent after encrypted so as to keep the information secure.

On the sensor in the above-mentioned aspect, the object may retain a corresponding relationship between the identifier and the address assigned to the application program, the acquiring unit acquires from the object, the address assigned to the application program. By including the assigned addresses in the first server having the corresponding relationship of the object ID, the sensor can specify the address to be inquired.

On the sensor in the above-mentioned aspect, the retaining unit may retain a corresponding relationship between the identifier and the address assigned to the application program, the acquiring unit acquires from the retaining unit, the address assigned to the application program. The object retains the corresponding relationship; therefore, the sensor can obtain the address assigned to the program to which the sensor sends.

On the sensor in the above-mentioned aspect, the sensor may acquire the retained address assigned to the application program, in the case where the acquiring unit has retained the acquired address assigned to the application program for a given period, and still retains the address having a corresponding relationship with the detected identifier. The corresponding relationship between the object ID and the program may be retained in the sensor. The detection target of the program is the object ID.

On the sensor in the above-mentioned aspect, the notification unit may notify the address assigned to the application program of the detection result, after a date and time when the information on the object was detected together with an expiration date of the detection result having been added to the detection result. By setting the expiration date to the detection information on the object, the information can be kept fresh so as to respond to the change of the situation appropriately.

The sensor in the above-mentioned aspect, may further has an e-mail address acquiring unit that acquires e-mail address corresponding to the identifier, and a reporting unit that reports to the e-mail address, a list of said addresses to which the notification unit sends the detection result. The detection information on the object is sent to the e-mail address of the object owner. Thus, the owner is able to know the information such as when and in what way the information was used.

On the sensor in the above-mentioned aspect, the sensor may be implemented on a network as a peer in a peer-to-peer framework, and the retaining unit share with another retaining unit of another sensor, the corresponding relationship between the identifier and the address assigned to the application program. Implementing the sensor as a peer in the peer-to-peer framework enables to share the corresponding relationship withal the sensors. The corresponding relationship describes the relationship between the object ID and the program whose detection target is the object ID.

In another aspect of the present invention, a first server has a retaining unit that retains a corresponding relationship between an identifier and an address, the identifier having been given to an object, and the address having been assigned to an application program whose detection target is the object. The retaining unit, according to an inquiry via a network, notifies a source address of the inquiry, of the address having a corresponding relationship with the identifier. The corresponding relationship between the object ID and the program is retained in the retaining unit, which is an independent unit. The object ID is used for uniquely identifying the object, and the object is the detection target of the program. By managing this independent unit in the first server, the system can be established or changed readily and flexibly, even if the sensing environment or the application environment is added or changed. The corresponding relationship can be retained by changing the retaining unit only.

On the first server in the above-mentioned aspect, the retaining unit may retain a corresponding relationship between the identifier and the address, the identifier having one identifier or a group of identifiers, and the address having one address or a group of addresses, and according to an inquiry via the network, notifies the source address of the inquiry, of all addresses having a corresponding relationship with the identifier, the identifier having one identifier or a group of identifiers, and the address having one address or a group of addresses. By treating multiple objects or multiple applications as a group of object or a group of applications, the corresponding relationship can be simplified. In addition, work operation or labor hour for adding, editing, or deleting can be reduced.

On the first server in the above-mentioned aspect, the retaining unit, corresponding to the identifier, may retain information required by the application program, and in response to the inquiry via the network, notifies the source address of the inquiry about information required by the application program having a corresponding relationship with the identifier. By retaining the information, which is required by the program, related to the object ID, the sensor is able to identify the program whose detection target is the object ID. Thus, unnecessary information can be avoided being sent on the network, and the network traffic can be reduced.

On the first server in the above-mentioned aspect, the acquiring unit may retain a threshold condition corresponding to the address, and notifies the source address of the inquiry of the threshold condition in response to the inquiry via the network. By retaining the threshold condition together with the information required by the program, the sensor is able to identify the program readily. The object is the detection target of the program. Thus, unnecessary information can be avoided being sent on the network, and the network traffic can be reduced.

On the first server in the above-mentioned aspect, the retaining unit may retain an encryption key corresponding to the identifier, and notifies the source address of the inquiry, in response to the inquiry via the network. By retaining the encryption key related to the object ID, the encryption key can be notified when inquired by the sensor. Thus, the information sent by the sensor can be kept secure.

On the first server in the above-mentioned aspect further may include a receiving unit that receives the address to which information on the object that has been detected by the source address of the inquiry is sent, an accumulating unit that accumulates history information on the address corresponding to the identifier, the address having been received by the receiving unit, and a displaying unit that enables to display with the use of a terminal connected to the network, history information on the address and the identifier, the history information having been accumulated in the accumulating unit. In the history information, accumulated is the address to which the detection information on the object has been sent. The history information can be viewed via the network. Thus, it is easy for the object owner to know when and in what way the information was used.

On the first server in the above-mentioned aspect, the retaining unit may retain an e-mail address corresponding to the identifier, and further includes a notification unit that notifies the source address of the inquiry of the e-mail address, in response to the inquiry via the network. By retaining the e-mail address of the object owner related to the object ID, the e-mail address can be notified, when inquired from the sensor. Thus, it is easy to notify the owner of the information such as when and in what way the information was used.

On the first server in the above-mentioned aspect, the retaining unit may retain an e-mail address corresponding to the identifier, and further includes an editing unit that adds, edits, or deletes the corresponding relationship between the identifier and the address, and a notification unit that notifies the e-mail address that the corresponding relationship has been added, edited, or deleted with the use of the editing unit. By sending e-mail to the object owner regarding the corresponding relationship that has been added, edited, or deleted, the owner is able to know the information on the application whose detection target is the object owner.

On the first server in the above-mentioned aspect, the first server may be implemented on the network as a peer in a peer-to-peer framework, and the retaining unit shares with a retaining unit that another sever retains, the corresponding relationship between the identifier and the address. By implementing the first server as a peer in the peer-to-peer framework on the network, all the corresponding relationship can be shared in the first server. The corresponding relationship describes the relationship between the object ID and the address assigned to the program whose detection target is the object ID.

In another aspect of the present invention, a second server may include a control unit executes an application program based on a situation of an object, the application program having a corresponding relationship with the object, and a judging unit that detects information on the situation of the object having been received via a network. The control unit executes the application program, when the judging unit detects an identifier or the information on the situation of the object having been received. Obtained is the address assigned to the program whose detection target is the object. Based on the information from the sensor that sends the detection information on the object to the address, the appropriated program is executed. Thus, the sensing environment and the application environment can be established respectively. Even if the independent sensing environment is added or changed, the application environment needs not be changed; therefore, establishing and changing the system can be performed readily and flexibly.

On the second server in the above-mentioned aspect, the information on the situation of the object has been encrypted with the use of an encryption key, and may further include a retaining unit that retains a decryption key that decrypts the information on the situation of the object, corresponding to the application program. The judging unit decrypts the information on the object with the use of the decryption key. The information on the object after encrypted is transmitted and received, and the information can be kept secure.

On the second server in the above-mentioned aspect, the information on the situation of the object may include a date and time when the information on the situation of the object was detected and a expiration date of the information on the situation of the object, and further includes an accumulating unit that accumulates the information on the situation of the object. The accumulating unit abandons the information on the situation of the object whose expiration date has expired. By setting the expiration date to the detection information on the object, the information can be kept fresh so as to respond to the change of the situation appropriately.

In another aspect of the present invention, an object includes a retaining unit that retains an identifier. The identifier includes an address assigned to a first server that retains a corresponding relationship between the identifier and the address assigned to an application program. Including the address of the first server retaining the corresponding relationship in the object ID enables the sensor to specify the address assigned to the first server retaining this corresponding relationship. Various pieces of information can be applied to the information on the object according to the purpose. For example, information may artificially be given to the identifier. In the case where the objects are living creatures such as humans or the like, any kind of information that can identify the object can be applied, including finger print, iris, voice pattern, face pattern, vein pattern of palm, shape of item, or whatever. Regarding the situation information, the situation on the detection units, that is, positional information, environmental information, or the like of the detection units can be applied to the situation information. Information that has been detected from the object directly can be applied to the situation information.

In another aspect of the present invention, an object includes a first retaining unit and a second retaining unit, the first retaining unit retaining an identifier, and the second retaining unit retaining a corresponding relationship between the identifier and an address assigned to an application program. Including the retaining unit in the object enables to reduce the number of the required servers. Various pieces of information can be applied to the information on the object according to the purpose. For example, information may artificially be given to the identifier. In the case where the objects are living creatures such as humans or the like, any kind of information that can identify the object can be applied, including finger print, iris, voice pattern, face pattern, vein pattern of palm, shape of item, or whatever. Regarding the situation information, the situation on the detection units, that is, positional information, environmental information, or the like of the detection units can be applied to the situation information. Information that has been detected from the object directly can be applied to the situation information.

On the object in the above-mentioned aspect, the object may be an RF-ID tag or an IC-card having a wireless communication unit. By using highly-portable RF-ID card or IC-card, various humans, items, vehicles, animals, plants and the like can be the objects so as to realize various different systems.

In another aspect of the present invention, an application program execution system includes an object having an identifier, a detection unit that detects information on a situation of an object together with the identifier of the object, a retaining unit that retains a corresponding relationship between the identifier and an address, the address being assigned to an application program whose detection target is the object, and a control unit that controls execution of the application program, based on a detection result of the detection unit, and further includes the steps of detecting the identifier and the information on the situation of the object, with the use of the detection unit, acquiring an address from the retaining unit, the address corresponding to the identifier, and notifying the address of the information on the situation of the object, the address having been acquired with the acquiring step. The corresponding relationship between the object ID and the program is retained in the retaining unit, which is an independent unit. The object ID is used for uniquely identifying the object, and the detection target of the program is the object. From the retaining unit, the program whose detection target is the object is specified. Thus, in the case where the sensing environment and the application environment are respectively established, these environments can be related to each other according to the purpose. In addition, in the case where the sensing environment or the application environment is added or changed, the corresponding relationship retained in the retaining unit can be changed; therefore, the system can be established and changed readily and flexibly. The information notified in the step of notifying the address of the information on the situation of the object may be part of the information detected by the detection unit.

In another aspect of the present invention, an application program execution system includes a movable object, a detection unit that detects information on the object, an application program, a control unit that executes the application program, relationship information showing relationship between the object and the application program, and a notification unit that notifies, based on the relationship information, the control unit of a detection result of the detection unit. By managing the relationship between the objects and the application programs, the objects and the application programs can be managed independently. Thus, the present invention enables to establish and change the application program execution system flexibly. Development of the application programs is also flexible. According to the present invention, the detection units are commonly used so as to reduce redundancy, simplify the system structure, and reduce the costs. The detection result, of which is notified the control units, may be part of the information detected by the detection units.

On the application program execution system in the above-mentioned aspect, information on the object includes situation information showing an identifier of the object and a situation of the object. Various kinds of information can be applied to the information on the objects. For example, information may artificially be given to the identifier. In the case where the objects are living creatures such as humans or the like, any kind of information that can identify the object can be applied, including finger print, iris, voice pattern, face pattern, vein pattern of palm, shape of item, or whatever. Regarding the situation information, the situation on the detection units, that is, positional information, environmental information, or the like of the detection units can be applied to the situation information. Information that has been detected from the object directly can be applied to the situation information.

On the application program execution system in the above-mentioned aspect, the relationship information includes the application programs or address information on the control units to which the detection result is sent. By including the above-mentioned address information in the situation information, the above-mentioned address can be obtained easily, based on identification data.

On the application program execution system in the above-mentioned aspect, the detection units and the control units are respectively located in different places. In the present invention, the application programs and the control units can be managed independently. Thus, the detection units and the control units can be placed in various places in the real world.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2003-357081 filed on Oct. 16, 2003 including specification, claims, drawings, and abstract is incorporated herein by reference in its entirety.

What is claimed is:

1. An application program execution system comprising: a plurality of application servers each having a processor and an application, wherein each of the plurality of application servers control execution of an application program different from the application program on each other application server;
   an object management server, having a processor, in which relationship information is stored, the relationship information relating an identity of an object to an identity of a first application server executing a first application based on a first type of attribute information among the plurality of application servers and relating the identity of the object to an identity of a second application server executing a second application based on a second type of attribute information among the plurality of application servers; and
   a sensor server that detects from the object the identity of the detected object, the first attribute information of the detected object, and the second attribute information of the detected object,
   wherein the object management server receives from the sensor server the identity of the detected object, determines the identity of the first application server, the first type of attribute information upon which execution of the first application by the first application server is based, the identity of the second application server, and the second type of attribute information upon which execution of the second application by the second application server is based from the stored relationship information and the received identity of the detected object, and transmits the identity of the first application server, the first type of attribute information upon which execution of the first application by the first application server is based, the identity of the second application server, and the second type of attribute information upon which execution of the second application by the second application server is based to the sensor server based on the determination,
   wherein the sensor server determines that the detected first attribute information is of the first type of attribute information upon which execution of the first application by the first application server is based, determines that the detected second attribute information is of the second type of attribute information upon which execution of the second application by the second application server is based, transmits the detected first attribute information to the first application server using the identity of the first application server received from the object management server, and transmits the detected second attribute information to the second application server using the identity of the second application server received from the object management server, and
   wherein the first application server provides a first service to the object by executing the first application using the detected first attribute information on the object received from the sensor server and the second application server provides a second service to the object by executing the second application using the detected second attribute information on the object received from the sensor server.

2. The application program execution system as claimed in claim 1, wherein at least one of the first attribute information and the second attribute information on the object detected by the sensor server comprises a situation of the object, the situation of the object including at least one of a condition of the object and surroundings of the object.

3. The application program execution system as claimed in claim 1, wherein the sensor server controls a plurality of detection units that are respectively located in different places, each of the plurality of detection units detecting the object in the respective different places.

4. The application program execution system as claimed in claim 1, wherein the plurality of application servers are respectively located in different places.

5. An application program execution system comprising:
   a sensor server that detects from an object an identifier of the object, first attribute information of the object, and second attribute information of the object;
   a first application server, having a processor, that controls execution of a first application program to provide a first service for the object, based on the detected first attribute information of the object;
   a second application server, having a processor, that controls execution of a second application program to provide a second service for the object, based on the detected second attribute information; and
   an object management server, having a processor, in which relationship information is stored, the relationship information associating the identifier with an address of the first application server, a first type of attribute information input to the first application, an address of the second application server, and a second type of attribute information input to the second application,
   wherein the sensor server further comprises:
      an acquiring unit that acquires the address of the first application server, the first type of attribute information input to the first application, the address of the second application server, and the second type of attribute information input to the second application from the object management server using the identifier detected by the sensor server; and
      a notification unit that transmits the detected first attribute information to the address of the first application server acquired by the acquiring unit in response to a determination that the detected first attribute information is of the first type of attribute information input to the first application and transmits the detected second attribute information to the address of the second application server acquired by the acquiring unit in response to a determination that the detected second attribute information is of the second type of attribute information input to the second application.

6. The application program execution system as claimed in claim 5, wherein the first application server stores the first application program and the second application server stores the second application program, and wherein the sensor server, the object management server the first application server, and the second application server are connected to each other via a network.

7. The application program execution system as claimed in claim 5, wherein the sensor server, the first application server, and the second application server are connected to each other via a network.

8. The application program execution system as claimed in claim 5, wherein the first application server stores the first application program and the second application server stores the second application program.

9. An application program execution system comprising:
an object management server, having a processor, in which relationship information is stored, the relationship information relating an identity of an object to an identity of a first application server executing a first application based on a first type of attribute information and relating the identity of the object to an identity of a second application server executing a second application based on a second type of attribute information;
a sensor server that detects from the object the identity of the detected object, first attribute information of the detected object, and second attribute information of the detected object,
wherein the object management server receives from the sensor server the identity of the detected object, determines the identity of the first application server, the first type of attribute information upon which execution of the first application by the first application server is based, the identity of the second application server, and the second type of attribute information upon which execution of the second application by the second application server is based from the stored relationship information and the received identity of the detected object, and transmits the identity of the first application server, the first type of attribute information upon which execution of the first application by the first application server is based, the identity of the second application server, and the second type of attribute information upon which execution of the second application by the second application server is based to the sensor server based on the determination,
wherein the sensor server determines that the detected first attribute information is of the first type of attribute information upon which execution of the first application by the first application server is based, determines that the detected second attribute information is of the second type of attribute information upon which execution of the second application by the second application server is based, transmits the detected first attribute information to the first application server using the identity of the first application server received from the object management server, and transmits the detected second attribute information to the second application server using the identity of the second application server received from the object management server, and
wherein the object receives a first service from the first application server executing the first application using the detected first attribute information on the object received from the sensor server and receives a second service from the second application server executing the second application using the detected second attribute information on the object received from the sensor server.

* * * * *